United States Patent [19]
Kikuchi

[11] Patent Number: 5,359,456
[45] Date of Patent: Oct. 25, 1994

[54] OBJECTIVE LENS SYSTEM FOR ENDOSCOPES

[75] Inventor: Akira Kikuchi, Tokyo, Japan

[73] Assignee: Olympus Optical Co., Ltd., Tokyo, Japan

[21] Appl. No.: 961,543

[22] Filed: Oct. 15, 1992

[30] Foreign Application Priority Data

Oct. 15, 1991 [JP] Japan .................................. 3-293811
Oct. 15, 1991 [JP] Japan .................................. 3-293815
Oct. 15, 1991 [JP] Japan .................................. 3-293928

[51] Int. Cl.⁵ ............................................. G02B 23/00
[52] U.S. Cl. ................................................... 359/654
[58] Field of Search ................................. 359/652, 654

[56] References Cited

U.S. PATENT DOCUMENTS 4,755,029 7/1988 Okabe ................................. 359/654
4,988,172 1/1991 Kanamori et al. .................. 359/654

FOREIGN PATENT DOCUMENTS 47-28061 7/1972 Japan .
60-46410 10/1985 Japan .

Primary Examiner—Scott J. Sugarman
Attorney, Agent, or Firm—Cushman, Darby & Cushman

[57] ABSTRACT

An objective lens system for endoscopes comprising, in order from the object side, a front lens unit having a negative refractive power, an aperture stop and a rear lens unit having a positive refractive power. This objective lens system is compact, comprises a small number of lens elements and favorably corrected aberrations, especially chromatic aberration, owing to a fact that at least one graded refractive index lens component is used in the front lens unit or the rear lens unit.

24 Claims, 37 Drawing Sheets

OBJECTIVE LENS SYSTEM FOR ENDOSCOPES

BACKGROUND OF THE INVENTION a) Field of the Invention

The present invention relates to an objective lens system for endoscopes using a graded refractive index lens component.

b) Description of the Prior Art

There are known many objective lens systems having compositions exemplified by that of the objective lens system disclosed by Japanese Patent Kokai Publication No. Sho 60-46,410 illustrated in FIG. 1. This system is of the retrofocus type which consists of a diverging lens unit (a front lens unit) and a converging lens unit (a rear lens unit) which are disposed before and after respectively an aperture stop.

In the lens system having this composition, the diverging front lens unit has a function to Widen a field angle of the lens system and a role to reduce a Petzval's sum, whereas refractive powers are shared among many lens elements for producing little aberrations in the converging rear lens unit. For this reason, the rear lens unit is composed of three positive lens elements and a cemented lens component. Aberrations are corrected favorably in the objective lens system as a whole by adopting the power distribution described above.

However, this objective lens system comprises a large number of lens elements and has a long total length. Even when the number of lens elements are reduced by using an aspherical surface in this objective lens system, chromatic aberration cannot be corrected favorably though Seidel's aberrations (spherical aberration, astigmatism and coma) and the Petzval's sum can be reduced.

The retrofocus type objective lens system for endoscopes consists of the diverging front lens unit and the converging rear lens unit which are disposed on both sides of the aperture stop as described above, and the front lens unit consists in most cases of a single lens element which has a planar surface on the object side and a concave surface on the image side. The front lens unit has a negative refractive power and, since the lens unit is disposed on the object side of the aperture stop, the front lens unit produces negative lateral chromatic aberration. Since most of the lens elements disposed in the converging rear lens unit have positive refractive powers, the rear lens unit produces remarkable negative lateral chromatic aberration.

In order to correct the remarkable negative lateral chromatic aberration which are produced by the front lens unit and the rear lens unit as described above, it is conventional to use a cemented lens component which consists of a convex lens element made of a glass material having a high dispersing power and a concave lens element made of a glass material having a high dispersing power in the rear lens unit. Further, the lens elements disposed in the converging rear lens unit are made of glass materials which have relatively high refractive indices and relatively weak dispersing powers so that the lens surfaces disposed in the rear lens unit produce lateral chromatic aberration as little as possible.

The objective lens system disclosed by Japanese Patent Kokoku Publication No. Sho 60-46,410 has a wide field angle and faborably corrected aberrations. However, this objective lens system comprises lens elements as many as six, has a complicated composition and requires high cost for manufacturing. This objective lens system has defects that it has a long total length and that, when the objective lens system is used in medical endoscope, it prolongs a hard section of the endoscope which is to be inserted into human bodies, thereby making it impossible to inspect interiors of curved organs.

As a conventional example of an objective lens system for endoscopes using a graded refractive index lens component, there is known the lens system which is disclosed by Japanese Patent Kokoku Publication No. Sho 47-28,061. This lens system has planar surfaces on both sides and uses a graded refractive index lens component which has a refractive index distribution in the radial direction. This objective lens system has a simple composition which is desirable for use with endoscopes, but cannot have a wide field angle which is determined dependently on a distribution of refractive powers therein, has an outside diameter which is large at a certain degree, produces remarkable offaxial aberrations at high image heights, and cannot be used in endoscopes having large outside diameters.

SUMMARY OF THE INVENTION

A primary object of the present invention is to provide an objective lens system for endoscopes which comprises, in order from the object side, a diverging front lens unit having a negative refractive power, an aperture stop and a converging rear lens unit having a positive refractive power, and uses at least one graded refractive index lens component in the objective lens system.

A first type of the objective lens system for endoscopes according to the present invention has, for example, a composition illustrated in FIG. 2. Speaking concretely, the first type of the objective lens system according to the present invention consists, in order from the object side, of the diverging front lens unit having the negative refractive power, the aperture stop and the converging rear lens unit, and uses at least one graded refractive index lens component in the front lens unit. When a refractive index distribution of this graded refractive index lens component is approximated by the formulae (1) through (5) shown below, the graded refractive index lens component satisfies the following conditions (6) and (7):

$$N_d(r) = N_{0d} + N_{1d}r^2 + N_{2d}r^4 + N_{3d}r^6 \quad (1)$$

$$N_F(r) = N_{0F} + N_{1F}r^2 + N_{2F}r^4 + N_{3F}r^6 \quad (2)$$

$$N_C(r) = N_{0C} + N_{1C}r^2 + N_{2C}r^4 + N_{3C}r^6 \quad (3)$$

$$\nu_{0d} = (1 - N_{0d})/(N_{0F} - N_{0C}) \quad (4)$$

$$\nu_{1d} = N_{1d}/(N_{1F} - N_{1C}) \quad (5)$$

$$N_{1d} < 0 \quad (6)$$

$$0 \leq \nu_{0d} \leq \nu_{1d} \quad (7)$$

wherein the reference symbols $N_d(r)$, $N_F(r)$ and $N_C(r)$ represent refractive indices of the graded refractive index lens component for the d-line, F-line and C-line respectively when a distance as measured from an optical axis in the radial direction is designed by r, the reference symbols $N_{0d}$, $N_{1d}$, $N_{2d}$ and $N_{3d}$ denote refractive index distribution coefficients for the d-line, the reference symbols $N_{0F}$, $N_{1F}$, $N_{2F}$ and $N_{3F}$ represent refractive index distribution coefficients for the F-line, the reference symbols $N_{0C}$, $N_{1C}$, $N_{2C}$ and $N_{3C}$ designate refractive index distribution coefficients for the C-line, and the reference symbols $\nu_{0d}$ and $\nu_{1d}$ denote Abbe's numbers as expressed by the formulae (4) and (5) respectively.

The graded refractive index lens element having the refractive index distribution expressed by the above-mentioned formulae (1) through (7) has refractive index which is lowered from the optical axis toward the marginal portion thereof and a dispersing power which is weakened as the refractive index is lowered. In other words, this graded refractive index lens element has a positive power of medium and has a function for chromatic aberration which is the same as that of a convex lens element made of a homogenous medium. Accordingly, when the graded refractive index lens component having the refractive index distribution expressed by the above-mentioned formulae (1) through (7) is disposed in the front lens unit, a medium of this lens component has a function which is the same as a convex lens element made of the same medium and disposed on the object side of the aperture stop, and produces positive lateral chromatic aberration. This positive lateral chromatic aberration can be used for correcting negative lateral chromatic aberration which is to be produced by the rear lens unit.

The function of this graded refractive index lens component for correcting chromatic aberration can be considered by replacing the refractive index and Abbe's number thereof with those of a lens element which is made of an ordinary homogenous optical glass material.

The following formula (8) is generally known as a condition for correcting longitudinal chromatic aberration in lens systems:

$$\Sigma(\Phi/\nu) = 0 \quad (8)$$

wherein the reference symbol $\Phi$ represents a refractive power of a lens element made of the ordinary optical glass material (1/f) and the reference symbol $\nu$ designates an Abbe's number of the lens element.

Assuming that the above-mentioned graded refractive index lens component is equivalent to the lens element made of the ordinary homogenous optical glass material, the following formula (9) applies to lens system consisting of thin lens elements:

$$\Phi_e/\nu_e = \Phi_S/\nu_{0d} + \Phi_M/\nu_{1d} \quad (9)$$

wherein the reference symbol $\nu_e$ represents an Abbe's number distribution of the graded refractive index lens component which is converted into an Abbe's number of the lens element made of the ordinary homogenous optical glass material (herein after referred to as an equivalent Abbe's number), the reference symbol $\Phi_e$ designates the refractive power of the graded refractive index lens component, the reference symbol $\Phi_S$ denotes a total sum of refractive powers of the surfaces of the graded refractive index lens component and the reference symbol $\Phi_M$ represents a refractive power of the medium of the graded refractive index lens element.

$\Phi_M$ and $\Phi_S$ mentioned above can be expressed by following formulae:

$$\begin{aligned} \phi_M &= -2N_{1d} \sin(\alpha \cdot d_M)/\alpha \quad (N_{1d} < 0) \\ &= -2N_{1d} \sinh(\alpha \cdot d_M)/\alpha \quad (N_{1d} > 0) \\ &\approx -2d_M \cdot N_{1d} \\ \phi_S &= (N_{0d} - 1)(1/r_a - 1/r_b) \end{aligned} \quad (10)$$

wherein the reference symbol $d_M$ represents a distance as measured between both the surfaces of the graded refractive index lens component, the reference symbols $r_a$ and $r_b$ designate radii of curvature on both the surfaces of the graded refractive index lens component, and the reference symbol $\alpha$ denotes a value which is determined by the following formula:

$$\alpha = |2N_{1d}/N_{0d}|^{1/2}$$

When the formula (9) is transformed by approximating as $\Phi_e = s + \Phi_M$, we obtain the following formula (11):

$$\nu_e = \nu_{0d} \times \nu_{1d} / \left( (\nu_{0d} - \nu_{1d}) \times \frac{\phi_M}{\phi_e} \times \nu_{1d} \right) \quad (11)$$

When the numerator and the denominator of the right side of the formula (11) by $\nu_{1d}$ respectively, the following formula (12) is obtained:

$$\nu_e = \nu_{0d} / \left( (\nu_{0d}/\nu_{1d} - 1) \times \frac{\phi_M}{\phi_e} + 1 \right) \quad (12)$$

It will be understood from the above-mentioned formula that $\nu_e$ can be made smaller than $\nu_{0d}$ by reducing $\nu_{1d}$. That is to say, lateral chromatic aberration can be corrected more favorably by using a graded refractive index lens component having a positive refractive power and a relatively small equivalent Abbe's number in the diverging front lens unit than a lens element which has the same Abbe's number $\nu_{0d}$ and is made of the ordinary homogenous optical glass material.

It is desirable that the above-mentioned graded refractive index lens component satisfies the following conditions (13) and (14):

$$\nu_e/\nu_{0d} \geq 1.2 \quad (13)$$

$$\nu_e \leq 0 \quad (14)$$

The condition (13) is required for reducing the negative chromatic aberration which is to be produced in the front lens unit. The condition (14), in contrast, is necessary for producing the positive chromatic aberration in the front lens unit.

If the limit of the condition (13) or the condition (14) is exceeded, the front lens unit will undesirably be incapable of correcting the negative chromatic aberration produced in the rear lens unit.

Further, spherical aberration, coma and astigmatism which are produced by the concave surface of the front lens unit and the rear lens unit can be corrected by controlling the refractive index distribution of the graded refractive index lens component used in the front lens unit. Accordingly, it is possible to reduce a number of lens components to be disposed in the rear lens unit.

A second type of the objective lens system for endoscopes according to the present invention has, for example, a composition illustrated in FIG. 17. Speaking concretely, the second type of the objective lens system comprises, in order from the object side, a diverging front lens unit having a negative refractive power, an aperture stop and a converging rear lens unit having a positive refractive power, and uses at least one graded refractive index lens component in the rear lens unit. This graded refractive index lens component has a refractive index distribution which can be approximated by the above-mentioned formulae (1) through (5), and satisfies the following conditions (15) and (7):

$$N_{1d} > 0 \qquad (15)$$

$$0 \leq \nu_{0d} \leq \nu_{1d} \qquad (7)$$

The graded refractive index lens component having the refractive index distribution which can be approximated by the above-mentioned formulae (1) through (5) and is configured so as to satisfy the above-mentioned conditions (15) and (7) has refractive index progressively enhanced from the optical axis toward the marginal portion of the lens component and has a refractive index distribution enhancing dispersing power as the refractive index is enhanced. In other words, this graded refractive index lens component has a negative refractive power of medium and a function for chromatic aberration which is the same as that of a concave lens element which is made of an ordinary homogenous medium. When the graded refractive index lens element satisfying the above-mentioned condition (15) and (7) is disposed on the image side of the aperture stop, negative lateral chromatic aberration produced by the rear lens unit can be corrected.

As for longitudinal chromatic aberration, $\nu_e$ becomes smaller than $\nu_{0d}$ by reducing $\nu_{1d}$ as described above. When a graded refractive index lens component which has a negative refractive power and a relatively small Abbe's number is used in the rear lens unit for correcting chromatic aberration, the lateral chromatic aberration can be corrected more favorably than that in a lens unit using a lens element which has a value of $\nu_{0d}$ the same as that of the graded refractive index lens element and is made of the ordinary homogenous glass material. In this case, it is desirable that the graded refractive index lens component satisfies the following condition (16):

$$\nu_e / \nu_{0d} \leq 0.8 \qquad (16)$$

If the condition (16) is not satisfied, undesirable effects will result in, for example, the lateral chromatic aberration will be under-corrected in the objective lens system.

It is possible to correct the spherical aberration, coma and astigmatism which are produced by the rear lens unit by controlling the refractive index distribution profile of the graded refractive index lens component. Accordingly, it is possible to reduce a number of lens elements to be disposed in the rear lens unit or shorten a total length of the objective lens system by controlling the refractive index distribution profile.

A third type of the objective lens system for endoscopes has a composition, for example, as shown in FIG. 24. Speaking concretely, the third type of objective lens system according to the present invention comprises, in order from the object side, a diverging lens unit having a negative refractive power, an aperture stop and a converging lens unit having a positive refractive power, and uses a graded refractive index lens component in the rear lens unit. This graded refractive index lens component has a refractive index distribution which is approximated by the above-mentioned formulae (1) through (5), and further satisfies the following conditions (6) and (7):

$$N_{1d} < 0 \qquad (6)$$

$$0 \leq \nu_{0d} \leq \nu_{1d} \qquad (7)$$

The third type of objective lens system is configured so as to have favorable optical performance by properly balancing refractive powers between the positive front lens unit. Speaking more concretely, the third type of objective lens system is configured so that the lens system has a wide visual field, and astigmatism can be corrected by using a small number of lens elements in the rear lens unit. Further, the total length of the objective lens system as a whole is shortened by using the small number of lens elements in the rear lens unit.

Moreover, the third type of objective lens system according to the present invention is configured so as to effectively utilize the characteristic of the graded refractive index lens by composing the rear lens unit as described below. The rear lens unit consists, in order from the object side, of the graded refractive index lens component and a positive lens component, and is configured so as to satisfy the following condition (17):

$$0.2 \leq |\Phi_e / \Phi_R| \leq 3.6 \qquad (17)$$

wherein the reference symbol $\Phi_R$ represents a refractive power of the rear lens unit and the reference symbol $\Phi_e$ designates a refractive power of the graded refractive index lens component.

The condition (17) defines a refractive power of the graded refractive index lens component which is shared out of the refractive power of the rear lens unit.

If the lower limit of the condition (17) is exceeded, a large share of refractive power will be imparted to the positive lens component out of the refractive power of the rear lens unit and radii of curvature will be small on the surfaces of the positive lens component which is made of a homogenous medium, whereby this lens component will undesirably produce remarkable coma and astigmatism. If the upper limit of the condition (17) is exceeded, in contrast, the share of the refractive power imparted to the graded refractive index lens component will be large, whereby remarkable spherical aberration, coma and astigmatism will be produced by the medium and both the refracting surfaces of the graded refractive index lens component.

For the third type of the objective lens system for endoscopes according to the present invention, it is more desirable that the following condition (17') is satisfied in place of the above-mentioned condition (17):

$$0.5 \leq |\Phi_e/\Phi_R| \leq 1.5 \quad (17')$$

In order to further reduce the aberrations which are to be produced by the above-mentioned graded refractive index lens component, refractive power distribution in the graded refractive index lens component, i.e., power sharing between the medium and the surfaces of the graded refractive index lens component satisfies the following condition (18):

$$0.01 \leq |\Phi_M/\Phi_e| \leq 3.0 \quad (18)$$

If the share of the refractive power of the medium is small enough to exceed the lower limit of the condition (18), it will be obliged to obtain the required power of the graded refractive index lens component by strengthening powers of the air-contact surfaces of the graded refractive index lens component, whereby remarkable spherical aberration, coma and astigmatism will be produced by the air-contact surfaces. Consequently, aberrations cannot be corrected favorably in the objective lens system as a whole by using the aberration correcting effect of the refractive index distribution in the medium of the graded refractive index lens component and the aberration correcting effect obtained By the refractive powers of the air-contact surfaces of the graded refractive index lens component which is progressively weakened by the refractive index distribution in the medium. Further, it will be impossible to correct the aberrations favorably in the objective lens system as a whole by the lens component which is made of the homogenous medium and disposed in the rear lens unit. If the refractive power of the medium is strong enough to exceed the upper limit of the condition (18), the medium will undesirably produce remarkable aberrations.

Now, description will be made of means for correcting aberrations in the third type of objective lens system according to the present invention.

Spherical aberration is produced on the positive side by the concave surface in the front lens unit. This spherical aberration is cancelled with negative spherical aberration which is produced by the image side convex surface of the graded refractive index lens component disposed in the rear lens unit. In this case, the convex surface of the graded refractive index lens component disposed in the rear lens unit is configured so as to produce the negative spherical aberration in an amount which is nearly equal to that of the positive spherical aberration produced in the front lens unit. Speaking concretely, the refractive index distribution of the graded refractive index lens component disposed in the rear lens unit is determined so that the image side convex surface has a refractive power which is progressively weakened toward the marginal portion of the lens component.

The concave surface of the front lens unit produces inner coma, which is corrected by producing outer coma with the object side surface of the graded refractive index lens component and the object side surface of the positive lens component disposed in the rear lens unit. Coma which is produced by the medium of the graded refractive index lens component disposed in the rear lens unit and coma which is produced by the image side surface of this graded refractive index lens component are nearly equal (in absolute values) to each other and reverse to each other in signs (positive and negative) and cancelled with each other.

Astigmatism is produced in a relatively small amount and poses nearly no problem. Aberrations produced by the object side surface of the graded refractive index lens component disposed in the rear lens unit and the medium of this lens component are cancelled with aberration produced by the image side surface of the graded refractive index lens component and the positive lens component. For this purpose, it is sufficient to select a refractive index distribution which progressively lowers refractive power toward the marginal portion of the graded refractive index lens component.

Though aberrations are corrected favorably in the third type of objective lens system according to the present invention by composing the rear lens unit of the graded refractive index lens component having the positive refractive power and the positive lens component as described above, it is possible to compose the rear lens unit of a single graded refractive index lens component.

That is to say, it is possible to impart the required refractive power to the rear lens unit by selecting a sufficiently small value for the refractive index distribution coefficient $N_{1d}$ for the graded refractive index lens component disposed in the rear lens unit and the positive refractive power of the medium by enlarging a difference in refractive index between a portion of the graded refractive index lens component located on the optical axis and the marginal portion thereof.

Even when the rear lens unit is composed of the single graded refractive index lens component as described above, aberrations in the objective lens system remain unchanged from those in the objective lens system using the rear lens unit which is composed of the graded refractive index lens component having the positive refractive power and the positive lens component.

Now, description will be made of the functions of the graded refractive index lens component for correcting aberrations, especially Petzval's sum. Used for this description is the equivalent refractive index which is obtained by expressing the refractive index of the graded refractive index lens component in terms of refractive index of a lens element made of the ordinary homogenous glass material.

As a condition for correcting Petzval's sum, there is known the following formula (19) expressing Petzval's sum:

$$\Sigma\Phi/N = 0 \tag{19}$$

wherein the reference symbol N represents a refractive index.

When the refractive index of the graded refractive index lens component is equivalent to that of the lens element made of the ordinary homogenous material on the basis of the formula (19), we obtain the following formula (20):

$$\Phi_e/N_e = \Phi_S/N_d + \Phi_M/N_{0d}^2 \tag{20}$$

wherein the reference symbol $N_e$ represents an equivalent refractive index obtained by expressing the refractive index of the graded refractive index lens component in terms of that of the lens element made of the ordinary homogenous glass material, the reference symbol $\Phi_S$ designates a total sum of the refractive powers of both the surfaces of the graded refractive index lens component and the reference symbol $\Phi_M$ denotes the refractive power of the medium of the graded refractive index lens component.

In addition, $\Phi_S$ and $\Phi_M$ have values which are given by the above-mentioned formula (10).

Let us approximate as $\Phi_e = \Phi_S + \Phi_M$. Then, we obtain the following formula (21) from the formula (20):

$$N_e = N_{0d}^2 / \{(1 - N_{0d})/(1 + \Phi_S/(-2 \times N_{1d} \times d_M)) + N_{0d}\} \tag{21}$$

As is understood from the formula (21), it is possible to reduce Petzval's sum by enlarging values of $N_{1d}$ and $d_M$. Further, since $N_e$ can be larger than that of the lens element made of the ordinary homogenous glass material, it is possible to obtain the refractive power required for the rear lens unit by using lens components having low radii of curvature on the surfaces thereof. Accordingly, it is possible to suppress the aberrations to be produced by these surfaces to relatively low levels, and configure the objective lens system so as to comprise a small number of lens components or shorten the total length of the lens system by utilizing the aberration correcting functions of the refractive index distribution of the graded refractive index lens component which is similar to those of an aspherical surface.

From the facts described above, it is desirable that the graded refractive index lens component to be used in the rear lens unit satisfies the following condition (22):

$$N_e/N_{0d} \geq 1.1 \tag{22}$$

If the condition (22) is not satisfied, the effect obtained by using the graded refractive index lens component will be lowered and it will be difficult to correct aberration favorably.

DETAILED DESCRIPTION OF THE PREFERRED EMBODIMENTS

Figure 1:
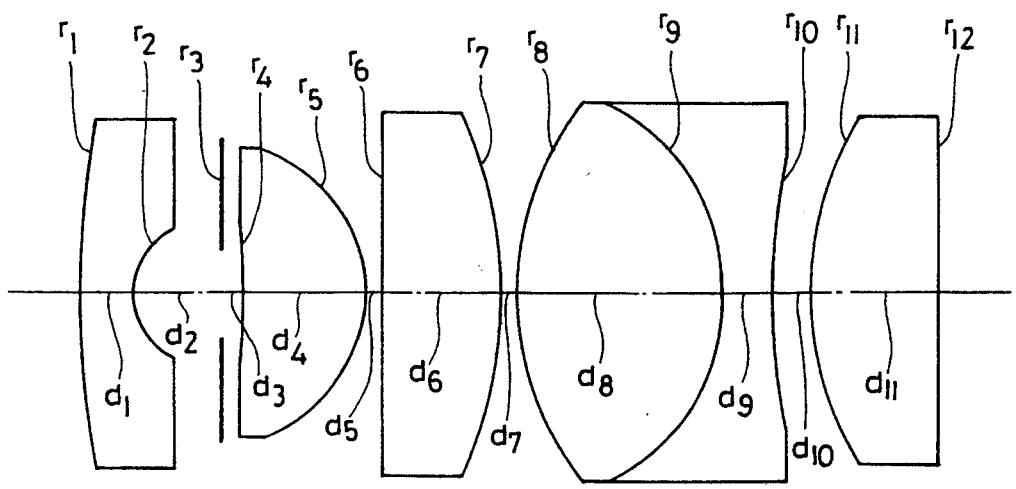
FIG. 1 shows a sectional view illustrating the composition of the conventional objective lens system for endoscopes.
Figure 2:
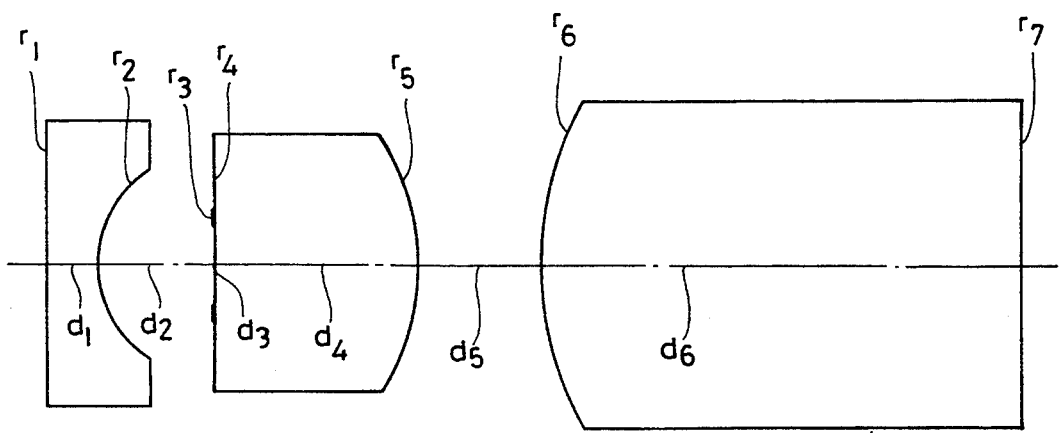
FIG. 2 through FIG. 37 show sectional views illustrating first through thirty-sixth embodiments respectively of the objective lens system for endoscopes according to the present invention.
Figure 3:
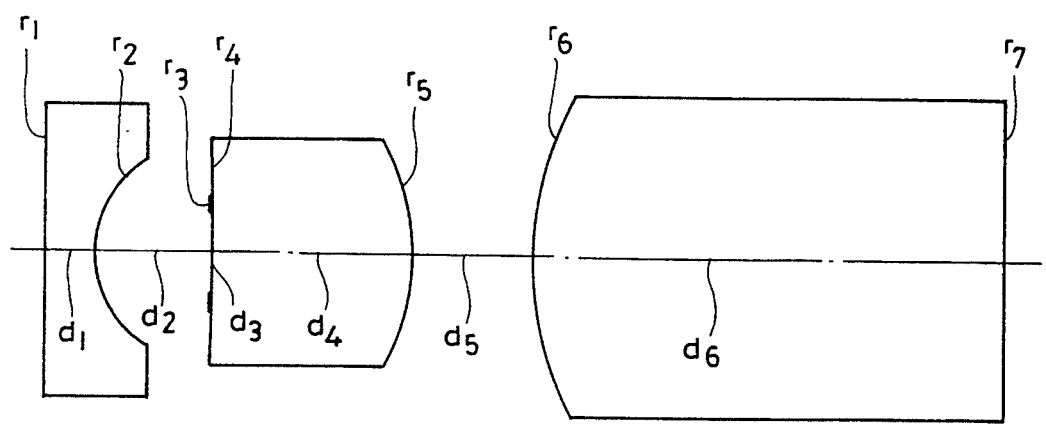
Figure 4:
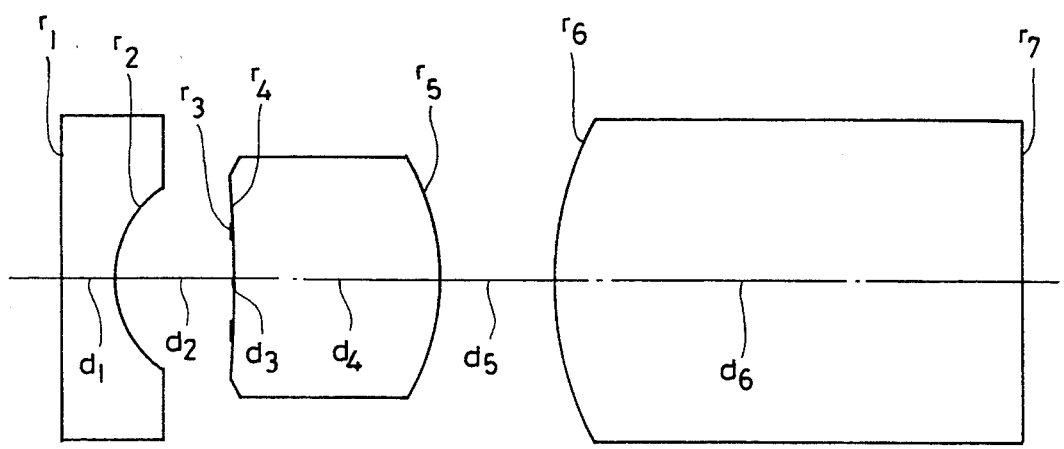
Figure 5:
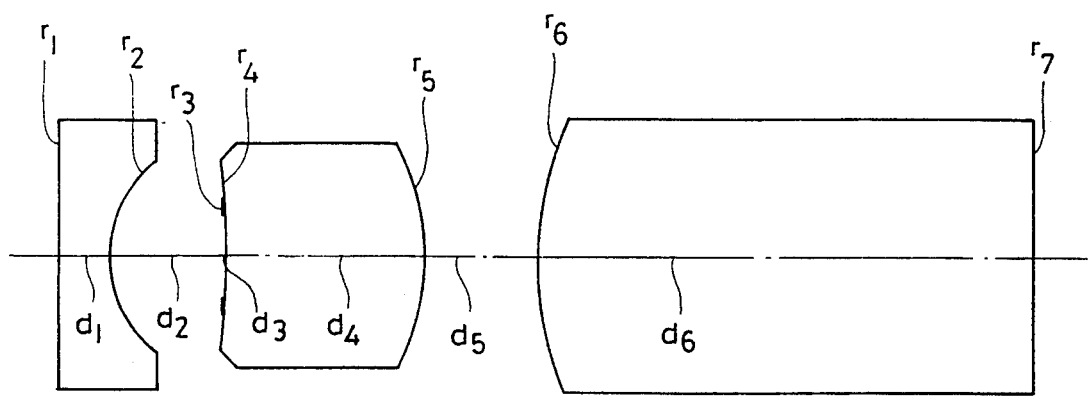

Now, the preferred embodiments of the first type, second type and third type of the objective lens system for endoscopes according to the present invention will be described below:

Embodiment 1 f = 1.000, F/2.578, IH = 0.8427,
object distance = −14.0449
$r_1 = \infty$
  $d_1 = 0.4682$  $n_1$ (graded refractive index lens)
$r_2 = 0.9698$
  $d_2 = 1.0077$
$r_3 = \infty$ (stop)
  $d_3 = 0.0005$
$r_4 = -7.3302$
  $d_4 = 1.7996$  $n_2 = 1.88300$  $\nu_2 = 40.78$
$r_5 = -1.8653$
  $d_5 = 1.0479$
$r_6 = 2.7957$
  $d_6 = 4.2106$  $n_3 = 1.88300$  $\nu_3 = 40.78$
$r_7 = \infty$
graded refractive index lens

| (wave length) | $N_0$ | $N_1$ | $N_2$ | $N_3$ |
|---|---|---|---|---|
| 587.56 | 1.67000 | $-0.23420 \times 10^{-1}$ | 0.00000 | 0.00000 |
| 656.28 | 1.66330 | $-0.10038 \times 10^{-1}$ | 0.00000 | 0.00000 |
| 486.13 | 1.68563 | $-0.54645 \times 10^{-1}$ | 0.00000 | 0.00000 |
| $\nu$ | 30.00000 | 0.52503 | 0.00000 | 0.00000 |

$d_M = 0.4682$, $r_a = \infty$, $r_b = 0.9698$, $\phi_R = 0.625$,
$\phi_M = 0.022$, $\phi_S = -0.691$, $\phi_e = -0.669$,
$\nu_e = -35.693$, $\nu_e/\nu_{0d} = -1.190$ Embodiment 2 f = 1.0000, F/2.561, IH = 0.8427,
object distance = −14.0449
$r_1 = \infty$
  $d_1 = 0.4682$  $n_1$ (graded refractive index lens)
$r_2 = 0.9698$
  $d_2 = 1.0077$
$r_3 = \infty$ (stop)
  $d_3 = 0.0005$
$r_4 = -7.3302$
  $d_4 = 1.7996$  $n_2 = 1.88300$  $\nu_2 = 40.78$
$r_5 = -1.8653$
  $d_5 = 1.0479$
$r_6 = 2.7957$
  $d_6 = 4.2106$  $n_3 = 1.88300$  $\nu_3 = 40.78$ -continued

Embodiment 2

$r_7 = \infty$ graded refractive index lens

| (wave length) | $N_0$ | $N_1$ | $N_2$ | $N_3$ |
|---|---|---|---|---|
| 587.56 | 1.67000 | $-0.23420 \times 10^{-1}$ | 0.00000 | 0.00000 |
| 656.28 | 1.66330 | $-0.19907 \times 10^{-1}$ | 0.00000 | 0.00000 |
| 486.13 | 1.68563 | $-0.31617 \times 10^{-1}$ | 0.00000 | 0.00000 |
| $\nu$ | 30.00000 | $0.200000 \times 10$ | 0.00000 | 0.00000 |

$d_M = 0.4682$, $r_a = \infty$, $r_b = 0.9698$, $\phi_R = 0.625$,
$\phi_M = 0.022$, $\phi_S = -0.691$, $\phi_e = -0.669$,
$\nu_e = 55.451$, $\nu_e/\nu_{0d} = 1.848$

Embodiment 3

$f = 1.000$, F/2.463, IH = 0.8688,
object distance = $-14.4793$ $r_1 = \infty$
  $d_1 = 0.4826$  $n_1$ (graded refractive index lens)
$r_2 = 0.9116$
  $d_2 = 1.0623$
$r_3 = \infty$ (stop)
  $d_3 = 0.0005$
$r_4 = -6.5252$
  $d_4 = 1.8372$  $n_2 = 1.88300$  $\nu_2 = 40.78$
$r_5 = -1.8474$
  $d_5 = 1.0041$
$r_6 = 2.8593$
  $d_6 = 4.1461$  $n_3 = 1.88300$  $\nu_3 = 40.78$
$r_7 = \infty$ graded refractive index lens

| (wave length) | $N_0$ | $N_1$ | $N_2$ | $N_3$ |
|---|---|---|---|---|
| 587.56 | 1.60000 | $-0.35535 \times 10^{-1}$ | 0.00000 | 0.00000 |
| 656.28 | 1.59280 | $-0.29612 \times 10^{-1}$ | 0.00000 | 0.00000 |
| 486.13 | 1.61680 | $-0.49354 \times 10^{-1}$ | 0.00000 | 0.00000 |
| $\nu$ | 25.00000 | $0.18000 \times 10$ | 0.00000 | 0.00000 |

$d_M = 0.4826$, $r_a = \infty$, $r_b = 0.9116$, $\phi_R = 0.63$,
$\phi_M = 0.034$, $\phi_S = -0.658$, $\phi_e = -0.624$, $\nu_e = 85.785$,
$\nu_e/\nu_{0d} = 3.431$

Embodiment 4

$f = 1.000$, F/2.543, IH = 0.8344,
object distance = $-13.9059$ $r_1 = \infty$
  $d_1 = 0.4635$  $n_1$ (graded refractive index lens)
$r_2 = 1.0149$
  $d_2 = 1.0141$
$r_3 = \infty$ (stop)
  $d_3 = 0.0005$
$r_4 = -6.7463$
  $d_4 = 1.7550$  $n_2 = 1.88300$  $\nu_2 = 40.78$
$r_5 = -1.8665$
  $d_5 = 0.9738$
$r_6 = 2.8068$
  $d_6 = 4.3459$  $n_3 = 1.88300$  $\nu_3 = 40.78$
$r_7 = \infty$ graded refractive index lens

| (wave length) | $N_0$ | $N_1$ | $N_2$ | $N_3$ |
|---|---|---|---|---|
| 587.56 | 1.70000 | $-0.10485 \times 10^{-1}$ | 0.00000 | 0.00000 |
| 656.28 | 1.69160 | $-0.92986 \times 10^{-3}$ | 0.00000 | 0.00000 |
| 486.13 | 1.71960 | $-0.32779 \times 10^{-1}$ | 0.00000 | 0.00000 |
| $\nu$ | 25.00000 | 0.32920 | 0.00000 | 0.00000 |

$d_M = 0.4635$, $r_a = \infty$, $r_b = 1.0149$, $\phi_R = 0.63$,
$\phi_M = 0.010$, $\phi_S = -0.690$, $\phi_e = -0.680$,
$\nu_e = -351.247$, $\nu_e/\nu_{0d} = -14.050$

Embodiment 5

$f = 1.0000$, F/2.504, IH = 0.8286,
object distance = $-13.8092$

Embodiment 5

$r_1 = \infty$
  $d_1 = 0.4603$  $n_1$ (graded refractive index lens)
$r_2 = 1.2134$
  $d_2 = 0.9458$
$r_3 = \infty$ (stop)
  $d_3 = 0.0004$
$r_4 = 9.6824$
  $d_4 = 1.7261$  $n_2 = 1.88300$  $\nu_2 = 40.78$
$r_5 = -1.7868$
  $d_5 = 0.8994$
$r_6 = 1.6590$
  $d_6 = 1.5889$  $n_3 = 1.60300$  $\nu_3 = 65.48$
$r_7 = -2.1647$
  $d_7 = 0.8560$  $n_4 = 1.84666$  $\nu_4 = 23.78$
$r_8 = \infty$ graded refractive index lens

| (wave length) | $N_0$ | $N_1$ | $N_2$ | $N_3$ |
|---|---|---|---|---|
| 587.56 | 1.70000 | $-0.23323 \times 10^{-1}$ | 0.00000 | 0.00000 |
| 656.28 | 1.69160 | $-0.19825 \times 10^{-1}$ | 0.00000 | 0.00000 |
| 486.13 | 1.71960 | $-0.31486 \times 10^{-1}$ | 0.00000 | 0.00000 |
| $\nu$ | 25.00000 | $0.20000 \times 10$ | 0.00000 | 0.00000 |

$d_M = 0.4603$, $r_a = \infty$, $r_b = 1.2134$, $\phi_R = 0.729$,
$\phi_M = 0.021$, $\phi_S = -0.577$, $\phi_e = -0.555$,
$\nu_e = 45.009$, $\nu_e/\nu_{0d} = 1.800$

Embodiment 6

$f = 1.000$, F/2.523, IH = 0.9128,
object distance = $-15.2130$ $r_1 = \infty$
  $d_1 = 0.5071$  $n_1$ (graded refractive index lens)
$r_2 = 0.7535$
  $d_2 = 1.0775$
$r_3 = \infty$ (stop)
  $d_3 = 0.0005$
$r_4 = 5.2886$
  $d_4 = 2.3381$  $n_2 = 1.88300$  $\nu_2 = 40.78$
$r_5 = -2.1678$
  $d_5 = 1.0891$
$r_6 = 1.7738$
  $d_6 = 1.0754$  $n_3 = 1.58913$  $\nu_3 = 61.18$
$r_7 = -1.7895$
  $d_7 = 2.2980$  $n_4 = 1.84666$  $\nu_4 = 23.78$
$r_8 = \infty$ graded refractive index lens

| (wave length) | $N_0$ | $N_1$ | $N_2$ | $N_3$ |
|---|---|---|---|---|
| 587.56 | 1.67000 | $-0.48610 \times 10^{-1}$ | 0.00000 | 0.00000 |
| 656.28 | 1.66330 | $-0.45693 \times 10^{-1}$ | 0.00000 | 0.00000 |
| 486.13 | 1.68563 | $-0.55415 \times 10^{-1}$ | 0.00000 | 0.00000 |
| $\nu$ | 30.00000 | $0.50000 \times 10$ | 0.00000 | 0.00000 |

$d_M = 0.5071$, $r_a = \infty$, $r_b = 0.7535$, $\phi_R = 0.595$,
$\phi_M = 0.049$, $\phi_S = -0.889$, $\phi_e = -0.840$,
$\nu_e = 42.463$, $\nu_e/\nu_{0d} = 1.415$

Embodiment 7

$f = 1.000$, F/2.451, IH = 0.8763,
object distance = $-14.6056$ $r_1 = \infty$
  $d_1 = 0.4869$  $n_1 = 1.84666$  $\nu_1 = 23.78$
$r_2 = -5.8423$
  $d_2 = 0.4869$  $n_2$ (graded refractive index lens)
$r_3 = -0.9989$
  $d_3 = 1.0696$
$r_4 = \infty$ (stop)
  $d_4 = 0.0005$
$r_5 = -7.9040$
  $d_5 = 1.8222$  $n_3 = 1.88300$  $\nu_3 = 40.78$
$r_6 = -1.7976$
  $d_6 = 1.2090$
$r_7 = 2.8369$
  $d_7 = 3.8111$  $n_4 = 1.88300$  $\nu_4 = 40.78$
$r_8 = \infty$ -continued

Embodiment 7 graded refractive index lens

| (wave length) | $N_0$ | $N_1$ | $N_2$ | $N_3$ |
|---|---|---|---|---|
| 587.56 | 1.67000 | $-0.13330 \times 10^{-1}$ | 0.00000 | 0.00000 |
| 656.28 | 1.66330 | $-0.11200 \times 10^{-1}$ | 0.00000 | 0.00000 |
| 486.13 | 1.68563 | $-0.18301 \times 10^{-1}$ | 0.00000 | 0.00000 |
| $\nu$ | 30.00000 | $0.18772 \times 10$ | 0.00000 | 0.00000 |

$d_M = 0.4869$, $r_a = -5.8423$, $r_b = 0.9986$,
$\phi_R = 0.615$, $\phi_M = 0.013$, $\phi_S = -0.786$, $\phi_e = -0.773$,
$\nu_e = 40.090$, $\nu_e/\nu_{0d} = 1.336$

Embodiment 8 f = 1.000, F/2.465, IH = 0.9424,
object distance = $-15.7068$ $r_1 = \infty$
  $d_1 = 0.4188$ $n_1$ (graded refractive index lens 1)
$r_2 = 0.9824$
  $d_2 = 0.3888$
$r_3 = \infty$ (stop)
  $d_3 = 0.0000$
$r_4 = 15994.9145$
  $d_4 = 2.0628$ $n_2$ (graded refractive index lens 2)
$r_5 = -1.3563$
  $d_5 = 0.6824$
$r_6 = 3.5259$
  $d_6 = 1.7066$ $n_3 = 1.58913$ $\nu_3 = 61.18$
$r_7 = \infty$ graded refractive index lens 1

| (wave length) | $N_0$ | $N_1$ | $N_2$ | $N_3$ |
|---|---|---|---|---|
| 587.56 | 1.65000 | $-0.31608 \times 10^{-1}$ | 0.00000 | 0.00000 |
| 656.28 | 1.64350 | $-0.24540 \times 10^{-1}$ | 0.00000 | 0.00000 |
| 486.13 | 1.66517 | $-0.48100 \times 10^{-1}$ | 0.00000 | 0.00000 |
| $\nu$ | 30.00000 | $0.13416 \times 10$ | 0.00000 | 0.00000 |

$d_M = 0.4188$, $r_a = \infty$, $r_b = 0.9824$, $\phi_R = 0.786$,
$\phi_M = 0.026$, $\phi_S = -0.662$, $\phi_e = -0.635$,
$\nu_e = 273.658$, $\nu_e/\nu_{0d} = 9.122$ graded refractive index lens 2

| (wave length) | $N_0$ | $N_1$ | $N_2$ | $N_3$ |
|---|---|---|---|---|
| 587.56 | 1.58913 | $-0.12601$ | $0.87539 \times 10^{-2}$ | 0.00000 |
| 656.28 | 1.58618 | $-0.12538$ | $0.87101 \times 10^{-2}$ | 0.00000 |
| 486.13 | 1.59600 | $-0.12748$ | $0.88560 \times 10^{-2}$ | 0.00000 |
|  | 60.00000 | $0.60000 \times 10^2$ | $0.60000 \times 10^2$ | 0.60000 |

$d_M = 2.0628$, $r_a + 15994.91$, $r_b = -1.3563$,

-continued

Embodiment 8

$\phi_R = 0.786$, $\phi_M = 0.520$, $\phi_S = 0.434$, $\phi_e = 0.954$,
$\nu_e = 60.000$, $N_e = 1.991$, $\nu_e/\nu_{0d} = 1.000$,
$N_e/N_{0d} = 1.253$, $\phi_e/\phi_R = 1.214$, $\phi_M/\phi_e = 0.545$

Embodiment 9 f = 1.000, F/2.580, IH = 0.9276,
object distance = $-15.4595$ $r_1 = \infty$
  $d_1 = 0.6890$ $n_1$ (graded refractive index lens 1)
$r_2 = 0.7846$
  $d_2 = 0.3817$
$r_3 = \infty$ (stop)
  $d_3 = 0.0000$
$r_4 = -8.1496$
  $d_4 = 2.0372$ $n_2$ (graded refractive index lens 2)
$r_5 = -1.3523$
  $d_5 = 0.6540$
$r_6 = 3.2784$
  $d_6 = 2.4500$ $n_3 = 1.58913$ $\nu_3 = 61.18$
$r_7 = \infty$ graded refractive index lens 1

| (wave length) | $N_0$ | $N_1$ | $N_2$ | $N_3$ |
|---|---|---|---|---|
| 587.56 | 1.65000 | $-0.28806 \times 10^{-1}$ | 0.00000 | 0.00000 |
| 656.28 | 1.64350 | $-0.23076 \times 10^{-1}$ | 0.00000 | 0.00000 |
| 486.13 | 1.66517 | $-0.42177 \times 10^{-1}$ | 0.00000 | 0.00000 |
| $\nu$ | 30.00000 | $0.15081 \times 10$ | 0.00000 | 0.00000 |

$d_M = 0.689$, $r_a = \infty$, $r_b = 0.7846$, $\phi_R = 0.767$,
$\phi_M = 0.040$, $\phi_S = -0.828$, $\phi_e = -0.789$,
$\nu_e = 609.574$, $\nu_e/\nu_{0d} = 20.319$ graded refractive index lens 2

| (wave length) | $N_0$ | $N_1$ | $N_2$ | $N_3$ |
|---|---|---|---|---|
| 587.56 | 1.58913 | $-0.10864$ | $-0.69255 \times 10^{-3}$ | 0.00000 |
| 656.28 | 1.58618 | $-0.10810$ | $-0.68909 \times 10^{-3}$ | 0.00000 |
| 486.13 | 1.59600 | $-0.10991$ | $-0.70063 \times 10^{-3}$ | 0.00000 |
| $\nu$ | 60.00000 | $0.60000 \times 10^2$ | $0.60000 \times 10^2$ | 0.00000 |

$d_M = 2.0372$, $r_a = -8.1496$, $r_b = -1.3523$,
$\phi_R = 0.767$, $\phi_M = 0.443$, $\phi_S = 0.363$, $\phi_e = 0.806$,
$\nu_e = 60.000$, $N_e = 1.995$, $\nu_e/\nu_{0d} = 1.000$,
$N_e/N_{0d} = 1.256$, $\phi_e/\phi_R = 1.051$, $\phi_M/\phi_e = 0.549$

Embodiment 10
f = 1.000, F/2.426, IH = 0.9730,
object distance = $-16.2162$ $r_1 = \infty$    $d_1 = 0.4324$    $n_1$ (graded refractive index lens 1)
$r_2 = 1.1864$    $d_2 = 0.5295$
$r_3 = \infty$ (stop)    $d_3 = 0.0000$
$r_4 = -5.3805$    $d_4 = 2.9358$    $n_2$ (graded refractive index lens 2)
$r_5 = -1.7351$ graded refractive index lens 1

| (wave length) | $N_0$ | $N_1$ | $N_2$ | $N_3$ |
|---|---|---|---|---|
| 587.56 | 1.67000 | $-0.51596 \times 10^{-1}$ | 0.00000 | 0.00000 |
| 656.28 | 1.66330 | $-0.43857 \times 10^{-1}$ | 0.00000 | 0.00000 |
| 486.13 | 1.68563 | $-0.69655 \times 10^{-1}$ | 0.00000 | 0.00000 |
| $\nu$ | 30.00000 | $0.20000 \times 10$ | 0.00000 | 0.00000 |

$d_M = 0.4324$, $r_a = \infty$, $r_b = 1.1864$, $\phi_R = 0.739$,
$\phi_M = 0.045$, $\phi_S = -0.565$, $\phi_e = -0.520$,
$\nu_e = -149.215$, $\nu_e/\nu_{0d} = -4.974$ graded refractive index lens 2

| (wave length) | $N_0$ | $N_1$ | $N_2$ | $N_3$ |
|---|---|---|---|---|
| 587.56 | 1.58913 | $-0.13144$ | $0.14756 \times 10^{-1}$ | $-0.40818 \times 10^{-2}$ |
| 656.28 | 1.58618 | $-0.13078$ | $0.14682 \times 10^{-1}$ | $-0.40614 \times 10^{-2}$ |
| 486.18 | 1.59600 | $-0.13297$ | $0.14928 \times 10^{-1}$ | $-0.41295 \times 10^{-2}$ |

-continued

| $\nu$ | 60.00000 | $0.60000 \times 10^2$ | $0.60000 \times 10^2$ | $0.60000 \times 10^2$ |

$d_M = 2.9358$, $r_a = -5.3805$, $r_b = -1.7351$,
$\phi_R = 0.739$, $\phi_M = 0.772$, $\phi_S = 0.230$, $\phi_e = 1.002$,
$\phi_e = 60.000$, $N_e = 2.224$, $\nu_e/\nu_{0d} = 1.000$,
$N_e/N_{0d} = 1.400$, $\phi_e/\phi_R = 1.356$, $\phi_M/\phi_e = 0.770$

---

Embodiment 11
f = 1.000, F/2.471, IH = 0.9444,
object distance = −15.7398

| $r_1 = \infty$ | $d_1 = 0.8000$ | $n_1$ (graded refractive index lens 1) |
|---|---|---|
| $r_2 = 1.3155$ | $d_2 = 0.3601$ | |
| $r_3 = \infty$ (stop) | $d_3 = 0.0000$ | |
| $r_4 = -3.6526$ | $d_4 = 2.7172$ | $n_2$ (graded refractive index lens 2) |
| $r_5 = -2.1371$ | | | graded refractive index lens 1

| (wave length) | $N_0$ | $N_1$ | $N_2$ | $N_3$ |
|---|---|---|---|---|
| 587.56 | 1.75000 | $-0.54000 \times 10^{-1}$ | 0.00000 | 0.00000 |
| 656.28 | 1.74250 | $-0.48600 \times 10^{-1}$ | 0.00000 | 0.00000 |
| 486.13 | 1.76750 | $-0.66600 \times 10^{-1}$ | 0.00000 | 0.00000 |
| $\nu$ | 30.00000 | $0.30000 \times 10$ | 0.00000 | 0.00000 |

$d_M = 0.8$, $r_a = \infty$, $r_b = 1.3155$, $\phi_R = 0.83$,
$\phi_M = 0.086$, $\phi_S = -0.570$, $\phi_e = -0.484$,
$\nu_e = -49.381$, $\nu_e/\nu_{0d} = -1.646$ graded refractive index lens 2

| (wave length) | $N_0$ | $N_1$ | $N_2$ | $N_3$ |
|---|---|---|---|---|
| 587.56 | 1.58913 | $-0.18660$ | $0.16009 \times 10^{-1}$ | $-0.85767 \times 10^{-2}$ |
| 656.28 | 1.58618 | $-0.18567$ | $0.15929 \times 10^{-1}$ | $-0.85338 \times 10^{-2}$ |
| 486.18 | 1.59600 | $-0.18878$ | $0.16196 \times 10^{-1}$ | $-0.86768 \times 10^{-2}$ |
| $\nu$ | 60.00000 | $0.60000 \times 10^2$ | $0.60000 \times 10^2$ | $0.60000 \times 10^2$ |

$d_M = 2.7172$, $r_a = -3.6526$, $r_b = -2.1371$,
$\phi_R = 0.83$, $\phi_M = 1.014$, $\phi_S = 0.114$, $\phi_e = 1.128$,
$\phi_e = 60.000$, $N_e = 2.383$, $\nu_e/\nu_{0d} = 1.000$,
$N_e/N_{0d} = 1.500$, $\phi_e/\phi_R = 1.360$, $\phi_M/\phi_e = 0.899$

---

Embodiment 12
f = 1.001, F/2.421, IH = 0.9688,
object distance = −16.1464

| $r_1 = \infty$ | $d_1 = 0.6459$ | $n_1$ (graded refractive index lens 1) |
|---|---|---|
| $r_2 = 0.9102$ | $d_2 = 0.6979$ | |
| $r_3 = \infty$ (stop) | $d_3 = 0.0964$ | |
| $r_4 = 12.8012$ | $d_4 = 2.3323$ | $n_2$ (graded refractive index lens 2) |
| $r_5 = -1.6770$ | $d_5 = 0.4541$ | |
| $r_6 = 2.1972$ | $d_6 = 1.1042$ | $n_3 = 1.58913$  $\nu_3 = 61.18$ |
| $r_7 = -2.0452$ | $d_7 = 1.8155$ | $n_4 = 1.84666$  $\nu_4 = 23.78$ |
| $r_8 = \infty$ | | | graded refractive index lens 1

| (wave length) | $N_0$ | $N_1$ | $N_2$ | $N_3$ |
|---|---|---|---|---|
| 587.56 | 1.67000 | $-0.49542 \times 10^{-1}$ | 0.00000 | 0.00000 |
| 656.28 | 1.66330 | $-0.46569 \times 10^{-1}$ | 0.00000 | 0.00000 |
| 486.13 | 1.68563 | $-0.56477 \times 10^{-1}$ | 0.00000 | 0.00000 |
| $\nu$ | 30.00000 | $0.50000 \times 10$ | 0.00000 | 0.00000 |

$d_M = 0.6459$, $r_a = \infty$, $r_b = 0.9102$, $\phi_R = 0.698$,
$\phi_M = 0.064$, $\phi_S = -0.736$, $\phi_e = -0.672$,
$\nu_e = 57.263$, $\nu_e/\nu_{0d} = 1.909$ graded refractive index lens 2

| (wave length) | $N_0$ | $N_1$ | $N_2$ | $N_3$ |
|---|---|---|---|---|
| 587.56 | 1.58913 | $-0.64805 \times 10^{-1}$ | $-0.56170 \times 10^{-4}$ | $-0.64285 \times 10^{-4}$ |
| 656.28 | 1.58618 | $-0.64481 \times 10^{-1}$ | $-0.55889 \times 10^{-4}$ | $-0.63963 \times 10^{-4}$ |
| 486.18 | 1.59600 | $-0.65561 \times 10^{-1}$ | $-0.56825 \times 10^{-4}$ | $-0.65035 \times 10^{-4}$ |
| $\nu$ | 60.00000 | $0.60000 \times 10^2$ | $0.60000 \times 10^2$ | $0.60000 \times 10^2$ |

$d_M = 2.3323$, $r_a = 12.8012$, $r_b = -1.677$,
$\phi_R = 0.698$, $\phi_M = 0.302$, $\phi_S = 0.397$, $\phi_e = 0.700$,
$\phi_e = 60.000$, $N_e = 1.892$, $\nu_e/\nu_{0d} = 1.000$,
$N_e/N_{0d} = 1.191$, $\phi_e/\phi_R = 1.002$, $\phi_M/\phi_e = 0.432$ Embodiment 13
f = 1.009, F/2.463, IH = 1.0066,
object distance = −16.7771

| | | |
|---|---|---|
| $r_1 = \infty$ | $d_1 = 0.8948$ | $n_1$ (graded refractive index lens 1) |
| $r_2 = 0.9693$ | $d_2 = 0.7280$ | |
| $r_3 = \infty$ (stop) | $d_3 = 0.0739$ | |
| $r_4 = 11.1017$ | $d_4 = 2.3934$ | $n_2$ (graded refractive index lens 2) |
| $r_5 = -1.6987$ | $d_5 = 0.5694$ | |
| $r_6 = 2.1751$ | $d_6 = 1.1327$ | $n_3 = 1.58913$ $\nu_3 = 61.18$ |
| $r_7 = -1.9573$ | $d_7 = 1.6244$ | $n_4 = 1.84666$ $\nu_4 = 23.78$ |
| $r_8 = \infty$ | | | graded refractive index lens 1

| (wave length) | $N_0$ | $N_1$ | $N_2$ | $N_3$ |
|---|---|---|---|---|
| 587.56 | 1.75000 | $-0.53096 \times 10^{-1}$ | 0.00000 | 0.00000 |
| 656.28 | 1.74250 | $-0.50821 \times 10^{-1}$ | 0.00000 | 0.00000 |
| 486.13 | 1.76750 | $-0.58406 \times 10^{-1}$ | 0.00000 | 0.00000 |
| $\nu$ | 30.00000 | $0.70000 \times 10$ | 0.00000 | 0.00000 |

$d_M = 0.8948$, $r_a = \infty$, $r_b = 0.9693$, $\phi_R = 0.686$,
$\phi_M = 0.095$, $\phi_S = -0.774$, $\phi_e = -0.679$,
$\nu_e = 55.555$, $\nu_e/\nu_{0d} = 1.852$ graded refractive index lens 2

| (wave length) | $N_0$ | $N_1$ | $N_2$ | $N_3$ |
|---|---|---|---|---|
| 587.56 | 1.58913 | $-0.64647 \times 10^{-1}$ | $0.11784 \times 10^{-2}$ | $-0.54876 \times 10^{-3}$ |
| 656.28 | 1.58618 | $-0.64162 \times 10^{-1}$ | $0.11607 \times 10^{-2}$ | $-0.54876 \times 10^{-3}$ |
| 486.18 | 1.59600 | $-0.65578 \times 10^{-1}$ | $0.12196 \times 10^{-2}$ | $-0.54876 \times 10^{-3}$ |
| $\nu$ | 60.00000 | $0.40000 \times 10^2$ | $0.200000 \times 10^2$ | 0.00000 |

$d_M = 2.3934$, $r_a = 11.1017$, $r_b = -1.6987$,
$\phi_R = 0.686$, $\phi_M = 0.309$, $\phi_S = 0.400$, $\phi_e = 0.709$,
$\phi_e = 49.256$, $N_e = 1.896$, $\nu_e/\nu_{0d} = 0.821$,
$N_e/N_{0d} = 1.193$, $\phi_e/\phi_R = 1.034$, $\phi_M/\phi_e = 0.436$ Embodiment 14
f = 1.000, F/2.501, IH = 0.8866,
object distance = −14.8108

| | | |
|---|---|---|
| $r_1 = \infty$ | $d_1 = 0.3950$ | $n_1$ (graded refractive index lens 1) |
| $r_2 = 1.2976$ | $d_2 = 0.4454$ | |
| $r_3 = \infty$ (stop) | $d_3 = 0.3348$ | |
| $r_4 = -6.0247$ | $d_4 = 2.8325$ | $n_2$ (graded refractive index lens 2) |
| $r_5 = -2.8686$ | $d_5 = 1.6513$ | $n_3$ (graded refractive index lens 3) |
| $r_6 = \infty$ | | | graded refractive index lens 1

| (wave length) | $N_0$ | $N_1$ | $N_2$ | $N_3$ |
|---|---|---|---|---|
| 587.56 | 1.60000 | $-0.24229 \times 10^{-1}$ | $0.12503 \times 10^{-2}$ | $-0.72126 \times 10^{-2}$ |
| 656.28 | 1.59640 | $-0.23329 \times 10^{-1}$ | $0.12378 \times 10^{-2}$ | $-0.69963 \times 10^{-2}$ |
| 486.13 | 1.60840 | $-0.26330 \times 10^{-1}$ | $0.12795 \times 10^{-2}$ | $-0.77175 \times 10^{-2}$ |
| $\nu$ | 50.00000 | $0.80737 \times 10$ | $0.30000 \times 10^2$ | $0.10000 \times 10^2$ |

$d_M = 0.395$, $r_a = \infty$, $r_b = 1.2976$, $\phi_R = 0.848$,
$\phi_M = 0.019$, $\phi_S = -0.462$, $\phi_e = -0.443$,
$\nu_e = 64.454$, $\nu_e/\nu_{0d} = 1.289$ graded refractive index lens 2

| (wave length) | $N_0$ | $N_1$ | $N_2$ | $N_3$ |
|---|---|---|---|---|
| 587.56 | 1.80000 | $-0.20622$ | $0.25537 \times 10^{-2}$ | $-0.76726 \times 10^{-3}$ |
| 656.28 | 1.79520 | $-0.20494$ | $0.25317 \times 10^{-2}$ | $-0.75960 \times 10^{-3}$ |
| 486.13 | 1.81120 | $-0.20921$ | $0.26052 \times 10^{-2}$ | $-0.78516 \times 10^{-3}$ |
| $\nu$ | 50.00000 | $0.43811 \times 10^2$ | $0.34764 \times 10^2$ | $0.30012 \times 10^2$ |

$d_M = 2.8325$, $r_a = -6.0247$, $r_b = -2.8686$,
$\phi_R = 0.848$, $\phi_M = 1.168$, $\phi_S = 0.146$, $\phi_e = 0.314$,
$\nu_e = 48.493$, $N_e = 2.975$, $\nu_e/\nu_{0d} = 0.970$,
$N_e/N_{0d} = 1.653$, $\phi_e/\phi_R = 1.550$, $\phi_M/\phi_e = 0.889$ graded refractive index lens 3

| (wave length) | $N_0$ | $N_1$ | $N_2$ | $N_3$ |
|---|---|---|---|---|
| 587.56 | 1.60000 | $0.44309 \times 10^{-1}$ | $-0.86881 \times 10^{-2}$ | $0.28040 \times 10^{-3}$ |
| 656.28 | 1.59550 | $0.40018 \times 10^{-1}$ | $-0.79162 \times 10^{-2}$ | $0.22250 \times 10^{-3}$ |
| 486.13 | 1.61050 | $0.54232 \times 10^{-1}$ | $-0.10489 \times 10^{-2}$ | $0.41549 \times 10^{-3}$ |
| $\nu$ | 40.00000 | $0.30975 \times 10$ | $0.33767 \times 10$ | $0.14529 \times 10$ |

$d_M = 1.6513$, $r_a = -2.8686$, $r_b = \infty$, $\phi_R = 0.848$,
$\phi_M = -1.463$, $\phi_S = -0.209$, $\phi_e = -1.673$,
$\nu_e = 3.501$, $N_e = 2.381$, $\nu_e/\nu_{0d} = 0.088$, $N_e/N_{0d} = 1.488$, $\phi_e/\phi_R = -1.972$, $\phi_M/\phi_e = 0.875$

Embodiment 15
f = 1.000, F/2.562, IH = 0.8507,
object distance = −14.1777

| | | | |
|---|---|---|---|
| $r_1 = \infty$ | $d_1 = 0.4726$ | $n_1 = 1.51633$ | $\nu_3 = 64.15$ |
| $r_2 = 0.8834$ | $d_2 = 0.9843$ | | |
| $r_3 = \infty$ (stop) | $d_3 = 0.0005$ | | |
| $r_4 = 75.9052$ | $d_4 = 2.1427$ | $n_2 = 1.88300$ | $\nu_2 = 40.78$ |
| $r_5 = -1.8330$ | $d_5 = 0.9286$ | | |
| $r_6 = 1.7496$ | $d_6 = 0.9992$ | $n_3 = 1.58913$ | $\nu_3 = 61.18$ |
| $r_7 = -2.2163$ | $d_7 = 1.8999$ | $n_4$ (graded refractive index lens) | |
| $r_8 = \infty$ | | | | graded refractive index lens

| (wave length) | $N_0$ | $N_1$ | $N_2$ | $N_3$ |
|---|---|---|---|---|
| 587.56 | 1.70000 | $0.21065 \times 10^{-1}$ | 0.00000 | 0.00000 |
| 656.28 | 1.69300 | $0.19760 \times 10^{-1}$ | 0.00000 | 0.00000 |
| 486.13 | 1.71633 | $0.24109 \times 10^{-1}$ | 0.00000 | 0.00000 |
| $\nu$ | 30.00000 | $0.48445 \times 10$ | 0.00000 | 0.00000 |

$d_M = 1.8999$, $r_a = -2.2163$, $r_b = \infty$, $\phi_R = 0.682$,
$\phi_M = -0.080$, $\phi_S = -0.316$, $\phi_e = -0.396$,
$\nu_e = 14.635$, $N_3 = 1.854$, $\nu_e/\nu_{0d} = 0.488$,
$N_e/N_{0d} = 1.091$, $\phi_e/\phi_R = -0.580$, $\phi_M/\phi_e = 0.202$

Embodiment 16
f = 1.000, F/2.564, IH = 0.8619,
object distance = −14.3644

| | | | |
|---|---|---|---|
| $r_1 = \infty$ | $d_1 = 0.4788$ | $n_1 = 1.51633$ | $\nu_3 = 64.15$ |
| $r_2 = 0.8472$ | $d_2 = 0.9965$ | | |
| $r_3 = \infty$ (stop) | $d_3 = 0.0005$ | | |
| $r_4 = 26.5236$ | $d_4 = 2.1714$ | $n_2 = 1.88300$ | $\nu_2 = 40.78$ |
| $r_5 = -1.8782$ | $d_5 = 0.9420$ | | |
| $r_6 = 1.7877$ | $d_6 = 1.0068$ | $n_3 = 1.58913$ | $\nu_3 = 61.18$ |
| $r_7 = -2.1138$ | $d_7 = 1.8719$ | $n_4$ (graded refractive index lens) | |
| $r_8 = \infty$ | | | | graded refractive index lens

| (wave length) | $N_0$ | $N_1$ | $N_2$ | $N_3$ |
|---|---|---|---|---|
| 587.56 | 1.65000 | $0.29376 \times 10^{-1}$ | 0.00000 | 0.00000 |
| 656.28 | 1.64350 | $0.28197 \times 10^{-1}$ | 0.00000 | 0.00000 |
| 486.13 | 1.66517 | $0.32128 \times 10^{-1}$ | 0.00000 | 0.00000 |
| $\nu$ | 30.00000 | $0.74715 \times 10$ | 0.00000 | 0.00000 |

$d_M = 1.8719$, $r_a = -2.1138$, $r_b = \infty$, $\phi_R = 0.68$,
$\phi_M = -0.110$, $\phi_S = -0.308$, $\phi_e = -0.417$,
$\nu_e = 16.719$, $N_e = 1.841$, $\nu_e/\nu_{0d} = 0.557$,
$N_e/N_{0d} = 1.116$, $\phi_e/\phi_R = -0.614$, $\phi_M/\phi_e = 0.263$

Embodiment 17
f = 1.000, F/2.489, IH = 0.9250,
object distance = −15.4162

| | | | |
|---|---|---|---|
| $r_1 = \infty$ | $d_1 = 0.4111$ | $n_1 = 1.51633$ | $\nu_1 = 64.15$ |
| $r_2 = 0.8742$ | $d_2 = 0.5999$ | | |
| $r_3 = \infty$ (stop) | $d_3 = 0.2936$ | | |
| $r_4 = -5.2559$ | $d_4 = 2.9469$ | $n_2$ (graded refractive index lens 1) | |
| $r_5 = -2.6604$ | $d_5 = 1.4602$ | $n_3$ (graded refractive index lens 2) | |
| $r_6 = -4.6635$ | | | | graded refractive index lens 1

| (wave length) | $N_0$ | $N_1$ | $N_2$ | $N_3$ |
|---|---|---|---|---|
| 587.56 | 1.58913 | −0.19231 | $-0.43672 \times 10^{-6}$ | 0.00000 |
| 656.28 | 1.58618 | −0.19111 | $-0.43394 \times 10^{-6}$ | 0.00000 |
| 486.13 | 1.59600 | −0.19512 | $-0.44323 \times 10^{-6}$ | 0.00000 |
| $\nu$ | 60.00000 | $0.47898 \times 10^2$ | $0.47000 \times 10^2$ | 0.00000 |

$d_M = 2.9469$, $r_a = -5.2559$, $r_b = -2.6604$,
$\phi_R = 0.72$, $\phi_M = 1.133$, $\phi_S = 0.109$, $\phi_e = 1.243$,
$\nu_e = 48.763$, $N_e = 2.401$, $\nu_e/\nu_{0d} = 0.813$,
$N_e/N_{0d} = 1.511$, $\phi_e/\phi_R = 1.726$, $\phi_M/\phi_e = 0.912$ -continued

| | | graded refractive index lens 2 | | |
|---|---|---|---|---|
| (wave length) | $N_0$ | $N_1$ | $N_2$ | $N_3$ |
| 587.56 | 1.60000 | $0.59309 \times 10^{-1}$ | $0.93537 \times 10^{-5}$ | 0.00000 |
| 656.28 | 1.59550 | $0.55834 \times 10^{-1}$ | $0.88242 \times 10^{-5}$ | 0.00000 |
| 486.18 | 1.61050 | $0.67419 \times 10^{-1}$ | $0.10589 \times 10^{-4}$ | 0.00000 |
| $\nu$ | 40.00000 | $0.51195 \times 10$ | $0.53000 \times 10$ | 0.00000 |

$d_M = 1.4602, r_a = -2.6604, r_b = -4.6635,$
$\phi_R = 0.72, \phi_M = -0.173, \phi_S = -0.097, \phi_e = -0.270,$
$\phi_e = 7.287, N_e = 2.107, \nu_e/\nu_{0d} = 0.243,$
$N_e/N_{0d} = 1.317, \phi_e/\phi_R = -0.375, \phi_M/\phi_e = 0.641$

Embodiment 18
f = 1.000, F/2.464, IH = 0.8851,
object distance = −14.7509

| | | | |
|---|---|---|---|
| $r_1 = \infty$ | $d_1 = 0.3934$ | $n_1 = 1.51633$ | $\nu_1 = 64.15$ |
| $r_2 = 1.1106$ | $d_2 = 0.4598$ | | |
| $r_3 = \infty$ (stop) | $d_3 = 0.3388$ | | |
| $r_4 = -6.2999$ | $d_4 = 2.8251$ | $n_2$ (graded refractive index lens 1) | |
| $r_5 = -2.7975$ | $d_5 = 1.6187$ | $n_3$ (graded refractive index lens 2) | |
| $r_6 = \infty$ | | | |

| | | graded refractive index lens 1 | | |
|---|---|---|---|---|
| (wave length) | $N_0$ | $N_1$ | $N_2$ | $N_3$ |
| 587.56 | 1.70000 | −0.20740 | $0.23897 \times 10^{-2}$ | $-0.39010 \times 10^{-3}$ |
| 656.28 | 1.69618 | −0.20626 | $0.23635 \times 10^{-2}$ | $-0.38803 \times 10^{-3}$ |
| 486.13 | 1.70891 | −0.21007 | $0.24509 \times 10^{-2}$ | $-0.39491 \times 10^{-3}$ |
| $\nu$ | 55.00000 | $0.54492 \times 10^2$ | $0.27337 \times 10^2$ | $0.56755 \times 10^2$ |

$d_M = 2.8251, r_a = -6.2999, r_b = -2.7975,$
$\phi_R = 0.833, \phi_M = 1.172, \phi_S = 0.139, \phi_e = 1.311,$
$\nu_e = 54.545, N_e = 2.690, \nu_e/\nu_{0d} = 0.992,$
$N_e/N_{0d} = 1.582, \phi_e/\phi_R = 1.574, \phi_M/\phi_e = 0.894$

| | | graded refractive index lens 2 | | |
|---|---|---|---|---|
| (wave length) | $N_0$ | $N_1$ | $N_2$ | $N_3$ |
| 587.56 | 1.60000 | $0.42094 \times 10^{-1}$ | $-0.98469 \times 10^{-2}$ | $0.74697 \times 10^{-4}$ |
| 656.28 | 1.59550 | $0.38324 \times 10^{-1}$ | $-0.89978 \times 10^{-2}$ | $0.64212 \times 10^{-4}$ |
| 486.18 | 1.61050 | $0.50891 \times 10^{-1}$ | $-0.11828 \times 10^{-1}$ | $0.99162 \times 10^{-4}$ |
| $\nu$ | 40.00000 | $0.33494 \times 10$ | $0.34788 \times 10$ | $0.21373 \times 10$ |

$d_M = 1.6187, r_a = -2.7975, r_b = \infty, \phi_R = 0.833,$
$\phi_M = -0.136, \phi_S = -0.214, \phi_e = -0.351,$
$\nu_e = 7.617, N_e = 1.873, \nu_e/\nu_{0d} = 0.190,$
$N_e/N_{0d} = 1.171, \phi_e/\phi_R = -0.421, \phi_M/\phi_e = 0.389$

Embodiment 19
f = 1.000, F/2.493, IH = 0.8931,
object distance = −14.8848

$r_1 = \infty$
$\quad d_1 = 0.3969 \quad n_1 = 1.51633 \quad \nu_1 = 64.15$
$r_2 = 1.1977$
$\quad d_2 = 0.4552$
$r_3 = \infty$ (stop)
$\quad d_3 = 0.3363$
$r_4 = -5.8956$
$\quad d_4 = 2.8473 \quad n_2$ (graded refractive index lens 1)
$r_5 = -2.8493$
$\quad d_5 = 1.6353 \quad n_3$ (graded refractive index lens 2)
$r_6 = \infty$

| | | graded refractive index lens 1 | | |
|---|---|---|---|---|
| (wave length) | $N_0$ | $N_1$ | $N_2$ | $N_3$ |
| 587.56 | 1.80000 | −0.20467 | $0.23281 \times 10^{-2}$ | $-0.56073 \times 10^{-3}$ |
| 656.28 | 1.79520 | −0.20338 | $0.23080 \times 10^{-2}$ | $-0.55512 \times 10^{-3}$ |
| 486.13 | 1.81120 | −0.20769 | $0.23749 \times 10^{-2}$ | $-0.57381 \times 10^{-3}$ |
| $\nu$ | 50.00000 | $0.47518 \times 10^2$ | $0.34764 \times 10^2$ | $0.30012 \times 10^2$ |

$d_M = 2.8473, \quad r_a = -5.8956, \quad r_b = -2.8493,$
$\phi_R = 0.844, \quad \phi_M = 1.166, \quad \phi_S = 0.145, \quad \phi_e = 1.311,$
$\nu_e = 47.781, \quad N_e = 2.976, \quad \nu_e/\nu_{0d} = 0.956,$
$N_e/N_{0d} = 1.654, \quad \phi_e/\phi_R = 1.553, \quad \phi_M/\phi_e = 0.889$ graded refractive index lens 2

Embodiment 19

| (wave length) | $N_0$ | $N_1$ | $N_2$ | $N_3$ |
|---|---|---|---|---|
| 587.56 | 1.60000 | $0.43667 \times 10^{-1}$ | $-0.86348 \times 10^{-2}$ | $0.20563 \times 10^{-3}$ |
| 656.28 | 1.59550 | $0.39517 \times 10^{-1}$ | $-0.78676 \times 10^{-2}$ | $0.16317 \times 10^{-3}$ |
| 486.13 | 1.61050 | $0.53350 \times 10^{-1}$ | $-0.10425 \times 10^{-1}$ | $0.30470 \times 10^{-3}$ |
| $\nu$ | 40.00000 | $0.31567 \times 10$ | $0.33767 \times 10$ | $0.14529 \times 10$ |

$d_M = 1.6353$, $r_a = -2.8493$, $r_b = \infty$, $\phi_R = 0.844$,
$\phi_M = -0.143$, $\phi_S = -0.211$, $\phi_e = -0.353$,
$\nu_e = 6.997$, $N_e = 1.886$, $\nu_e/\nu_{0d} = 0.175$,
$N_e/N_{0d} = 1.179$, $\phi_e/\phi_R = -0.419$, $\phi_M/\phi_e = 0.404$

Embodiment 20

$f = 1.000$, $F/2.458$, $IH = 0.9100$,
object distance $= -15.1668$ $r_1 = \infty$
  $d_1 = 0.4044$    $n_1 = 1.51633$    $\nu_1 = 64.15$
$r_2 = 0.9438$
  $d_2 = 0.5741$
$r_3 = \infty$ (stop)
  $d_3 = 0.3096$
$r_4 = -5.4836$
  $d_4 = 2.8977$    $n_2$ (graded refractive index lens 1)
$r_5 = -2.4791$
  $d_5 = 1.3433$    $n_3$ (graded refractive index lens 2)
$r_6 = -1.6038$
  $d_6 = 0.3992$    $n_4 = 1.51633$    $\nu_4 = 64.15$
$r_7 = \infty$ graded refractive index lens 1

| (wave length) | $N_0$ | $N_1$ | $N_2$ | $N_3$ |
|---|---|---|---|---|
| 587.56 | 1.58913 | $-0.19903$ | $0.86893 \times 10^{-4}$ | 0.00000 |
| 656.28 | 1.58618 | $-0.19778$ | $0.86338 \times 10^{-4}$ | 0.00000 |
| 486.13 | 1.59600 | $-0.20194$ | $0.88187 \times 10^{-4}$ | 0.00000 |
| $\nu$ | 60.00000 | $0.47866 \times 10^2$ | $0.47000 \times 10^2$ | 0.00000 |

$d_M = 2.8977$, $r_a = -5.4836$, $r_b = -2.4791$,
$\phi_R = 0.765$, $\phi_M = 1.153$, $\phi_S = 0.130$, $\phi_e = 1.284$,
$\nu_e = 48.868$, $N_e = 2.383$, $\nu_e/\nu_{0d} = 0.814$,
$N_e/N_{0d} = 1.500$, $\phi_e/\phi_R = 1.678$, $\phi_M/\phi_e = 0.899$ graded refractive index lens 2

| (wave length) | $N_0$ | $N_1$ | $N_2$ | $N_3$ |
|---|---|---|---|---|
| 587.56 | 1.60000 | $0.55214 \times 10^{-1}$ | $0.57765 \times 10^{-5}$ | 0.00000 |
| 656.28 | 1.59550 | $0.50909 \times 10^{-1}$ | $0.54495 \times 10^{-5}$ | 0.00000 |
| 486.13 | 1.61050 | $0.65260 \times 10^{-1}$ | $0.65394 \times 10^{-5}$ | 0.00000 |
| $\nu$ | 40.00000 | $0.38474 \times 10$ | $0.53000 \times 10$ | 0.00000 |

$d_M = 1.3433$, $r_a = -2.4791$, $r_b = -1.6038$,
$\phi_R = 0.765$, $\phi_M = -0.148$, $\phi_S = 0.132$, $\phi_e = -0.016$,
$\nu_e = 0.461$, $N_e = -0.660$, $\nu_e/\nu_{0d} = 0.012$,
$\phi_e/\phi_R = -0.021$, $\phi_M/\phi_e = 9.129$

Embodiment 21

$f = 1.000$, $F/2.516$, $IH = 0.8958$,
object distance $= -14.9302$ $r_1 = \infty$
  $d_1 = 0.3981$    $n_1$ (graded refractive index lens 1)
$r_2 = 1.3690$
  $d_2 = 0.4456$
$r_3 = \infty$ (stop)
  $d_3 = 0.3367$
$r_4 = -6.0264$
  $d_4 = 2.8546$    $n_2$ (graded refractive index lens 2)
$r_5 = -2.8839$
  $d_5 = 1.6783$    $n_3$ (graded refractive index lens 3)
$r_6 = \infty$ graded refractive index lens 1

| (wave length) | $N_0$ | $N_1$ | $N_2$ | $N_3$ |
|---|---|---|---|---|
| 587.56 | 1.70000 | $-0.35603 \times 10^{-1}$ | $0.12097 \times 10^{-2}$ | $-0.68733 \times 10^{-2}$ |
| 656.28 | 1.69300 | $-0.34315 \times 10^{-1}$ | $0.11976 \times 10^{-2}$ | $-0.66671 \times 10^{-2}$ |
| 486.13 | 1.71633 | $-0.38609 \times 10^{-1}$ | $0.12379 \times 10^{-2}$ | $-0.73544 \times 10^{-2}$ |
| $\nu$ | 30.00000 | $0.82922 \times 10$ | $0.30000 \times 10^2$ | $0.10000 \times 10^2$ |

$d_M = 0.3981$, $r_a = \infty$, $r_b = 1.369$, $\phi_R = 0.841$,
$\phi_M = 0.028$, $\phi_S = -0.511$, $\phi_e = -0.483$, $\nu_e = 35.446$,

-continued

Embodiment 21

$N_e = 1.660$, $\quad \nu_e/\nu_{0d} = 1.182$, $\quad N_e/N_{0d} = 0.976$,
$\phi_e/\phi_R = -0.574$, $\quad \phi_M/\phi_e = -0.059$ graded refractive index lens 2

| (wave length) | $N_0$ | $N_1$ | $N_2$ | $N_3$ |
|---|---|---|---|---|
| 587.56 | 1.80000 | $-0.20254$ | $0.25698 \times 10^{-2}$ | $-0.73117 \times 10^{-3}$ |
| 656.28 | 1.79520 | $-0.20128$ | $0.25476 \times 10^{-2}$ | $-0.72387 \times 10^{-3}$ |
| 486.13 | 1.81120 | $-0.20548$ | $0.26215 \times 10^{-2}$ | $-0.74823 \times 10^{-3}$ |
| $\nu$ | 50.00000 | $0.48311 \times 10^2$ | $0.34764 \times 10^2$ | $0.30012 \times 10^2$ |

$d_M = 2.8546$, $\quad r_a = -6.0264$, $\quad r_b = -2.8839$,
$\phi_R = 0.841$, $\quad \phi_M = 1.156$, $\quad \phi_S = 0.145$, $\quad \phi_e = 1.301$,
$\nu_e = 48.493$, $\quad N_e = 2.975$, $\quad \nu_e/\nu_{0d} = 0.970$,
$N_e/N_{0d} = 1.653$, $\quad \phi_e/\phi_R = 1.547$, $\quad \phi_M/\phi_e = 0.889$ graded refractive index lens 3

| (wave length) | $N_0$ | $N_1$ | $N_2$ | $N_3$ |
|---|---|---|---|---|
| 587.56 | 1.60000 | $0.44195 \times 10^{-1}$ | $-0.80293 \times 10^{-2}$ | $0.26720 \times 10^{-3}$ |
| 656.28 | 1.59550 | $0.39923 \times 10^{-1}$ | $-0.73160 \times 10^{-2}$ | $0.21203 \times 10^{-3}$ |
| 486.13 | 1.61050 | $0.54162 \times 10^{-1}$ | $-0.96938 \times 10^{-2}$ | $0.39594 \times 10^{-3}$ |
| $\nu$ | 40.00000 | $0.31039 \times 10$ | $0.33767 \times 10$ | $0.14529 \times 10$ |

$d_M = 1.6783$, $\quad r_a = -2.8839$, $\quad r_b = \infty$, $\quad \phi_R = 0.841$,
$\phi_M = -0.148$, $\quad \phi_s = -0.208$, $\quad \phi_e = -0.356$, $\quad \nu_e = 6.725$,
$N_e = 1.896$, $\quad \nu_e/\nu_{0d} = 0.168$, $\quad N_e/N_{0d} = 1.185$,
$\phi_e/\phi_R = -0.424$, $\quad \phi_M/\phi_e = 0.416$

Embodiment 22

$f = 1.000$, $F/2.508$, $IH = 0.9240$,
object distance $= -15.4004$

| | | | |
|---|---|---|---|
| $r_1 = \infty$ | | | |
| | $d_1 = 0.4107$ | $n_1 = 1.51633$ | $\nu_1 = 64.15$ |
| $r_2 = 0.7938$ | | | |
| | $d_2 = 0.5166$ | | |
| $r_3 = \infty$ (stop) | | | |
| | $d_3 = 0.0000$ | | |
| $r_4 = -16.5987$ | | | |
| | $d_4 = 2.0619$ | $n_2$ (graded refractive index lens) | |
| $r_5 = -1.4540$ | | | |
| | $d_5 = 0.6360$ | | |
| $r_6 = 3.1075$ | | | |
| | $d_6 = 2.1941$ | $n_3 = 1.58913$ | $\nu_3 = 61.18$ |
| $r_7 = \infty$ | | | | graded refractive index lens

| (wave length) | $N_0$ | $N_1$ | $N_2$ | $N_3$ |
|---|---|---|---|---|
| 587.56 | 1.58913 | $-0.10622$ | $-0.75321 \times 10^{-3}$ | 0.00000 |
| 656.28 | 1.58618 | $-0.10569$ | $-0.74944 \times 10^{-3}$ | 0.00000 |
| 486.13 | 1.59600 | $-0.10746$ | $-0.76199 \times 10^{-3}$ | 0.00000 |
| $\nu$ | 60.00000 | $0.60000 \times 10^2$ | $0.60000 \times 10^2$ | 0.00000 |

$d_M = 2.0619$, $\quad r_a = -16.5987$, $\quad r_b = -1.454$,
$\phi_R = 0.748$, $\quad \phi_M = 0.438$, $\quad \phi_S = 0.370$, $\quad \phi_e = 0.808$,
$\nu_e = 60.000$, $\quad N_e = 1.989$, $\quad \nu_e/\nu_{0d} = 1.000$,
$N_e/N_{0d} = 1.252$, $\quad \phi_e/\phi_R = 1.080$, $\quad \phi_M/\phi_e = 0.542$

Embodiment 23

$f = 1.000$, $F/2.419$, $IH = 0.9336$,
object distance $= -15.5602$

| | | | |
|---|---|---|---|
| $r_1 = \infty$ | | | |
| | $d_1 = 0.4149$ | $n_1 = 1.51633$ | $\nu_1 = 64.15$ |
| $r_2 = 0.8486$ | | | |
| | $d_2 = 0.8113$ | | |
| $r_3 = \infty$ (stop) | | | |
| | $d_3 = 0.00000$ | | |
| $r_4 = -55.8404$ | | | |
| | $d_4 = 2.1747$ | $n_2$ (graded refractive index lens 1) | |
| $r_5 = -1.6947$ | | | |
| | $d_5 = 0.3192$ | | |
| $r_6 = 7.3237$ | | | |
| | $d_6 = 2.7851$ | $n_3$ (graded refractive index lens 2) | |
| $r_7 = \infty$ | | | | graded refractive index lens 1

| (wave length) | $N_0$ | $N_1$ | $N_2$ | $N_3$ |
|---|---|---|---|---|

-continued

Embodiment 23

| | | | | |
|---|---|---|---|---|
| 587.56 | 1.58913 | $-0.95019 \times 10^{-1}$ | 0.00000 | 0.00000 |
| 656.28 | 1.58618 | $-0.94544 \times 10^{-1}$ | 0.00000 | 0.00000 |
| 486.13 | 1.59600 | $-0.96128 \times 10^{-1}$ | 0.00000 | 0.00000 |
| $\nu$ | 60.00000 | $0.60000 \times 10^2$ | 0.00000 | 0.00000 |

$d_M = 2.1747$, $r_a = -55.8404$, $r_b = -1.6947$,
$\phi_R = 0.662$, $\phi_M = 0.413$, $\phi_S = 0.337$, $\phi_e = 0.750$,
$\nu_e = 60.000$, $N_e = 1.997$, $\nu_e/\nu_{0d} = 1.000$,
$N_e/N_{0d} = 1.257$, $\phi_e/\phi_R = 1.133$, $\phi_M/\phi_e = 0.551$ graded refractive index lens 2

| (wave length) | $N_0$ | $N_1$ | $N_2$ | $N_3$ |
|---|---|---|---|---|
| 587.56 | 1.58913 | $-0.25906 \times 10^{-1}$ | 0.00000 | 0.00000 |
| 656.28 | 1.58618 | $-0.25777 \times 10^{-1}$ | 0.00000 | 0.00000 |
| 486.13 | 1.59600 | $-0.26209 \times 10^{-1}$ | 0.00000 | 0.00000 |
| $\nu$ | 60.00000 | $0.60000 \times 10^2$ | 0.00000 | 0.00000 |

$d_M = 2.7851$, $r_a = 7.3237$, $r_b = \infty$, $\phi_R = 0.662$,
$\phi_M = 0.144$, $\phi_S = 0.080$, $\phi_e = 0.225$, $\nu_e = 60.000$,
$N_e = 2.086$, $\nu_e/\nu_{0d} = 1.000$, $N_e/N_{0d} = 1.312$,
$\phi_e/\phi_R = 0.339$, $\phi_M/\phi_e = 0.642$

Embodiment 24 f = 1.000, F/2.500, IH = 0.9524,
object distance = −15.8730

$r_1 = \infty$
$\quad d_1 = 0.4233 \quad n_1 = 1.51633 \quad \nu_1 = 64.15$
$r_2 = 0.8596$
$\quad d_2 = 0.4585$
$r_3 = \infty$ (stop)
$\quad d_3 = 0.0000$
$r_4 = -5.3730$
$\quad d_4 = 2.8996 \quad n_2$ (graded refractive index lens)
$r_5 = -1.7177$ graded refractive index lens

| (wave length) | $N_0$ | $N_1$ | $N_2$ | $N_3$ |
|---|---|---|---|---|
| 587.56 | 1.58913 | $-0.12950$ | $0.87158 \times 10^{-2}$ | $-0.16842 \times 10^{-2}$ |
| 656.28 | 1.58618 | $-0.12885$ | $0.86722 \times 10^{-2}$ | $-0.16757 \times 10^{-2}$ |
| 486.13 | 1.59600 | $-0.13101$ | $0.88175 \times 10^{-2}$ | $-0.17038 \times 10^{-2}$ |
| $\nu$ | 60.00000 | $0.60000 \times 10^2$ | $0.60000 \times 10^2$ | $0.60000 \times 10^2$ |

$d_M = 2.8996$, $r_a = -5.373$, $r_b = -1.7177$,
$\phi_R = 0.736$, $\phi_M = 0.751$, $\phi_S = 0.233$, $\phi_e = 0.984$,
$\nu_e = 60.000$, $N_e = 2.216$, $\nu_e/\nu_{0d} = 1.000$,
$N_e/N_{0d} = 1.394$, $\phi_e/\phi_R = 1.337$, $\phi_M/\phi_e = 0.763$

Embodiment 25 f = 1.000, F/2.511, IH = 0.9464,
object distance = −15.7729

$r_1 = \infty$
$\quad d_1 = 0.4206 \quad n_1 = 1.51633 \quad \nu_1 = 64.15$
$r_2 = 0.7425$
$\quad d_2 = 0.5256$
$r_3 = \infty$ (stop)
$\quad d_3 = 0.0000$
$r_4 = -22.5089$
$\quad d_4 = 2.1125 \quad n_2$ (graded refractive index lens)
$r_5 = -1.5555$
$\quad d_5 = 0.9786$
$r_6 = 2.3620$
$\quad d_6 = 0.7653 \quad n_3 = 1.58913 \quad \nu_3 = 61.18$
$r_7 = -2.6288$
$\quad d_7 = 1.0652 \quad n_4 = 1.84666 \quad \nu_4 = 23.78$
$r_8 = \infty$ graded refractive index lens

| (wave length) | $N_0$ | $N_1$ | $N_2$ | $N_3$ |
|---|---|---|---|---|
| 587.56 | 1.58913 | $-0.11920$ | $-0.69327 \times 10^{-2}$ | 0.00000 |
| 656.28 | 1.58618 | $-0.11860$ | $-0.68981 \times 10^{-2}$ | 0.00000 |
| 486.13 | 1.59600 | $-0.12059$ | $-0.70136 \times 10^{-2}$ | 0.00000 |
| $\nu$ | 60.00000 | $0.60000 \times 10^2$ | $0.60000 \times 10^2$ | 0.00000 |

$d_M = 2.1125$, $r_a = -22.5089$, $r_b = -1.5555$,
$\phi_R = 0.74$, $\phi_M = 0.504$, $\phi_S = 0.353$, $\phi_e = 0.856$,
$\nu_e = 60.000$, $N_e = 2.032$, $\nu_e/\nu_{0d} = 1.000$, -continued

Embodiment 25

$N_e/N_{0d} = 1.279$, $\phi_e/\phi_R = 1.157$, $\phi_M/\phi_e = 0.588$

Embodiment 26 f = 1.000, F/2.508, IH = 0.9009,
object distance = −15.0150

| | | | |
|---|---|---|---|
| $r_1 = \infty$ | | | |
| | $d_1 = 0.4004$ | $n_1 = 1.51633$ | $\nu_1 = 64.15$ |
| $r_2 = 0.7119$ | | | |
| | $d_2 = 0.9118$ | | |
| $r_3 = \infty$ (stop) | | | |
| | $d_3 = 0.0000$ | | |
| $r_4 = 4.7744$ | | | |
| | $d_4 = 2.1961$ | $n_2$ (graded refractive index lens) | |
| $r_5 = -1.0211$ | | | |
| | $d_5 = 0.1502$ | $n_3 = 1.84666$ | $\nu_3 = 23.78$ |
| $r_6 = -2.1650$ | | | |
| | $d_6 = 0.3532$ | | |
| $r_7 = 2.0145$ | | | |
| | $d_7 = 2.5116$ | $n_4 = 1.51633$ | $\nu_4 = 64.15$ |
| $r_8 = \infty$ | | | | graded refractive index lens

| (wave length) | $N_0$ | $N_1$ | $N_2$ | $N_3$ |
|---|---|---|---|---|
| 587.56 | 1.58913 | −0.10709 | −0.33719 × 10$^{-1}$ | −0.57394 × 10$^{-1}$ |
| 656.28 | 1.58618 | −0.10629 | −0.33382 × 10$^{-1}$ | −0.56533 × 10$^{-1}$ |
| 486.13 | 1.59600 | −0.10897 | −0.34506 × 10$^{-1}$ | −0.59403 × 10$^{-1}$ |
| $\nu$ | 60.00000 | 0.40000 × 10$^2$ | 0.30000 × 10$^2$ | 0.20000 × 10$^2$ |

$d_M = 2.1961$, $r_a = 4.7744$, $r_b = -1.0211$,
$\phi_R = 0.649$, $\phi_M = 0.470$, $\phi_S = 0.700$, $\phi_e = 1.171$,
$\nu_e = 49.963$, $N_e = 1.867$, $\nu_e/\nu_{0d} = 0.833$,
$N_e/N_{0d} = 1.175$, $\phi_e/\phi_R = 1.804$, $\phi_M/\phi_e = 0.402$

Embodiment 27 f = 1.000, F/2.458, IH = 0.9202,
object distance = −15.3374

| | | | |
|---|---|---|---|
| $r_1 = \infty$ | | | |
| | $d_1 = 0.4090$ | $n_1 = 1.51633$ | $\nu_1 = 64.15$ |
| $r_2 = 0.8584$ | | | |
| | $d_2 = 0.6281$ | | |
| $r_3 = \infty$ (stop) | | | |
| | $d_3 = 0.1633$ | | |
| $r_4 = -3.9373$ | | | |
| | $d_4 = 2.9962$ | $n_2$ (graded refractive index lens 1) | |
| $r_5 = -2.6541$ | | | |
| | $d_5 = 1.4374$ | $n_3$ (graded refractive index lens 2) | |
| $r_6 = -3.9683$ | | | | graded refractive index lens 1

| (wave length) | $N_0$ | $N_1$ | $N_2$ | $N_3$ |
|---|---|---|---|---|
| 587.56 | 1.58913 | −0.19338 | −0.10122 × 10$^{-4}$ | 0.00000 |
| 656.28 | 1.58618 | −0.19217 | −0.10122 × 10$^{-4}$ | 0.00000 |
| 486.13 | 1.59600 | −0.19621 | −0.10122 × 10$^{-4}$ | 0.00000 |
| $\nu$ | 60.00000 | 0.47883 × 10$^2$ | 0.00000 | 0.00000 |

$d_M = 2.9962$, $r_a = -3.9373$, $r_b = -2.6541$,
$\phi_R = 0.714$, $\phi_M = 1.159$, $\phi_S = 0.072$, $\phi_e = 1.231$,
$\nu_e = 48.458$, $N_e = 2.441$, $\nu_e/\nu_{0d} = 0.808$,
$N_e/N_{0d} = 1.536$, $\phi_e/\phi_R = 1.724$, $\phi_M/\phi_e = 0.941$ graded refractive index lens 2

| (wave length) | $N_0$ | $N_1$ | $N_2$ | $N_3$ |
|---|---|---|---|---|
| 587.56 | 1.60000 | 0.54940 × 10$^{-1}$ | −0.99324 × 10$^{-6}$ | 0.00000 |
| 656.28 | 1.59550 | 0.51849 × 10$^{-1}$ | −0.99324 × 10$^{-6}$ | 0.00000 |
| 486.13 | 1.61050 | 0.62152 × 10$^{-1}$ | −0.99324 × 10$^{-6}$ | 0.00000 |
| $\nu$ | 40.00000 | 0.53323 × 10 | 0.00000 | 0.00000 |

$d_M = 1.4374$, $r_a = -2.6541$, $r_b = -3.9683$,
$\phi_R = 0.714$, $\phi_M = -0.158$, $\phi_S = -0.075$, $\phi_e = -0.233$,
$\nu_e = 7.393$, $N_e = 2.146$, $\nu_e/\nu_{0d} = 0.185$,
$N_e/N_{0d} = 1.341$, $\phi_e/\phi_R = -0.326$, $\phi_M/\phi_e = 0.678$

Embodiment 28
f = 1.000, F/2.516, IH = 0.9091,
object distance = −15.1515

| | | | |
|---|---|---|---|
| $r_1 = \infty$ | | | |
| | $d_1 = 0.4040$ | $n_1 = 1.51633$ | $\nu_1 = 64.15$ |
| $r_2 = 1.0932$ | | | |
| | $d_2 = 0.5706$ | | |
| $r_3 = \infty$ (stop) | | | |
| | $d_3 = 0.3179$ | | |
| $r_4 = -6.1292$ | | | |
| | $d_4 = 2.9043$ | $n_2$ = (graded refractive index lens 1) | |
| $r_5 = -2.5847$ | | | |
| | $d_5 = 1.4989$ | $n_3$ = (graded refractive index lens 2) | |
| $r_6 = \infty$ | | | | graded refrative index lens 1

| (wave length) | $N_0$ | $N_1$ | $N_2$ | $N_3$ |
|---|---|---|---|---|
| 587.56 | 1.58913 | −0.20056 | $0.15606 \times 10^2$ | $0.34841 \times 10^{-4}$ |
| 656.28 | 1.58618 | −0.19955 | $0.15507 \times 10^{-2}$ | $0.34579 \times 10^{-4}$ |
| 486.13 | 1.59600 | −0.20292 | $0.15839 \times 10^{-2}$ | $0.35450 \times 10^{-4}$ |
| $\nu$ | 60.00000 | $0.59491 \times 10^2$ | $0.47000 \times 10^2$ | $0.40000 \times 10^2$ |

$d_M = 2.9043$, $r_a = -6.1292$, $r_b = -2.5847$,
$\phi_R = 0.799$, $\phi_M = 1.165$, $\phi_S = 0.132$, $\phi_e = 1.297$,
$\nu_e = 59.542$, $N_e = 2.383$, $\nu_e/\nu_{0d} = 0.992$,
$N_e/N_{0d} = 1.499$, $\phi_e/\phi_R = 1.623$, $\phi_M/\phi_e = 0.898$ graded refractive index lens 2

| (wave length) | $N_0$ | $N_1$ | $N_2$ | $N_3$ |
|---|---|---|---|---|
| 587.56 | 1.60000 | $0.41751 \times 10^{-1}$ | $-0.82240 \times 10^{-2}$ | $-0.14197 \times 10^{-3}$ |
| 656.28 | 1.59550 | $0.38456 \times 10^{-1}$ | $-0.81623 \times 10^{-2}$ | $-0.13132 \times 10^{-3}$ |
| 486.13 | 1.61050 | $0.49440 \times 10^{-1}$ | $-0.83679 \times 10^{-2}$ | $-0.16682 \times 10^{-3}$ |
| $\nu$ | 40.00000 | $0.38011 \times 10$ | $0.40000 \times 10^2$ | $0.40000 \times 10$ |

$d_M = 1.4989$, $r_a = -2.5847$, $r_b = \infty$, $\phi_R = 0.799$,
$\phi_M = -0.125$, $\phi_S = -0.232$, $\phi_e = -0.357$, $\nu_e = 9.225$,
$N_e = 1.842$, $\nu_e/\nu_{0d} = 0.231$, $N_eN_{0d} = 1.151$,
$\phi_e\phi_R = -0.447$, $\phi_M/\phi_e = 0.350$

Embodiment 29
f = 1.000, F/2.453, IH = 1.0345,
object distance = −17.2414

| | | | |
|---|---|---|---|
| $r_1 = \infty$ | | | |
| | $d_1 = 0.4023$ | $n_1 = 1.84666$ | $\nu_1 = 23.78$ |
| $r_2 = -5.6322$ | | | |
| | $d_2 = 0.4023$ | $n_2 = 1.51633$ | $\nu_2 = 64.15$ |
| $r_3 = 0.8717$ | | | |
| | $d_3 = 0.6060$ | | |
| $r_4 = \infty$ (stop) | | | |
| | $d_4 = 0.0000$ | | |
| $r_5 = -6.2112$ | | | |
| | $d_5 = 3.0465$ | $n_3$ (graded refractive index lens) | |
| $r_6 = -1.6142$ | | | | graded refractive index lens

| (wave length) | $N_0$ | $N_1$ | $N_2$ | $N_3$ |
|---|---|---|---|---|
| 587.56 | 1.58913 | −0.11266 | $0.11896 \times 10^{-1}$ | $0.29127 \times 10^{-2}$ |
| 656.28 | 1.58618 | −0.11210 | $0.11837 \times 10^{-1}$ | $0.28981 \times 10^{-2}$ |
| 486.13 | 1.59600 | −0.11398 | $0.12035 \times 10^{-1}$ | $0.29467 \times 10^{-2}$ |
| $\nu$ | 60.00000 | $0.60000 \times 10^2$ | $0.60000 \times 10^2$ | $0.60000 \times 10^2$ |

$d_M = 3.0465$, $r_a = -6.2112$, $r_b = -1.6142$,
$\phi_R = 0.709$, $\phi_M = 0.686$, $\phi_S = 0.270$, $\phi_e = 0.957$,
$\nu_e = 60.000$, $N_e = 2.165$, $\nu_e/\nu_{0d} = 1.000$,
$N_e/N_{0d} = 1.362$, $\phi_e/\phi_R = 1.349$, $\phi_M/\phi_e = 0.718$

Embodiment 30
f = 1.000, F/2.464, IH = 1.0502,
object distance = −17.5029

| | | | |
|---|---|---|---|
| $r_1 = \infty$ | | | |
| | $d_1 = 0.4084$ | $n_1 = 1.84666$ | $\nu_1 = 23.78$ |
| $r_2 = -5.6009$ | | | |
| | $d_2 = 0.3501$ | $n_2 = 1.51633$ | $\nu_2 = 64.15$ |
| $r_3 = 0.8614$ | | | |
| | $d_3 = 0.8279$ | | |
| $r_4 = \infty$ (stop) | | | |

-continued

Embodiment 30
f = 1.000, F/2.464, IH = 1.0502,
object distance = −17.5029

| | | | |
|---|---|---|---|
| | $d_4 = 0.0000$ | | |
| $r_5 = 19.1703$ | | | |
| | $d_5 = 2.4563$ | $n_3$ (graded refractive index lens) | |
| $r_6 = -1.8041$ | | | |
| | $d_6 = 0.6483$ | | |
| $r_7 = 1.8563$ | | | |
| | $d_7 = 0.8922$ | $n_4 = 1.51633$ | $\nu_4 = 64.15$ |
| $r_8 = -2.1004$ | | | |
| | $d_8 = 1.0519$ | $n_5 = 1.84666$ | $\nu_5 = 23.78$ |
| $r_9 = \infty$ | | | | graded refractive index lens

| (wave length) | $N_0$ | $N_1$ | $N_2$ | $N_3$ |
|---|---|---|---|---|
| 587.56 | 1.58913 | $-0.88999 \times 10^{-1}$ | $-0.23419 \times 10^{-2}$ | 0.00000 |
| 656.28 | 1.58618 | $-0.88554 \times 10^{-1}$ | $-0.23302 \times 10^{-2}$ | 0.00000 |
| 486.13 | 1.59600 | $-0.90037 \times 10^{-1}$ | $-0.23692 \times 10^{-2}$ | 0.00000 |
| $\nu$ | 60.00000 | $0.60000 \times 10^2$ | $0.60000 \times 10^2$ | 0.00000 |

$d_M = 2.4563$, $r_a = 19.1703$, $r_b = -1.8041$,
$\phi_R = 0.711$, $\phi_M = 0.437$, $\phi_S = 0.357$, $\phi_e = 0.794$,
$\nu_e = 60.000$, $N_e = 1.996$, $\nu_e/\nu_{0d} = 1.000$,
$N_e/N_d = 1.256$, $\phi_e/\phi_R = 1.117$, $\phi_M/\phi_e = 0.550$

Embodiment 31
f = 1.000, F/2.439, IH = 0.9772,
object distance = −16.2866

| | | | |
|---|---|---|---|
| $r_1 = \infty$ | | | |
| | $d_1 = 0.5429$ | $n_1$ (graded refractive index lens 1) | |
| $r_2 = 0.9262$ | | | |
| | $d_2 = 0.7386$ | | |
| $r_3 = \infty$ (stop) | | | |
| | $d_3 = 0.1323$ | | |
| $r_4 = 8.4788$ | | | |
| | $d_4 = 2.3626$ | $n_2$ (graded refractive index lens 2) | |
| $r_5 = -1.7368$ | | | |
| | $d_5 = 0.4522$ | | |
| $r_6 = 2.1579$ | | | |
| | $d_6 = 1.1059$ | $n_3 = 1.58913$ | $\nu_3 = 61.18$ |
| $r_7 = -1.9001$ | | | |
| | $d_7 = 1.8039$ | $n_4 = 1.84666$ | $\nu_4 = 23.78$ |
| $r_8 = \infty$ | | | | graded refractive index lens 1

| (wave length) | $N_0$ | $N_1$ | $N_2$ | $N_3$ |
|---|---|---|---|---|
| 587.56 | 1.67000 | $-0.54518 \times 10^{-1}$ | 0.00000 | 0.00000 |
| 656.28 | 1.66330 | $-0.51247 \times 10^{-1}$ | 0.00000 | 0.00000 |
| 486.13 | 1.68563 | $-0.62151 \times 10^{-1}$ | 0.00000 | 0.00000 |
| $\nu$ | 30.00000 | $0.50000 \times 10$ | 0.00000 | 0.00000 |

$d_M = 0.5429$, $r_a = \infty$, $r_b = 0.9262$, $\phi_R = 0.684$,
$\phi_M = 0.059$, $\phi_S = -0.723$, $\phi_e = -0.664$, $\nu_e = 54.115$,
$N_e = 1.612$, $\nu_e/\nu_{0d} = 1.804$, $N_e/N_{0d} = 0.965$,
$\phi_e/\phi_R = -0.971$, $\phi_M/\phi_e = -0.089$ graded refractive index lens 2

| (wave length) | $N_0$ | $N_1$ | $N_2$ | $N_3$ |
|---|---|---|---|---|
| 587.56 | 1.58913 | $-0.60781 \times 10^{-1}$ | $-0.56118 \times 10^{-4}$ | $-0.61034 \times 10^{-4}$ |
| 656.28 | 1.58618 | $-0.60477 \times 10^{-1}$ | $-0.55838 \times 10^{-4}$ | $-0.60729 \times 10^{-4}$ |
| 486.13 | 1.59600 | $-0.61490 \times 10^{-1}$ | $-0.56773 \times 10^{-4}$ | $-0.61746 \times 10^{-4}$ |
| $\nu$ | 60.00000 | $0.60000 \times 10^2$ | $0.60000 \times 10^2$ | $0.60000 \times 10^2$ |

$d_M = 2.3626$, $r_a = 8.4788$, $r_b = -1.7368$, $\phi_R = 0.684$,
$\phi_M = 0.287$, $\phi_S = 0.409$, $\phi_e = 0.696$, $\nu_e = 60.000$,
$N_e = 1.876$, $\nu_e/\nu_{0d} = 1.000$, $N_e/N_{0d} = 1.181$,
$\phi_e/\phi_R = 1.017$, $\phi_M/\phi_e = 0.413$

Embodiment 32
f = 1.000, F/2.481, IH = 0.9815,
object distance = −16.3577

| | | |
|---|---|---|
| $r_1 = \infty$ | | |
| | $d_1 = 0.8724$ | $n_1$ (graded refractie index lens 1) |
| $r_2 = 0.8853$ | | |
| | $d_2 = 0.7109$ | |

-continued

Embodiment 32
f = 1.000, F/2.481, IH = 0.9815,
object distance = −16.3577

| | | | |
|---|---|---|---|
| $r_3 = \infty$ (stop) | | | |
| | $d_3 = 0.0695$ | | |
| $r_4 = 9.6787$ | | | |
| | $d_4 = 2.3314$ | $n_2$ (graded refractive index lens 2) | |
| $r_5 = -1.6455$ | | | |
| | $d_5 = 0.4338$ | | |
| $r_6 = 2.0726$ | | | |
| | $d_6 = 1.1054$ | $n_3 = 1.58913$ | $\nu_3 = 61.18$ |
| $r_7 = -1.9084$ | | | |
| | $d_7 = 1.8177$ | $n_4 = 1.84666$ | $\nu_4 = 23.78$ |
| $r_8 = \infty$ | | | | graded, refractive index lens 1

| (wave length) | $N_0$ | $N_1$ | $N_2$ | $N_3$ |
|---|---|---|---|---|
| 587.56 | 1.67000 | $-0.44819 \times 10^{-1}$ | 0.00000 | 0.00000 |
| 656.28 | 1.66330 | $-0.42899 \times 10^{-1}$ | 0.00000 | 0.00000 |
| 486.13 | 1.68563 | $-0.49301 \times 10^{-1}$ | 0.00000 | 0.00000 |
| $\nu$ | 30.00000 | $0.70000 \times 10$ | 0.00000 | 0.00000 |

$d_M = 0.8724$, $r_a = \infty$, $r_b = 0.8858$, $\phi_R = 0.702$,
$\phi_M = 0.078$, $\phi_S = -0.756$, $\phi_e = -0.678$, $\nu_e = 48.299$,
$N_e = 1.596$, $\nu_e/\nu_{0d} = 1.610$, $N_e/N_{0d} = 0.956$,
$\phi_e/\phi_R = -0.966$, $\phi_M/\phi_e = -0.115$ graded refractive index lens 2

| (wave length) | $N_0$ | $N_1$ | $N_2$ | $N_3$ |
|---|---|---|---|---|
| 587.56 | 1.58913 | $-0.59491 \times 10^{-1}$ | $-0.54620 \times 10^{-4}$ | $-0.59461 \times 10^{-4}$ |
| 656.28 | 1.58618 | $-0.59194 \times 10^{-1}$ | $-0.54347 \times 10^{-4}$ | $-0.59163 \times 10^{-4}$ |
| 486.13 | 1.59600 | $-0.60186 \times 10^{-1}$ | $-0.55257 \times 10^{-4}$ | $-0.60154 \times 10^{-4}$ |
| $\nu$ | 60.00000 | $0.60000 \times 10^2$ | $0.60000 \times 10^2$ | $0.60000 \times 10^2$ |

$d_M = 2.3314$, $r_a = 9.6787$, $r_b = -1.6455$,
$\phi_R = 0.702$, $\phi_M = 0.277$, $\phi_S = 0.419$, $\phi_e = 0.696$,
$\nu_e = 60.000$, $N_e = 1.865$, $\nu_e/\nu_{0d} = 1.000$,
$N_e/N_{0d} = 1.173$, $\phi_e/\phi R = 0.992$, $\phi_M/\phi e = 0.398$ Embodiment 33
f = 1.000, F/2.447, IH = 1.0066,
object distance = −16.7771

| | | | |
|---|---|---|---|
| $r_1 = \infty$ | | | |
| | $d_1 = 0.8948$ | $n_1$ (graded refractive index lens 1) | |
| $r_2 = 0.9052$ | | | |
| | $d_2 = 0.7290$ | | |
| $r_3 = \infty$ (stop) | | | |
| | $d_3 = 0.0725$ | | |
| $r_4 = 11.6414$ | | | |
| | $d = 2.3916$ | $n_2$ (graded refractive index lens 2) | |
| $r_5 = -1.6886$ | | | |
| | $d_5 = 0.5508$ | | |
| $r_6 = 2.1855$ | | | |
| | $d_6 = 1.1329$ | $n_3 = 1.58913$ | $\nu_3 = 61.18$ |
| $r_7 = -1.9573$ | | | |
| | $d_7 = 1.5304$ | $n_4 = 1.84666$ | $\nu_4 = 23.78$ |
| $r_8 = \infty$ | | | | graded refractive index lens 1

| (wave length) | $N_0$ | $N_1$ | $N_2$ | $N_3$ |
|---|---|---|---|---|
| 587.56 | 1.67000 | $-0.45769 \times 10^{-1}$ | 0.00000 | 0.00000 |
| 656.28 | 1.66330 | $-0.43808 \times 10^{-1}$ | 0.00000 | 0.00000 |
| 486.13 | 1.68563 | $-0.50346 \times 10^{-1}$ | 0.00000 | 0.00000 |
| $\nu$ | 30.00000 | $0.70000 \times 10$ | 0.00000 | 0.00000 |

$d_M = 0.8948$, $r_a = \infty$, $r_b = 0.9052$, $\phi_R = 0.695$,
$\phi_M = 0.082$, $\phi_S = -0.740$, $\phi_e = -0.658$, $\nu_e = 50.748$,
$N_e = 1.591$, $\nu_e/\nu_{0d} = 1.692$, $N_e/N_{0d} = 0.952$,
$\phi_e/\phi_R = -0.947$, $\phi_M/\phi_e = -0.124$ graded refractive index lens 2

| (wave length) | $N_0$ | $N_1$ | $N_2$ | $N_3$ |
|---|---|---|---|---|
| 587.56 | 1.58913 | $-0.67240 \times 10^{-1}$ | $0.65406 \times 10^{-3}$ | $0.28639 \times 10^{-3}$ |
| 656.28 | 1.58618 | $-0.66736 \times 10^{-1}$ | $0.64425 \times 10^{-3}$ | $0.28639 \times 10^{-3}$ |
| 486.13 | 1.59600 | $-0.68417 \times 10^{-1}$ | $0.67696 \times 10^{-3}$ | $0.28639 \times 10^{-3}$ |
| $\nu$ | 60.00000 | $0.40000 \times 10^2$ | $0.20000 \times 10^2$ | 0.00000 |

$d_M = 2.3916$, $r_a = 11.6414$, $r_b = -1.6886$,
$\phi_R = 0.695$, $\phi_M = 0.322$, $\phi_S = 0.399$, $\phi_e = 0.721$, -continued

Embodiment 33
f = 1.000, F/2.447, IH = 1.0066,
object distance = −16.7771

| $\nu_e = 49.059$, | $N_e = 1.904$, | $\nu_e/\nu_{0d} = 0.818$, |
| $N_e/N_d = 1.198$, | $\phi_e/\phi_R = 1.038$, | $\phi_M/\phi_e = 0.446$ |

Embodiment 34
f = 1.000, F/2.512, IH = 0.9444,
object distance = −15.7398

| | | |
|---|---|---|
| $r_1 = \infty$ | | |
| | $d_1 = 0.4197$ | $n_1$ (graded refractive index lens 1) |
| $r_2 = 1.3360$ | | |
| | $d_2 = 0.3662$ | |
| $r_3 = \infty$ (stop) | | |
| | $d_3 = 0.0000$ | |
| $r_4 = -4.0246$ | | |
| | $d_4 = 2.7540$ | $n_2$ (graded refractive index lens 2) |
| $r_5 = -2.0199$ | | |

| graded refractive index lens 1 | | | | |
|---|---|---|---|---|
| (wave length) | $N_0$ | $N_1$ | $N_2$ | $N_3$ |
| 587.56 | 1.75000 | $-0.81739 \times 10^{-1}$ | 0.00000 | 0.00000 |
| 656.28 | 1.74250 | $-0.75608 \times 10^{-1}$ | 0.00000 | 0.00000 |
| 486.13 | 1.76750 | $-0.96043 \times 10^{-1}$ | 0.00000 | 0.00000 |
| $\nu$ | 30.00000 | $0.40000 \times 10$ | 0.00000 | 0.00000 |

| $d_M = 0.4197$, | $r_a = \infty$, | $r_b = 1.336$, | $\phi_R = 0.812$, |
| $\phi_M = 0.069$, | $\phi_S = -0.561$, | $\phi_e = -0.493$, | |
| $\nu_e = 315.947$, | $N_e = 1.651$, | $\nu_e/\nu_{0d} = 10.532$, | |
| $N_e/N_{0d} = 0.944$, | $\phi_e/\phi_R = -0.607$, | $\phi_M/\phi_e = -0.139$ | |

| graded refractive index lens 2 | | | | |
|---|---|---|---|---|
| (wave length) | $N_0$ | $N_1$ | $N_2$ | $N_3$ |
| 587.56 | 1.58913 | −0.17504 | $0.16003 \times 10^{-1}$ | $-0.85767 \times 10^{-2}$ |
| 656.28 | 1.58618 | −0.17416 | $0.15923 \times 10^{-1}$ | $-0.85338 \times 10^{-2}$ |
| 486.13 | 1.59600 | −0.17708 | $0.16190 \times 10^{-1}$ | $-0.86768 \times 10^{-2}$ |
| $\nu$ | 60.00000 | $0.60000 \times 10^2$ | $0.60000 \times 10^2$ | $0.60000 \times 10^2$ |

| $d_M = 2.754$, | $r_a = -4.0246$, | $r_b = -2.0199$, | |
| $\phi_R = 0.812$, | $\phi_M = 0.964$, | $\phi_S = 0.145$, | $\phi_e = 1.109$, |
| $\nu_e = 60.000$, | $N_e = 2.344$, | $\nu_e/\nu_{0d} = 1.000$, | |
| $N_e/N_{0d} = 1.475$, | $\phi_e/\phi_R = 1.366$, | $\phi_M/\phi_e = 0.869$ | |

Embodiment 35
f = 1.000, F/2.420, IH = 1.0056,
object distance = −16.7598

| | | | |
|---|---|---|---|
| $r_1 = \infty$ | | | |
| | $d_1 = 0.3352$, | $n_1 = 1.78472$ | $\nu_1 = 25.68$ |
| $r_2 = -11.1732$ | | | |
| | $d_2 = 0.4469$ | $n_2$ (graded refractive index lens 1) | |
| $r_3 = 0.9927$ | | | |
| | $d_3 = 0.5357$ | | |
| $r_4 = \infty$ (stop) | | | |
| | $d_4 = 0.0000$ | | |
| $r_5 = -12.4470$ | | | |
| | $d_5 = 3.0522$ | $n_3$ (graded refractive index lens 2) | |
| $r_6 = -1.6156$ | | | |

| graded refractive index lens 1 | | | | |
|---|---|---|---|---|
| (wave length) | $N_0$ | $N_1$ | $N_2$ | $N_3$ |
| 587.56 | 1.67000 | $-0.48870 \times 10^{-1}$ | 0.00000 | 0.00000 |
| 656.28 | 1.66330 | $-0.41539 \times 10^{-1}$ | 0.00000 | 0.00000 |
| 486.13 | 1.68563 | $-0.65974 \times 10^{-1}$ | 0.00000 | 0.00000 |
| $\nu$ | 30.00000 | $0.20000 \times 10$ | 0.00000 | 0.00000 |

| $d_M = 0.4469$, | $r_a = -11.1732$, | $r_b = 0.9927$, | |
| $\phi_R = 0.694$, | $\phi_M = 0.044$, | $\phi_S = -0.735$, | $\phi_e = -0.691$, |
| $\nu_e = 260.207$, | $N_e = 1.629$, | $\nu_e/\nu_{0d} = 8.674$, | |
| $N_e/N_{0d} = 0.975$, | $\phi_e/\phi_R = -0.996$, | $\phi_M/\phi_e = -0.063$ | |

| graded refractive index lens 2 | | | | |
|---|---|---|---|---|
| (wave length) | $N_0$ | $N_1$ | $N_2$ | $N_3$ |
| 587.56 | 1.58913 | −0.10909 | $0.12255 \times 10^{-1}$ | $0.31761 \times 10^{-2}$ |
| 656.28 | 1.58618 | −0.10854 | $0.12194 \times 10^{-1}$ | $0.31602 \times 10^{-2}$ |
| 486.13 | 1.59600 | −0.11036 | $0.12398 \times 10^{-1}$ | $0.32131 \times 10^{-2}$ |

-continued

Embodiment 35
f = 1.000, F/2.420, IH = 1.0056,
object distance = −16.7598

| $\nu$ | 60.00000 | $0.60000 \times 10^2$ | $0.60000 \times 10^2$ | $0.60000 \times 10^2$ |
|---|---|---|---|---|

$d_M = 3.0522$, $\quad r_a = -12.447$, $\quad r_b = -1.6156$,
$\phi R = 0.694$, $\quad \phi_M = 0.666$, $\quad \phi_S = 0.317$, $\quad \phi_e = 0.983$,
$\nu_e = 60.000$, $\quad N_e = 2.122$, $\quad \nu_e/\nu_{0d} = 1.000$,
$N_e/N_{0d} = 1.335$, $\quad \phi_e/\phi_R = 1.417$, $\quad \phi_M/\phi_e = 0.677$

Embodiment 36
f = 1.000, F/2.503, IH = 0.8825,
object distance = −14.7085

$r_1 = \infty$
$\quad d_1 = 0.3922 \quad n_1$ (graded refractive index lens 1)
$r_2 = 1.3187$
$\quad d_2 = 0.4372$
$r_3 = \infty$ (stop)
$\quad d_3 = 0.3327$
$r_4 = -6.2473$
$\quad d_4 = 2.8124 \quad n_2$ (graded refractive index lens 2)
$r_5 = -2.9122$
$\quad d_5 = 1.6332 \quad n_3$ (graded refractive index lens 3)
$r_6 = \infty$

| graded refractive index lens 1 | | | | |
|---|---|---|---|---|
| (wave length) | $N_0$ | $N_1$ | $N_2$ | $N_3$ |
| 587.56 | 1.60000 | $-0.24865 \times 10^{-1}$ | $0.70810 \times 10^{-2}$ | $-0.75187 \times 10^{-2}$ |
| 656.28 | 1.59640 | $-0.23835 \times 10^{-1}$ | $0.70102 \times 10^{-2}$ | $-0.72932 \times 10^{-2}$ |
| 486.13 | 1.60840 | $-0.27269 \times 10^{-1}$ | $0.72462 \times 10^{-2}$ | $-0.80450 \times 10^{-2}$ |
| $\nu$ | 50.00000 | $0.72406 \times 10$ | $0.30000 \times 10^2$ | $0.10000 \times 10^2$ |

$d_M = 0.3922$, $\quad r_a = \infty$, $\quad r_b = 1.3187$, $\quad \phi_R = 0.854$,
$\phi_M = 0.020$, $\quad \phi_S = -0.455$, $\quad \phi_e = -0.435$, $\quad \nu_e = 67.980$,
$N_e = 1.574$, $\quad \nu_e/\nu_{0d} = 1.360$, $\quad N_e/N_{0d} = 0.983$,
$\phi_e/\phi_R = -0.510$, $\quad \phi_M/\phi_e = -0.045$

| graded refractive index lens 2 | | | | |
|---|---|---|---|---|
| (wave length) | $N_0$ | $N_1$ | $N_2$ | $N_3$ |
| 587.56 | 1.80000 | $-0.20871$ | $0.28165 \times 10^{-2}$ | $-0.79986 \times 10^{-3}$ |
| 656.28 | 1.79520 | $-0.20743$ | $0.27922 \times 10^{-2}$ | $-0.79187 \times 10^{-3}$ |
| 486.13 | 1.81120 | $-0.21171$ | $0.28732 \times 10^{-2}$ | $-0.81852 \times 10^{-3}$ |
| $\nu$ | 50.00000 | $0.48760 \times 10^2$ | $0.34764 \times 10^2$ | $0.30012 \times 10^2$ |

$d_M = 2.8124$, $\quad r_a = -6.2473$, $\quad r_b = -2.9122$,
$\phi_R = 0.854$, $\quad \phi_M = 1.174$, $\quad \phi_S = 0.147$, $\quad \phi_e = 1.321$,
$\nu_e = 48.895$, $\quad N_e = 2.976$, $\quad \nu_e/\nu_{0d} = 0.978$,
$N_e/N_{0d} = 1.653$, $\quad \phi_e/\phi_R = 1.546$, $\quad \phi_M/\phi_e = 0.889$

| graded refractive index lens 3 | | | | |
|---|---|---|---|---|
| (wave length) | $N_0$ | $N_1$ | $N_2$ | $N_3$ |
| 587.56 | 1.60000 | $0.44519 \times 10^{-1}$ | $-0.92446 \times 10^{-2}$ | $0.29229 \times 10^{-3}$ |
| 656.28 | 1.59550 | $0.40164 \times 10^{-1}$ | $-0.84232 \times 10^{-2}$ | $0.23193 \times 10^{-3}$ |
| 486.13 | 1.61050 | $0.54681 \times 10^{-1}$ | $-0.11161 \times 10^{-1}$ | $0.43311 \times 10^{-3}$ |
| $\nu$ | 40.00000 | $0.30668 \times 10$ | $0.33767 \times 10$ | $0.14529 \times 10$ |

$d_M = 1.6332$, $\quad r_a = -2.9122$, $\quad r_b = \infty$, $\quad \phi_R = 0.799$,
$\phi_M = -1.454$, $\quad \phi_S = -0.206$, $\quad \phi_e = -1.660$, $\quad \nu_e = 3.464$,
$N_e = 2.383$, $\quad \nu_e/\nu_{0d} = 0.087$, $\quad N_e/N_{0d} = 1.489$,
$\phi_e/\phi_R = -1.944$, $\quad \phi_M/\phi_e = 0.876$ wherein the reference symbols $r_1, r_2, \ldots$ represent radii of curvature on surfaces of the respective lens elements, the reference symbols $d_1, d_2, \ldots$ designate thickness of the respective lens elements and airspaces reserved therebetween, the reference symbols $n_1, n_2, \ldots$ denote refractive indices of the respective lens elements, and the reference symbols $\nu_1, \nu_2, \ldots$ represent Abbe's numbers of the respective lens elements.

Out of these embodiments, the first through the fourteenth embodiments are of the first type of the objective lens system for endoscopes according to the present invention.

The first through the fourth embodiments have the compositions illustrated in FIG. 2 through FIG. 5 respectively, wherein the front lens unit uses a graded refractive index lens component made of a medium which has a positive refractive power.

Figure 6:
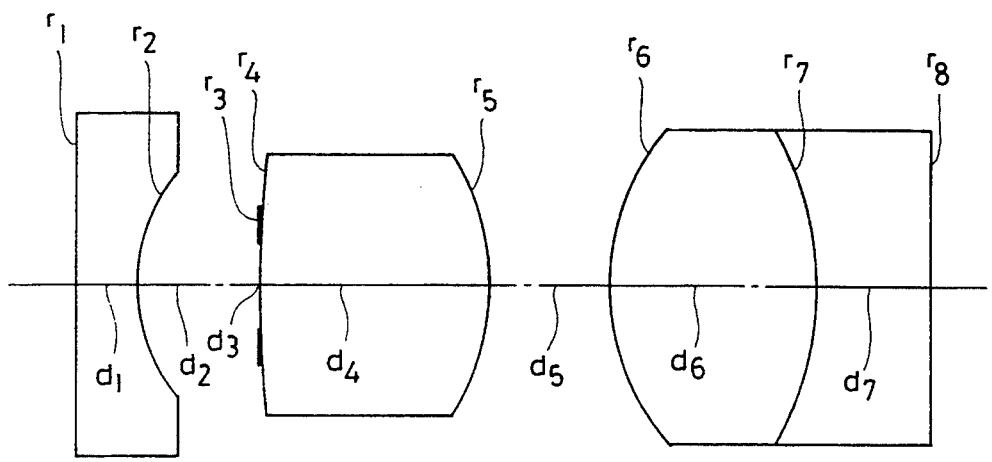
Figure 7:
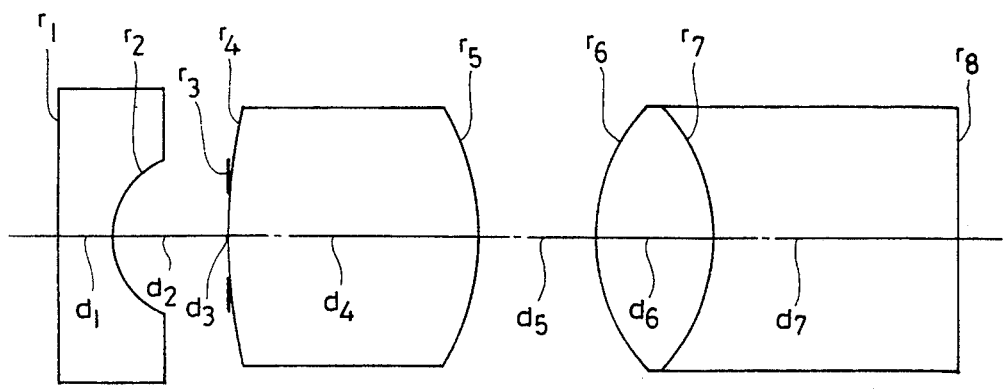

The fifth and sixth embodiments have the compositions illustrated in FIG. 6 and FIG. 7 respectively, wherein an achromatic cemented lens component is used in the rear lens unit for correcting lateral chromatic aberration favorably.

Figure 8:
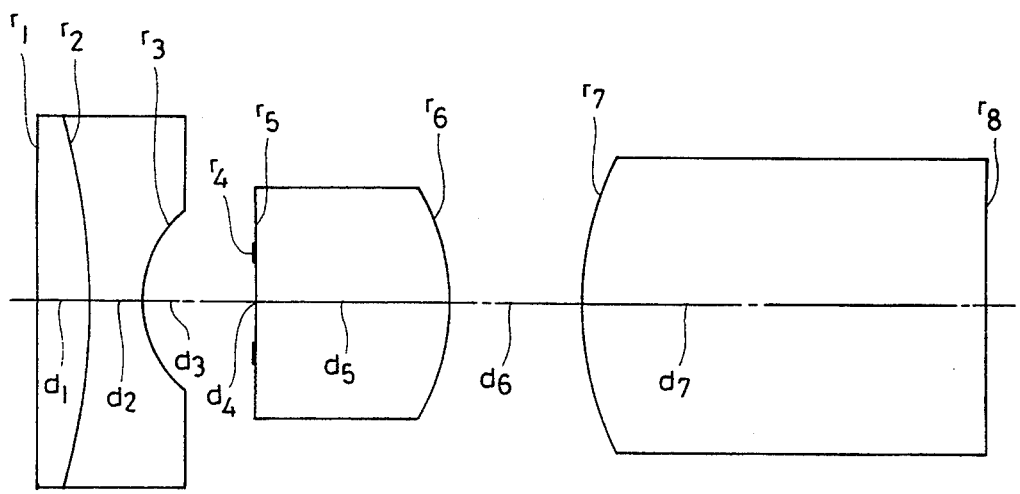

The seventh embodiment has a composition illustrated in FIG. 8, wherein the front lens unit consists, in order from the object side, of a positive lens component and a negative lens component. The negative lens component has a refractive index distribution approximated by the above-mentioned formulae (1) through (5), and satisfies the conditions (6) and (7). In the seventh embodiment, the front lens unit is composed as described above for further correcting lateral chromatic aberration in the objective lens system for endoscopes.

Figure 9:
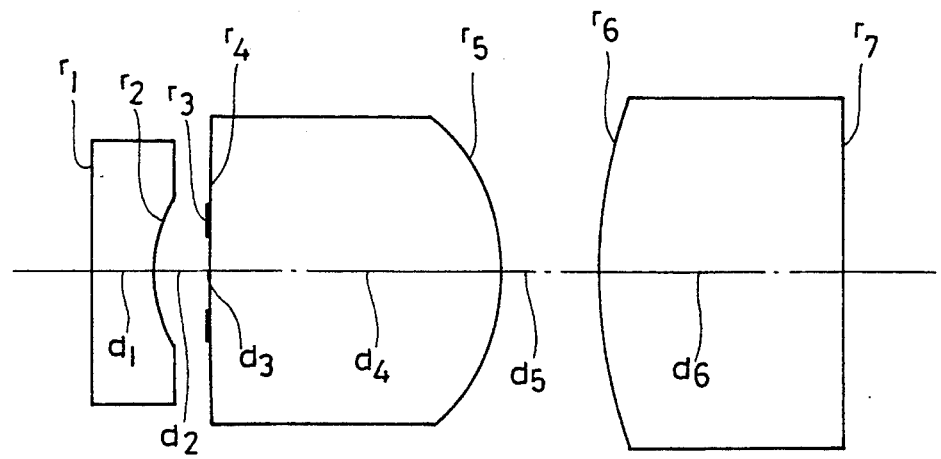
Figure 10:
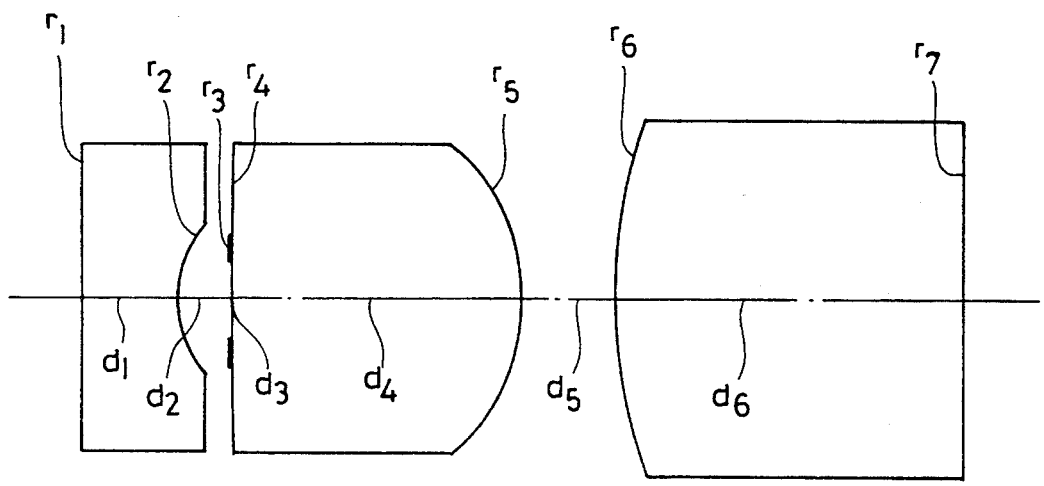

The eighth and ninth embodiments have compositions illustrated in FIG. 9 and FIG. 10 respectively, wherein the rear lens unit consists, in order from the object side, of a graded refractive index lens component and a positive lens component.

In the embodiments described above, the rear lens unit has a composition which is similar to that of the rear lens unit of the third type of objective lens system according to the present invention.

The graded refractive index lens component used in the rear lens unit has the refractive index distribution approximated by the formulae (1) through (5), satisfies the conditions (6) and (7), and should desirably further satisfy the condition (17).

Further, aberrations can be corrected in these embodiments by using means which are similar to those which have been already described above with reference to the third type of the objective lens system for endoscopes according to the present invention.

Figure 11:
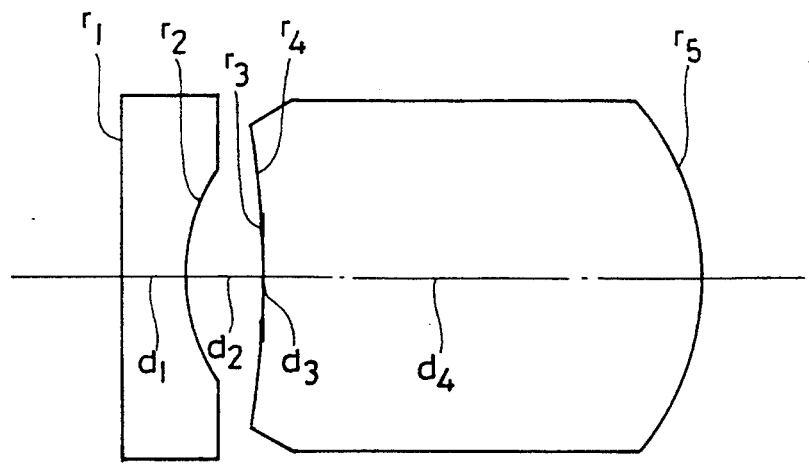
Figure 12:
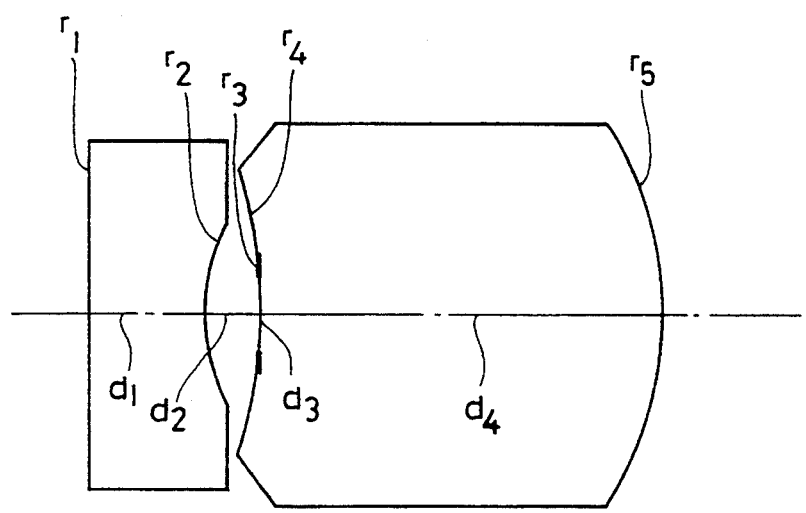

The tenth and eleventh embodiments have compositions illustrated in FIG. 11 and FIG. 12 respectively, wherein the rear lens unit is composed of a single graded refractive index lens component. It is desirable for the tenth and eleventh embodiments to satisfy the abovementioned condition (22).

Figure 13:
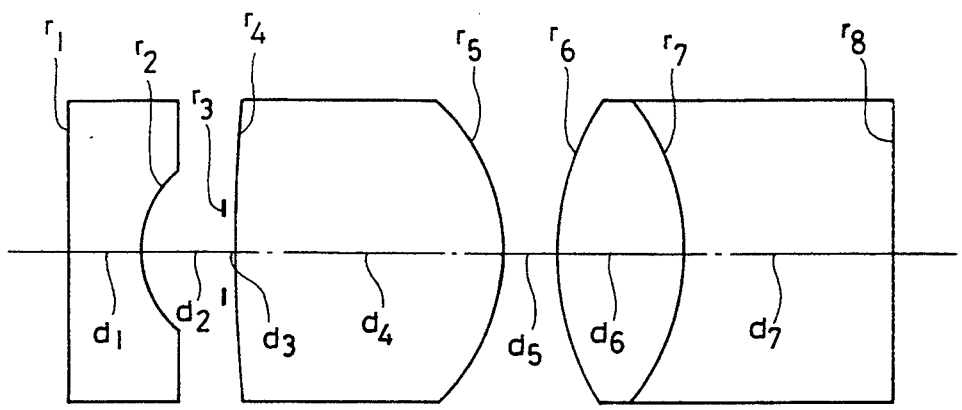
Figure 14:
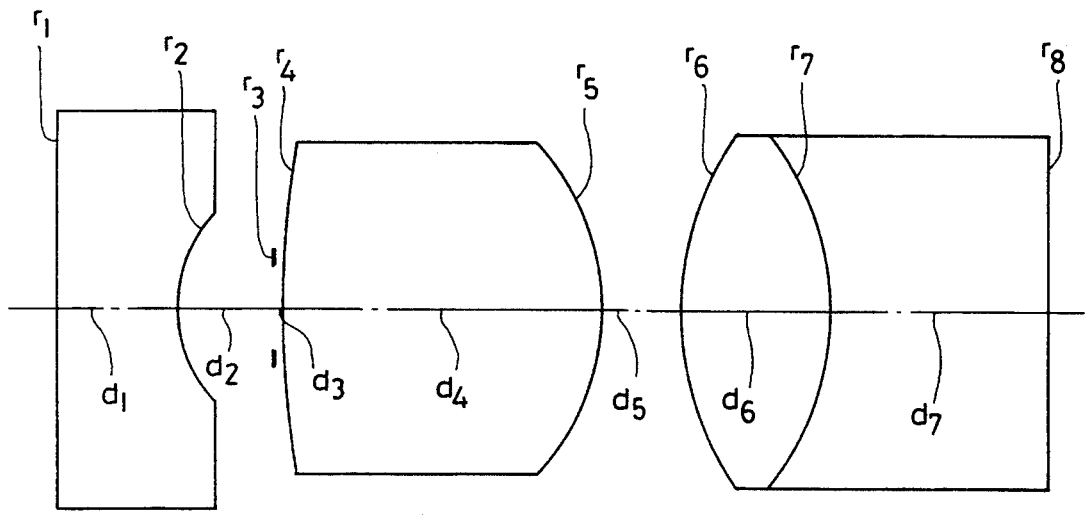

The twelfth and thirteenth embodiments have compositions shown in FIG. 13 and FIG. 14 respectively. In each of these embodiments, the rear lens unit consists, in order from the object side, of a graded refractive index lens component, and an achromatic cemented lens component consisting of a positive lens element and a negative lens element. In the cemented lens component, the positive lens element is made of a glass material which has a relatively low refractive index and weak dispersing power, whereas the negative lens element is made of a glass material which has relatively high refractive index and strong dispersing power. These lens elements may not be cemented to each other, or disposed separately from each other.

Figure 15:
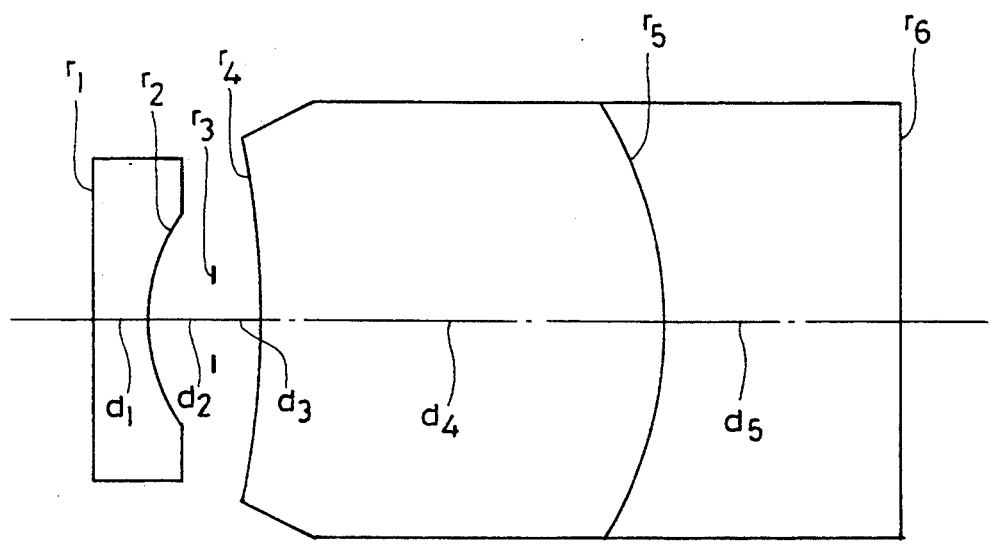

The fourteenth embodiment is an objective lens system having a composition illustrated in FIG. 15. In the fourteenth embodiment, lateral chromatic aberration is corrected by additionally using a graded refractive index lens component which has a refractive index distribution approximated by the formulae (1) through (5), and satisfies the condition (7) and the above-mentioned condition (15).

In the fourteenth embodiment, the rear lens unit consists of at least two lens components one of which is the graded refractive index lens component described above.

As is apparent from the above-mentioned condition (16), the equivalent Abbe's number $\nu_e$ of the graded refractive index lens component used in the rear lens unit of the fourteenth embodiment is smaller than $\nu_{0d}$. That is to say, by using the graded refractive index lens component which has the negative refractive power and a relatively small Abbe's number in the rear lens unit, the lateral chromatic aberration can be corrected more favorably than by using a lens element which has a value of $\nu_{0d}$ the same as that of the graded refractive index lens component and is made of the ordinary homogenous glass material.

The fifteenth through twenty-first embodiments are of the second type of the objective lens system for endoscopes according to the present invention.

Figure 16:
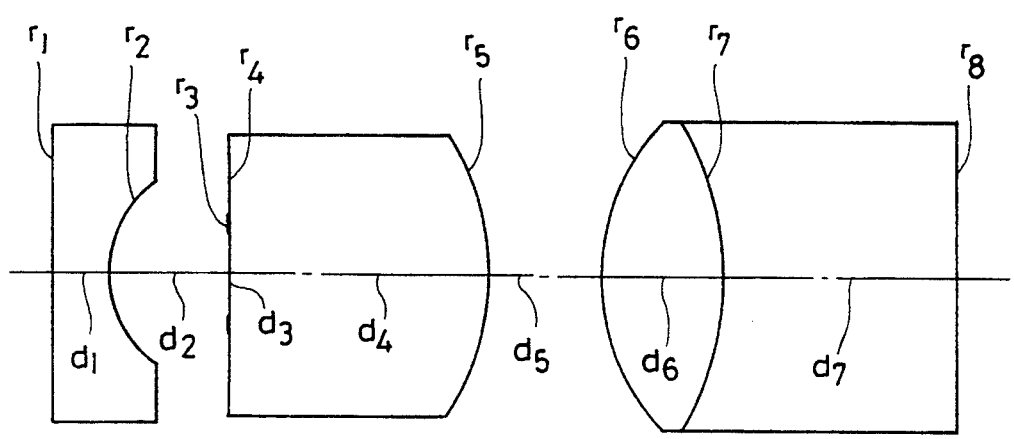
Figure 17:
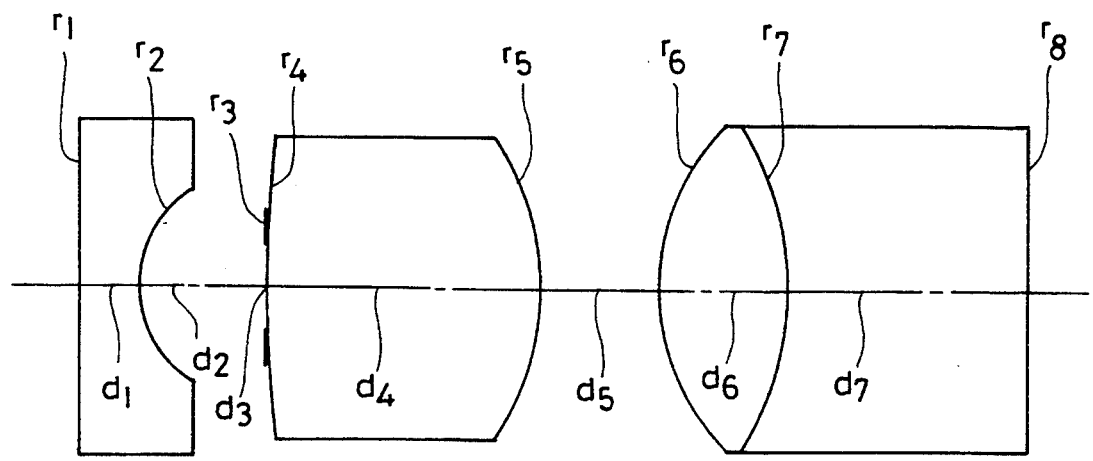
Figure 18:
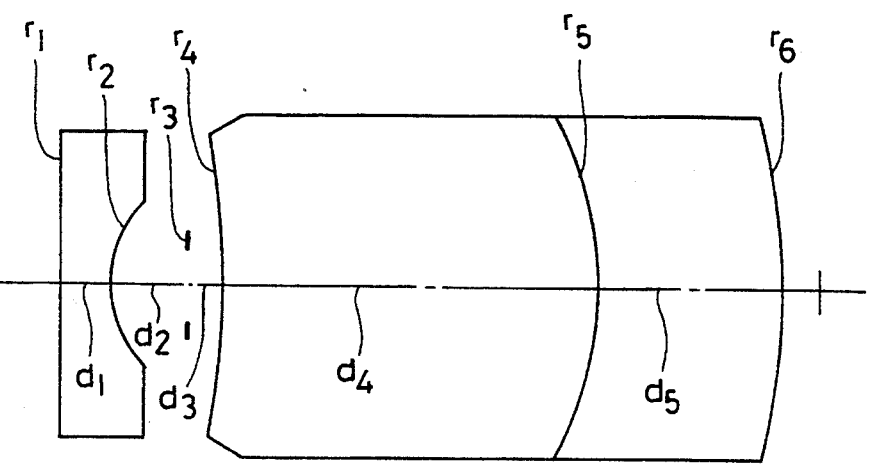
Figure 19:
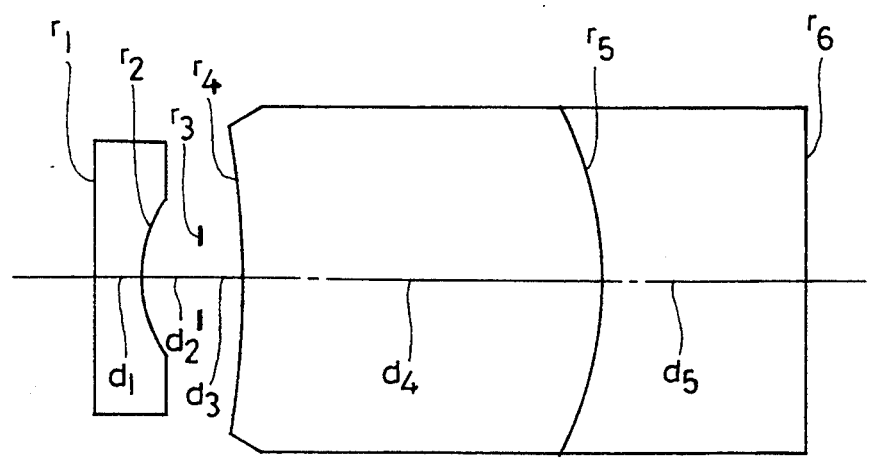
Figure 20:
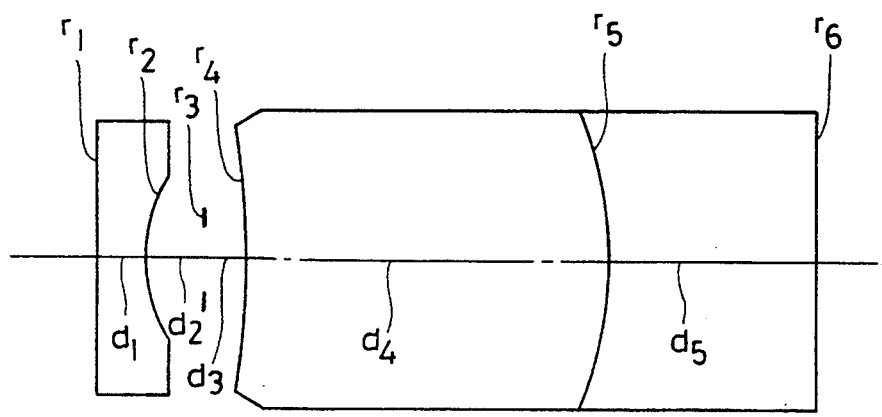
Figure 21:
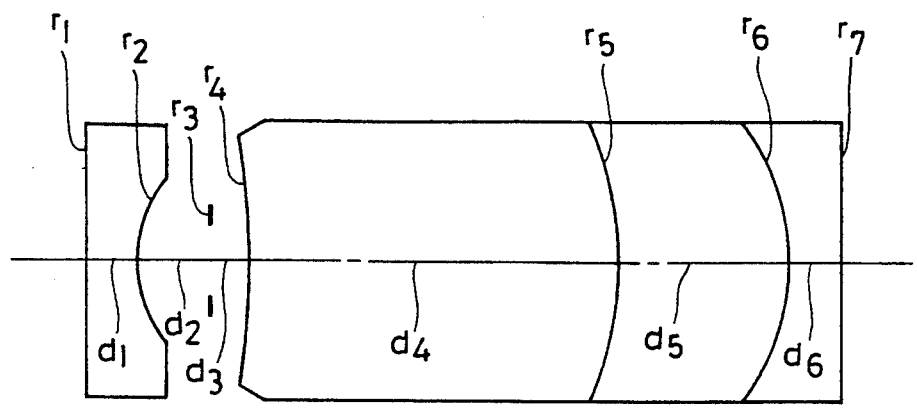

The fifteenth and sixteenth embodiments have compositions illustrated in FIG. 16 and FIG. 17 respectively. In each of these embodiments, the rear lens unit consists, in order from the object side, of a positive lens component, and a cemented lens component consisting of a positive lens element and a negative lens element which is designed as a graded refractive index lens element.

The seventeenth through the twentieth embodiment have compositions illustrated in FIG. 18 through FIG. 21. In each of these embodiments, the positive lens component and the positive lens element used in the rear lens unit of the objective lens system preferred as the fifteenth or sixteenth embodiment are replaced with a single graded refractive index lens element. In other words, in each of the seventeenth through twentieth embodiments, the rear lens unit is composed of a cemented lens component consisting of a graded refractive index lens element having a positive refractive power and another graded refractive index lens element having a negative refractive power. These graded refractive lens elements have refractive index distributions approximated by the formulae (1) through (5), the negative graded refractive index lens element satisfies the conditions (15) and (7), whereas the positive graded refractive index lens element satisfies the above-mentioned condition (7) and the following condition (6):

$$N_{1d} < 0 \tag{6}$$

The graded refractive index lens element having the positive refractive power has refractive index and dispersing power which are weakened and lowered toward the marginal portion of the lens element. This graded refractive index lens element has a function to correct chromatic aberration which is the same as that of the lens element made of the ordinary homogenous optical glass material. When a graded refractive index lens element which has a positive function and the dispersing power defined by the condition (7) is used in the rear lens unit of the retrofocus type objective lens system for endoscopes, lateral chromatic aberration is produced by a medium of the graded refractive index lens element. However, it is possible to obtain optical performance required for an objective lens system for endoscopes by utilizing the chromatic aberration correcting function of the refractive index distribution having the negative function of the graded refractive index lens element used in each of the seventeenth through the twentieth embodiments.

Further, the graded refractive index lens element to be used in the rear lens unit should desirably satisfy the above-mentioned condition (20).

In addition, a glass plate is cemented to the image side surface of the graded refractive index lens element which is disposed on the image side so that the objective system has a planar surface on the image side for facilitating connection of an image guide.

Figure 22:
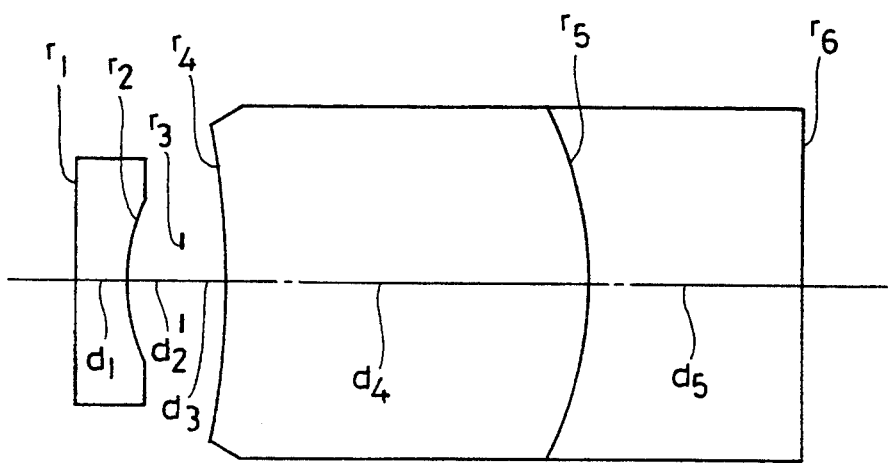

The twenty-first embodiment has a composition illustrated in FIG. 22, wherein lateral chromatic aberration is corrected favorably by using, in the front lens unit, a graded refractive index lens component which has a refractive index distribution approximated by the formulae (1) through (5), and satisfies the conditions (6) and (7).

If the graded refractive index lens component having the positive refractive power is used in the rear lens unit, negative lateral chromatic aberration will be produced. When this graded refractive index lens component is used in the front lens unit, however, a sign of the lateral chromatic aberration is reserved after passing through a stop and lateral chromatic aberration is produced on the positive side on an image surface. Consequently, lateral chromatic aberration is corrected in the objective lens system as a whole.

When an equivalent Abbe's number of the graded refractive index lens component used in the front lens unit is represented by $\nu_e'$, it is desirable that the graded refractive index lens component satisfies the following conditions (13) and (14):

$$\nu_e'/\nu_{0d} \quad (13)$$

$$\nu_0 \leq 0 \quad (14)$$

The condition (13) is required for suppressing negative lateral chromatic aberration which is to be produced in the front lens unit. The condition (14) is required for allowing the front lens unit to produce positive chromatic aberration.

If the condition (13) or (14) is not satisfied, it will be impossible to correct chromatic aberration produced by the rear lens unit by using the front lens unit.

The twenty-second through the thirty-sixth embodiments are of the third type of the objective lens system for endoscopes according to the present invention.

Figure 23:
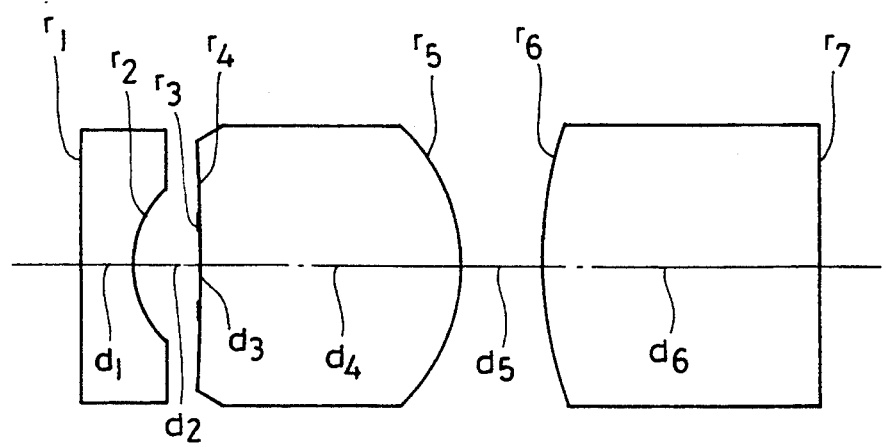

The twenty-second embodiment has a composition illustrated in FIG. 23, wherein the rear lens unit consists of a single positive graded refractive index lens component and a positive lens component.

Figure 24:
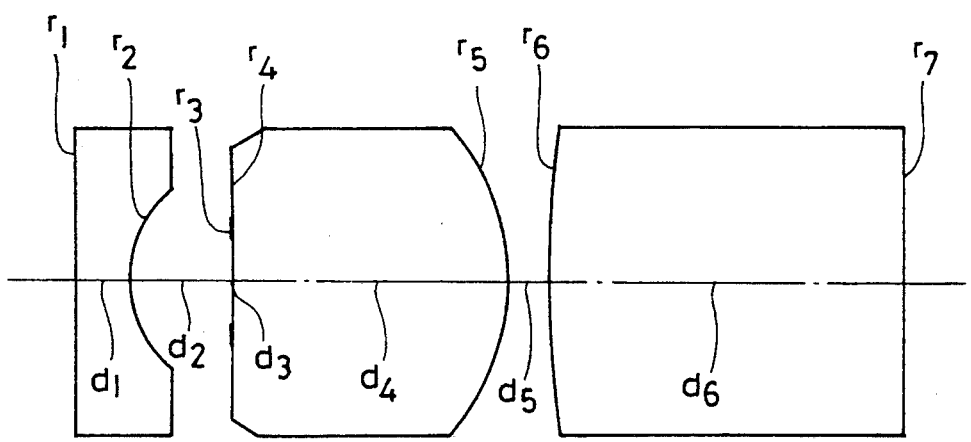

The twenty-third embodiment has a composition shown in FIG. 24, wherein the rear lens unit consists of two positive graded refractive index lens components.

Figure 25:
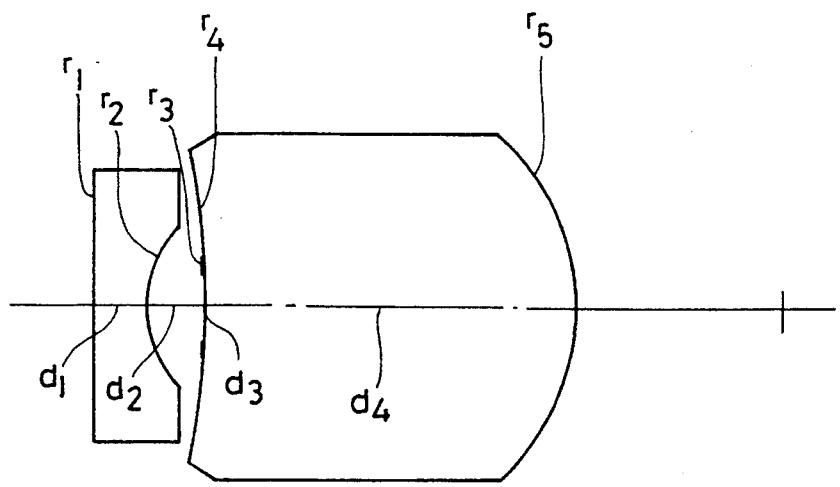

The twenty-fourth embodiment has a composition illustrated in FIG. 25, wherein the rear lens unit consists of a single graded refractive index lens component.

The graded refractive index lens component used in each of the twenty-second through the twenty-fourth embodiments has $\nu_{1d}$ and $\nu_{0d}$ satisfying the condition (7). Accordingly, this graded refractive index lens component has a refractive index distribution which lowers refractive index and weakens dispersing power from the portion on the optical axis toward the marginal portion of the lens component. In this case, the graded refractive index lens component has a function for correcting chromatic aberration which is the same as that of a convex lens element made of the ordinary homogenous optical glass material. That is to say, negative lateral chromatic aberration is produced by a medium of the graded refractive index lens component which has a positive function, a dispersing power satisfying the condition (19) and is used in the rear lens unit, and it becomes necessary to correct this negative lateral chromatic aberration.

Figure 26:
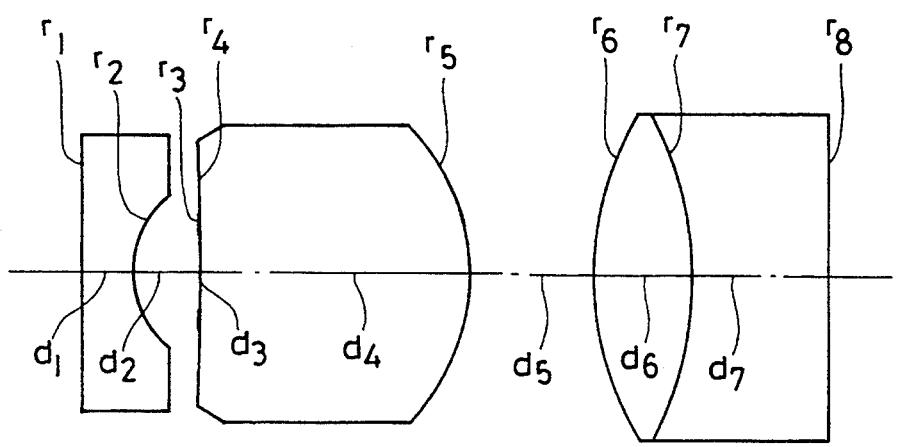
Figure 27:
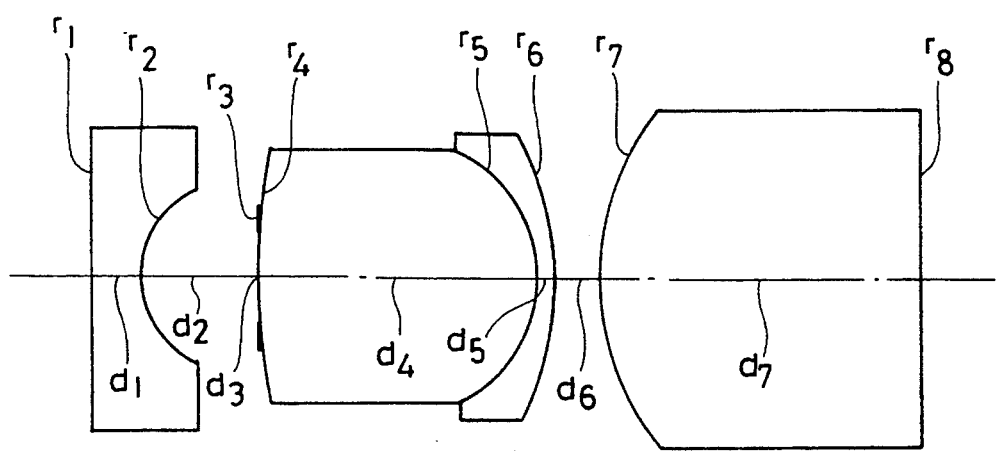

The twenty-fifth and twenty-sixth embodiments have compositions which are illustrated in FIG. 26 and FIG. 27 respectively. In each of these embodiments, a lens component other than a graded refractive index lens component is used as an achromatic lens component. Speaking concretely, a negative lens component which has a relatively high refractive index and a relatively strong dispersing power is additionally used in the rear lens unit. In this case, it is desirable, as in the twenty-fifth embodiment, to compose the rear lens unit of a graded refractive index lens component and a positive cemented lens component which consists of a positive lens element having a relatively low refractive index and a weak dispersing power, and a negative lens element having a relatively high refractive index and a strong dispersing power. In this case, the above-mentioned positive lens element and the negative lens element may not be cemented to each other or disposed separately from each other.

In the twenty-sixth embodiment, lateral chromatic aberration is corrected by composing the rear lens unit of a cemented lens component consisting of a graded refractive index lens element and a negative lens element, and a positive lens component.

Figure 28:
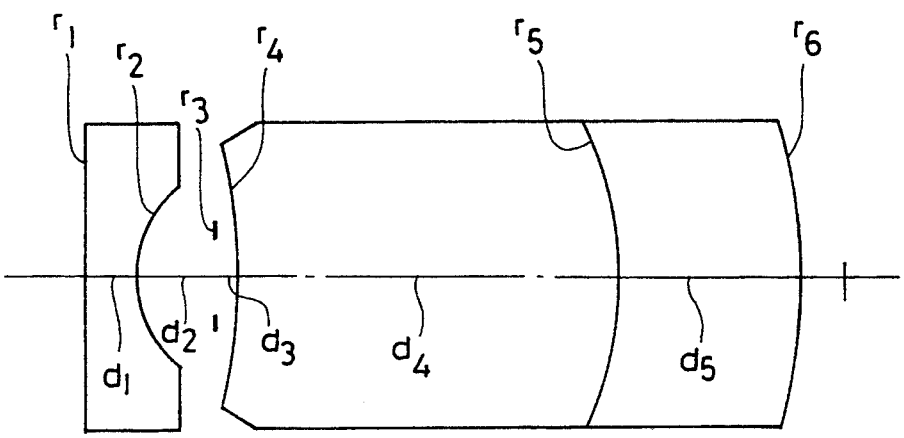
Figure 29:
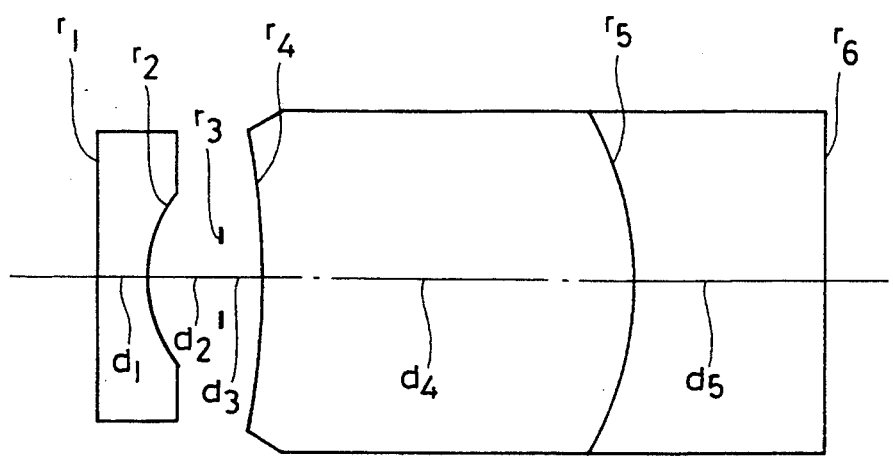

The twenty-seventh and the twenty-eighth embodiment have compositions illustrated in FIG. 28 and FIG. 29 respectively. In each of these embodiments, the rear lens unit uses a graded refractive index lens component which has a refractive index distribution approximated by the formulae (1) through (5), and satisfies the condition (7) and the following condition (15):

$$N_{1d} > 0 \quad (15)$$

That is to say, the rear lens unit of each of the twenty-seventh and the twenty-eighth embodiment consists of at least two lens components, one of which is a graded refractive index lens component which has the refractive index distribution approximated by the formulae (1) through (5) and satisfies the condition (18) as well as the condition (19), and another graded refractive index lens component which has the refractive index distribution approximated by the formulae (1) through (5) and satisfies the condition (6) as well as the above-mentioned condition (15).

It is desirable for correction of lateral chromatic aberration that these graded refractive index lens components have equivalent Abbe's numbers satisfying the condition (16).

Figure 30:
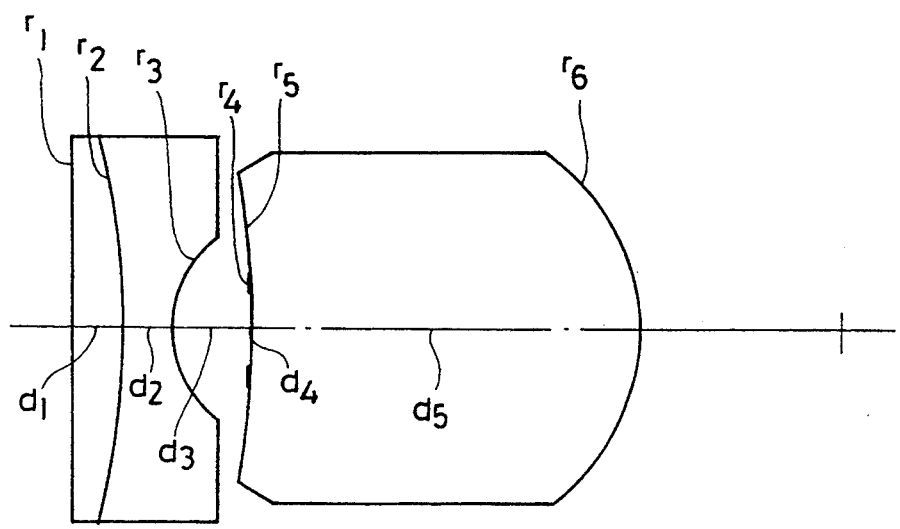
Figure 31:
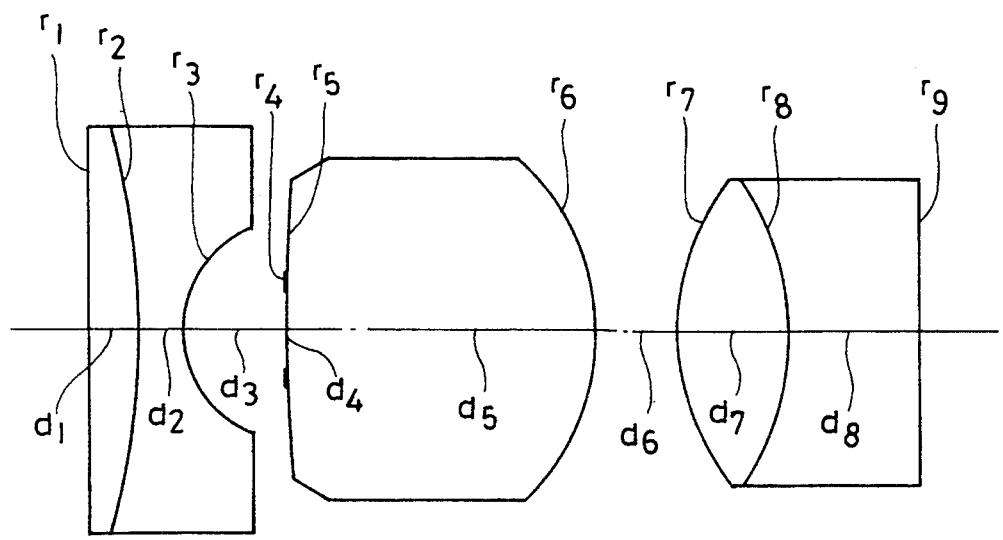
Figure 32:
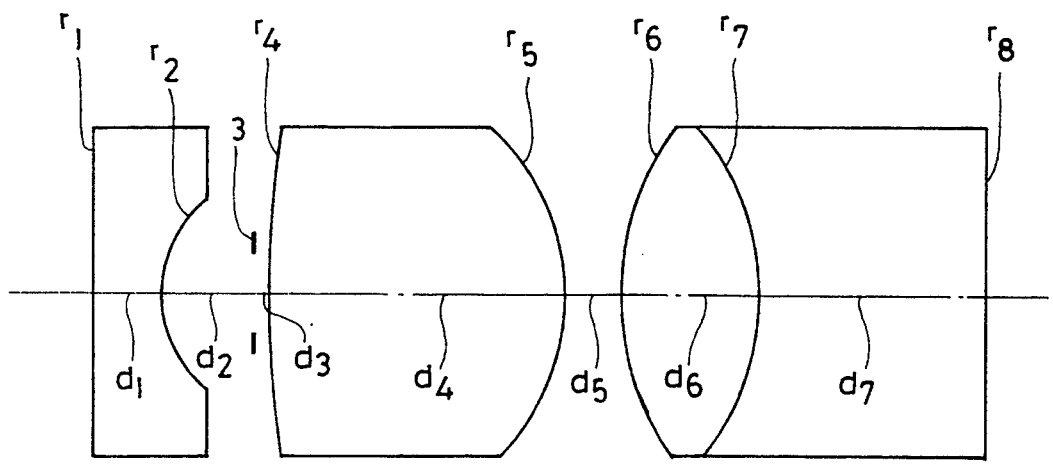
Figure 33:
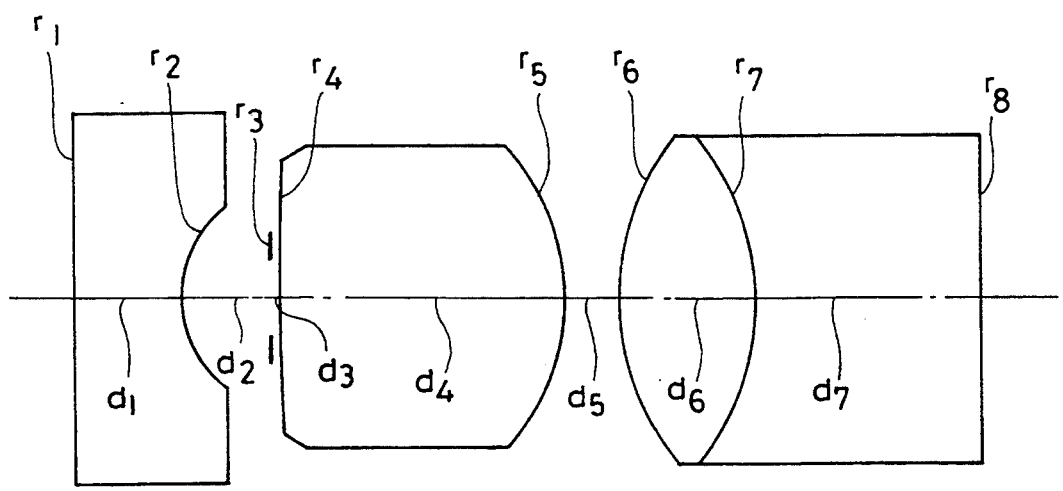
Figure 34:
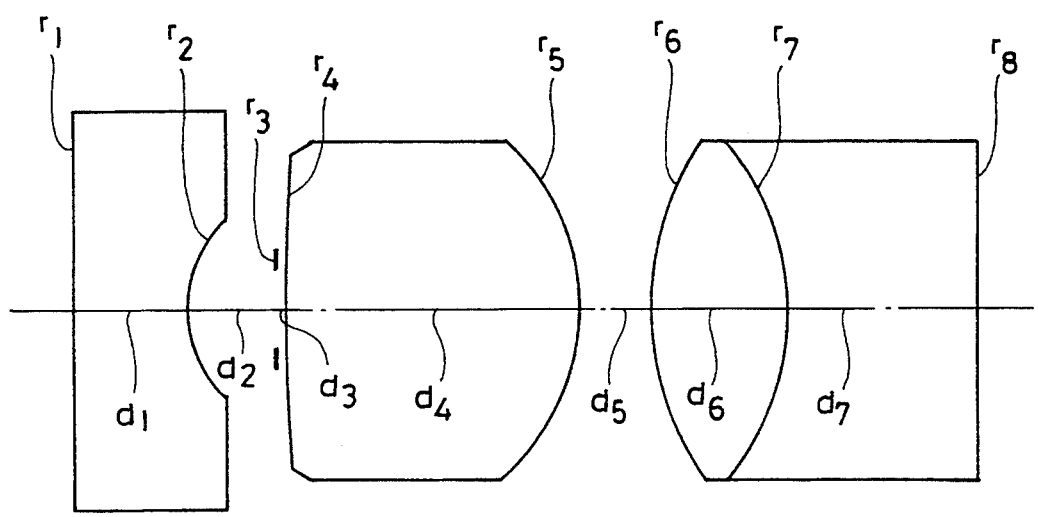
Figure 35:
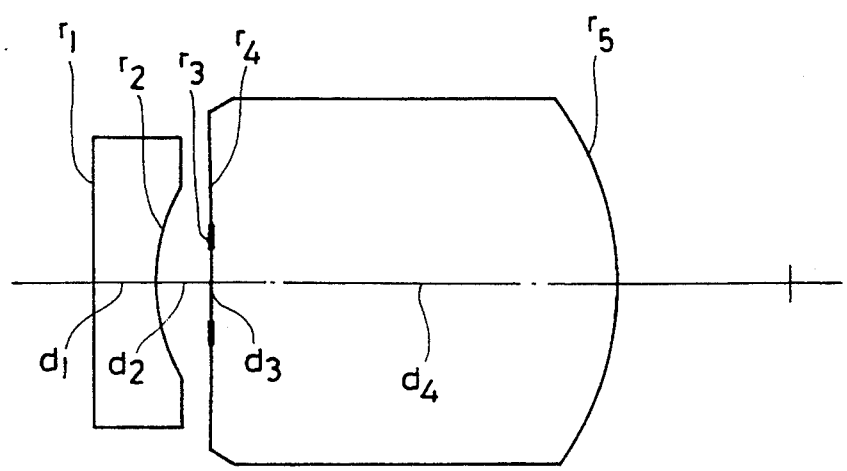
Figure 36:
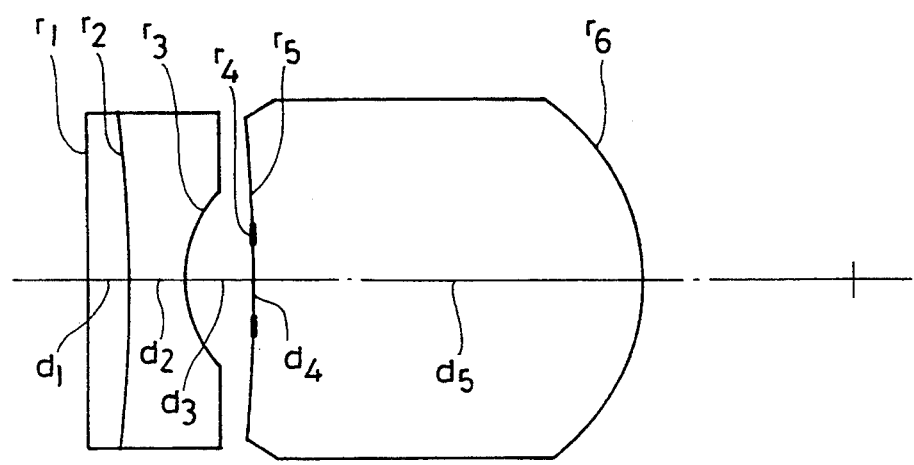
Figure 37:
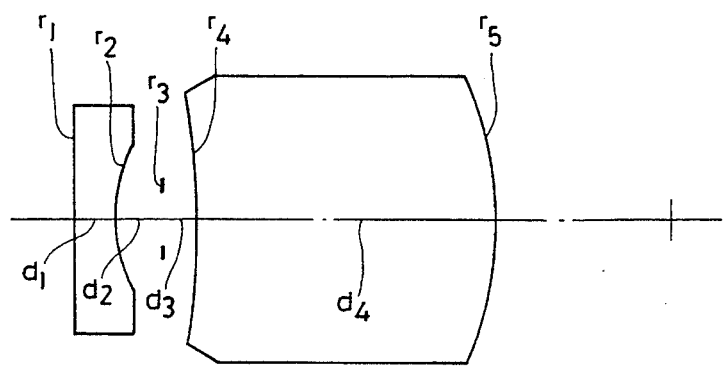
Figure 38:
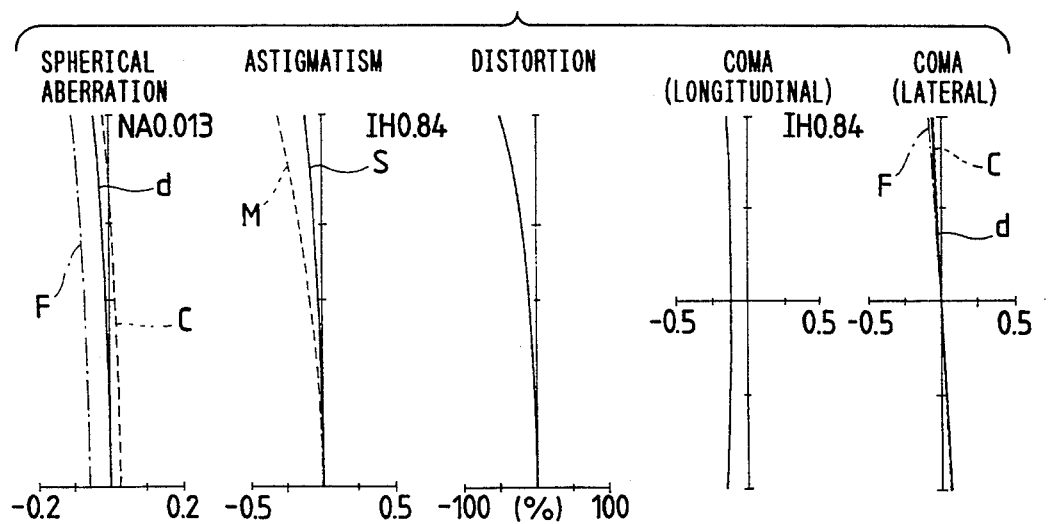
FIG. 38 through FIG. 73 show graphs illustrating aberration characteristics of the first through the thirty-sixth embodiments respectively of the present invention.
Figure 39:
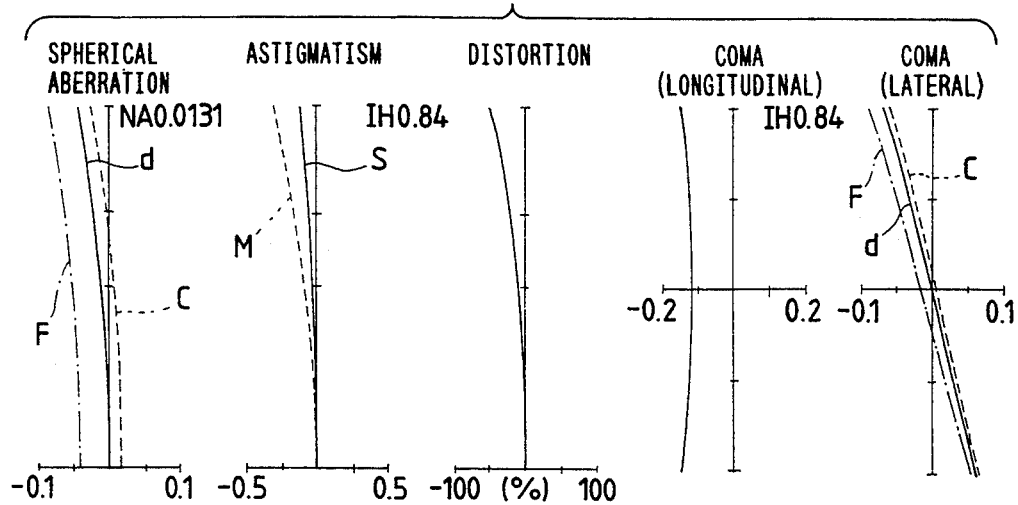
Figure 40:
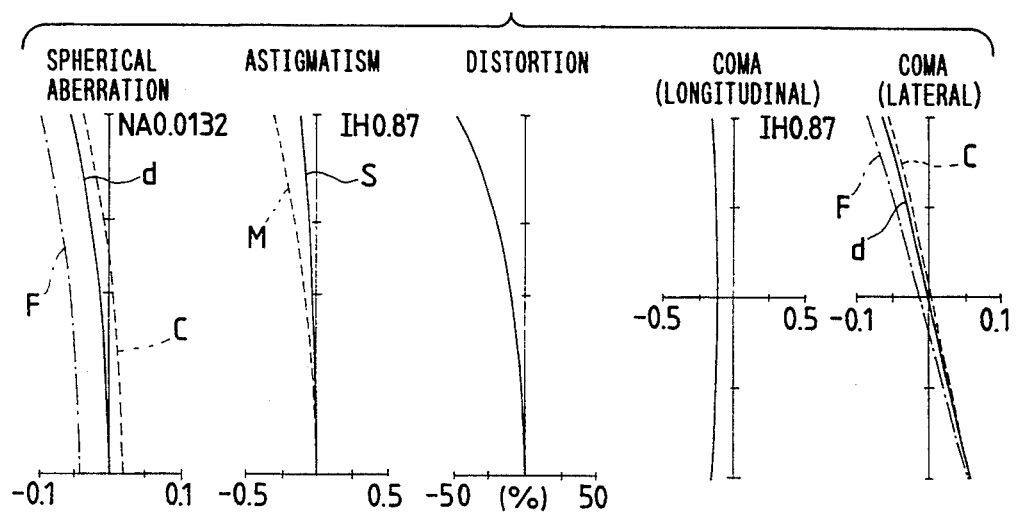
Figure 41:
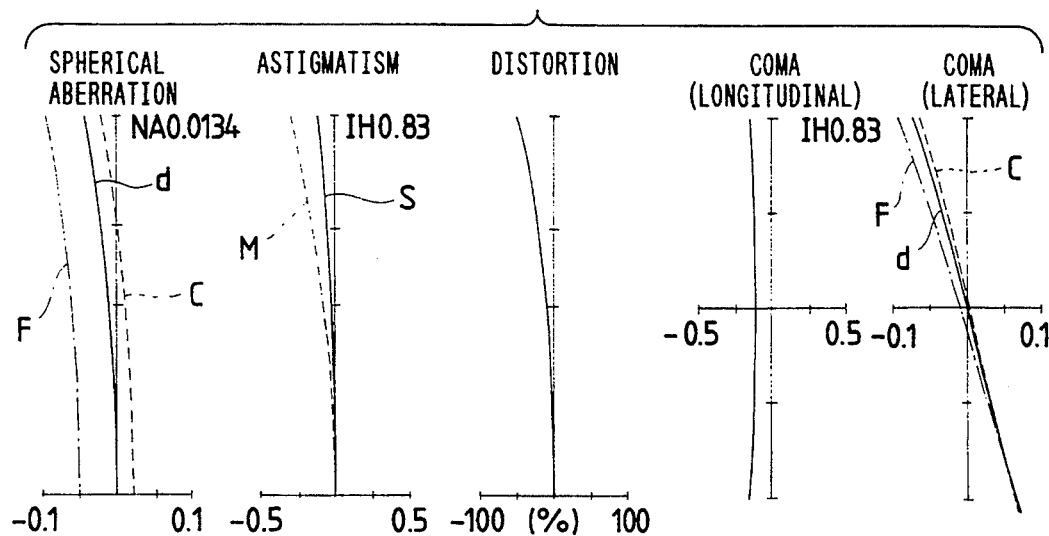
Figure 42:
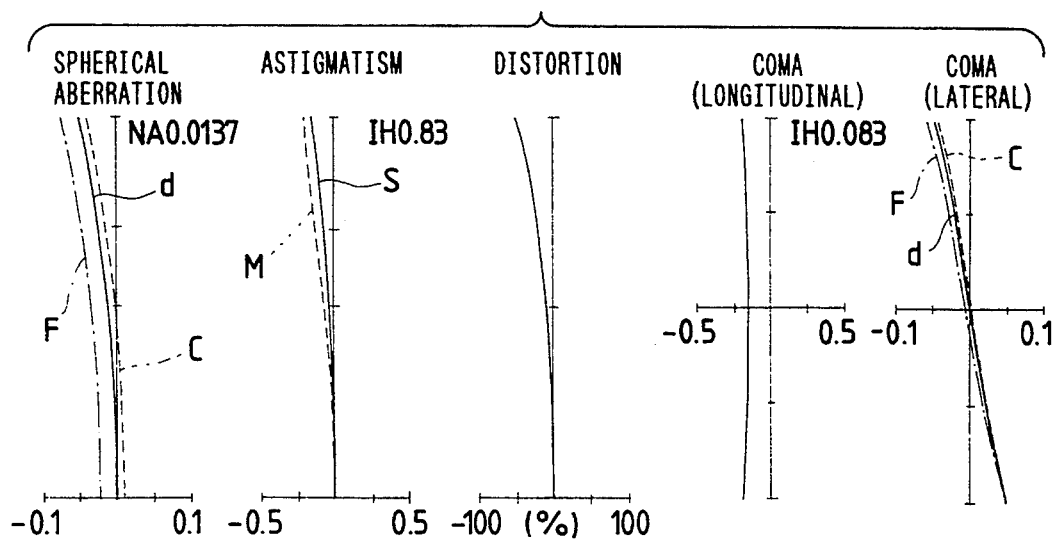
Figure 43:
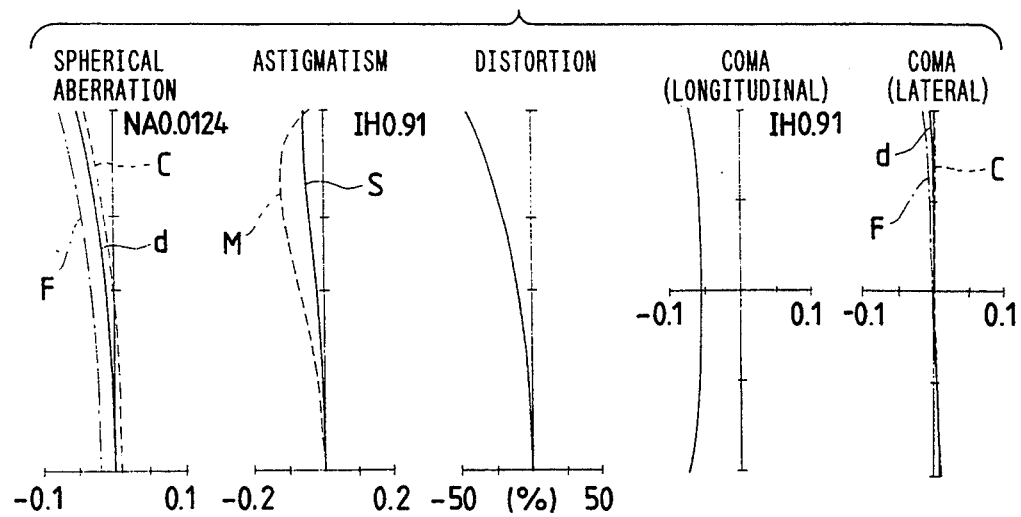
Figure 44:
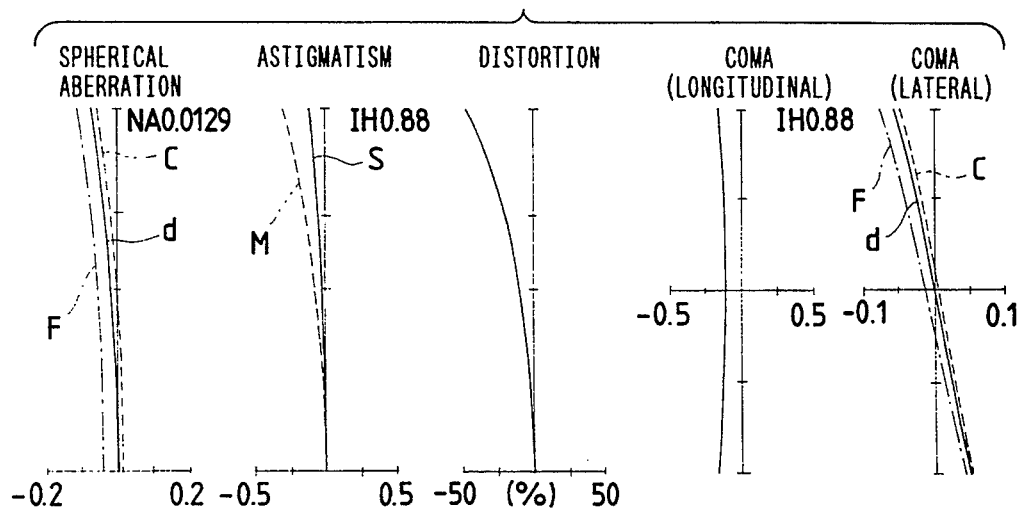
Figure 45:
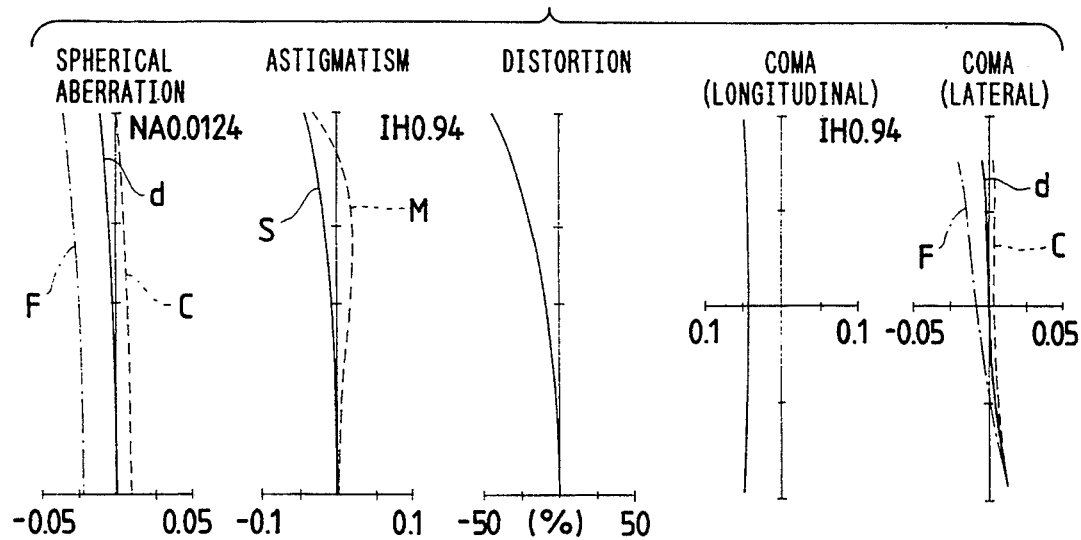
Figure 46:
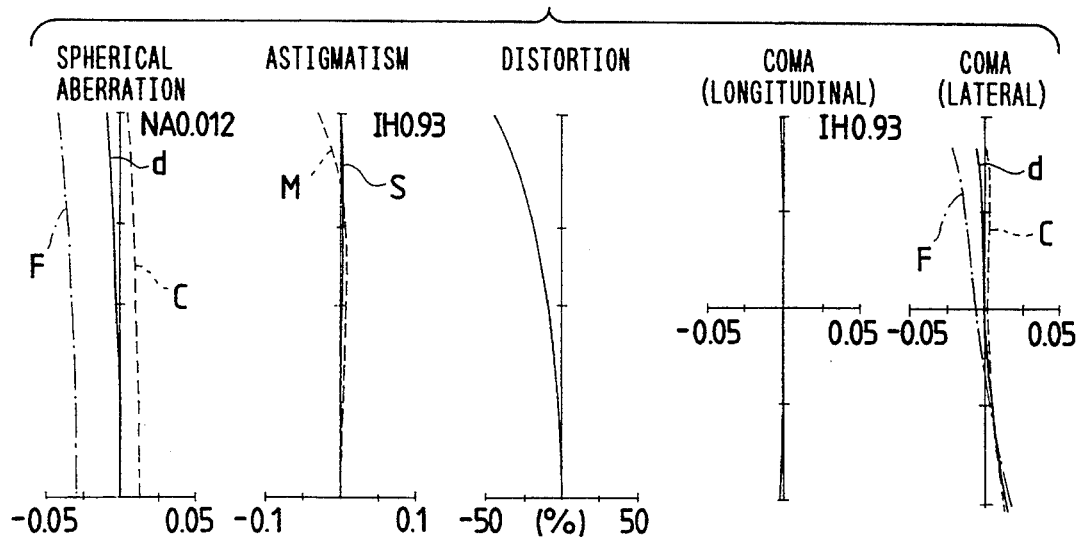
Figure 47:
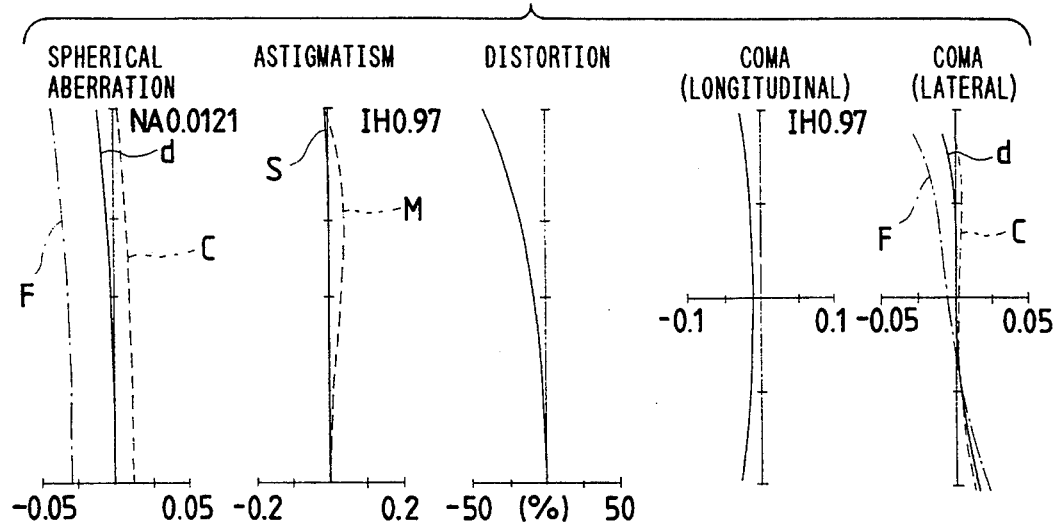
Figure 48:
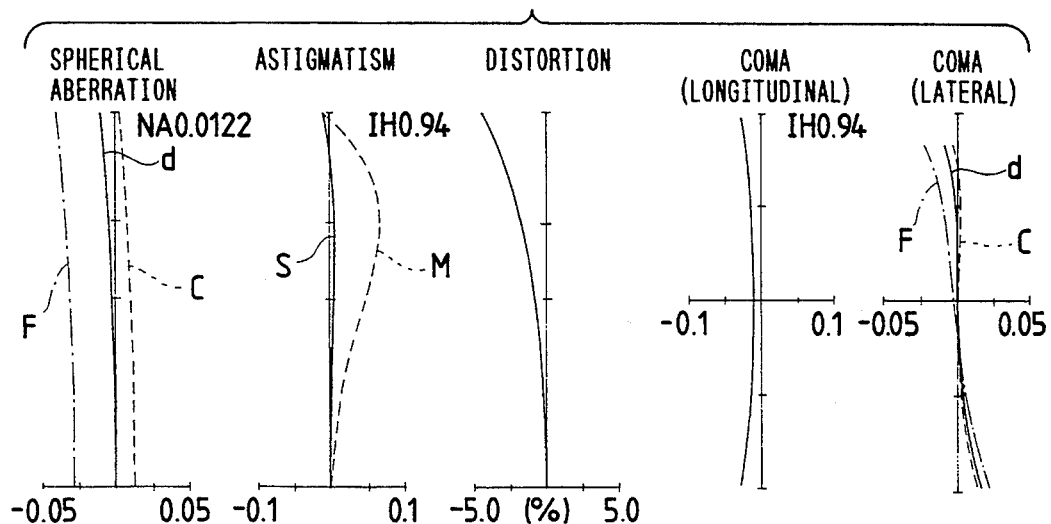
Figure 49:
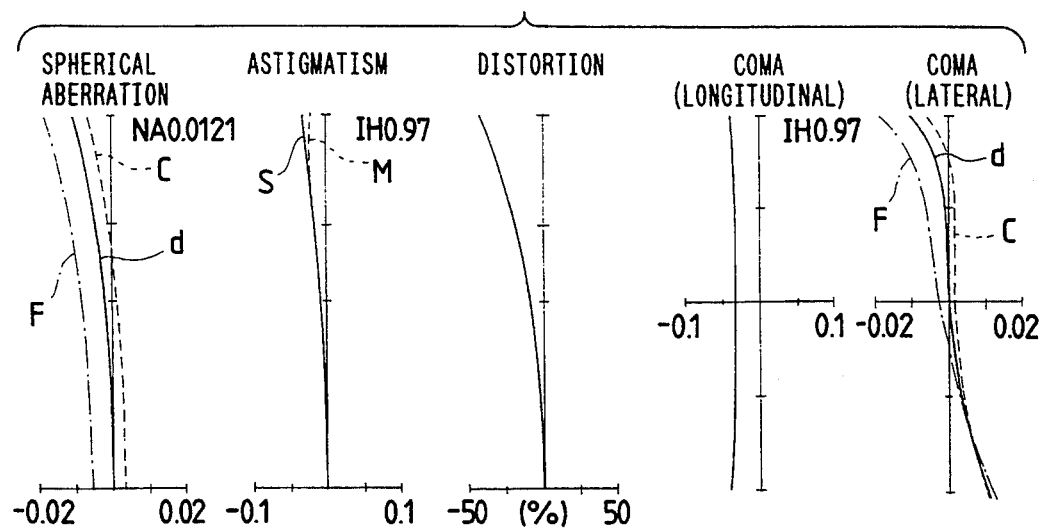
Figure 50:
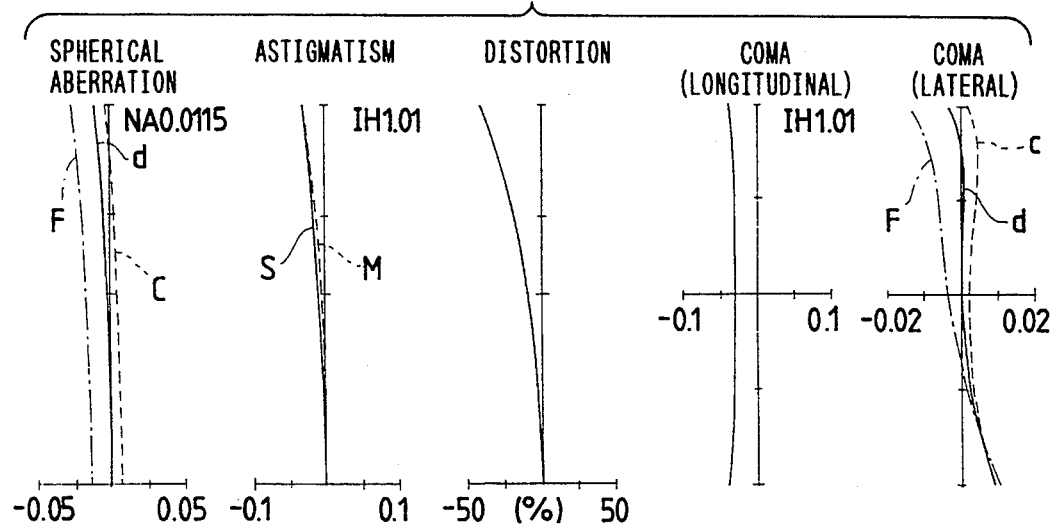
Figure 51:
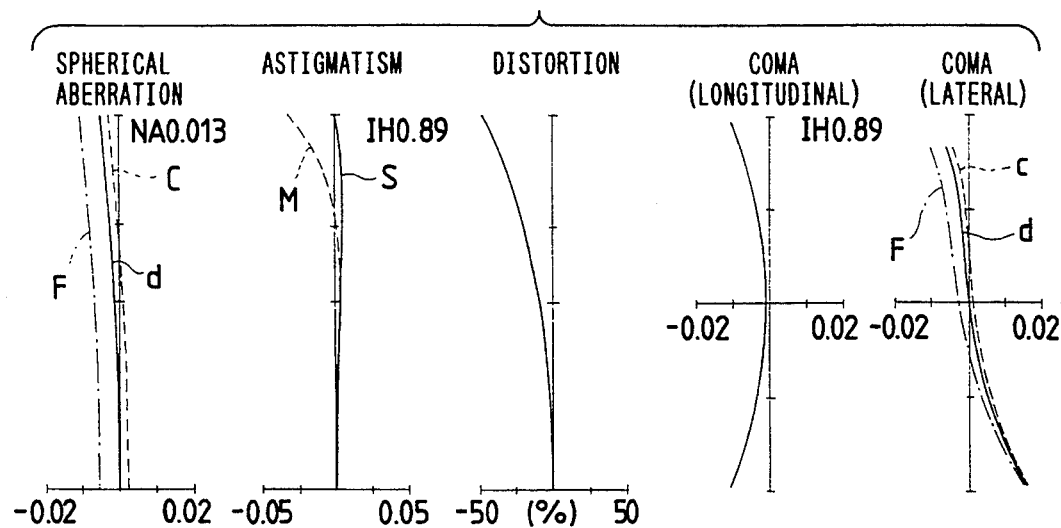
Figure 52:
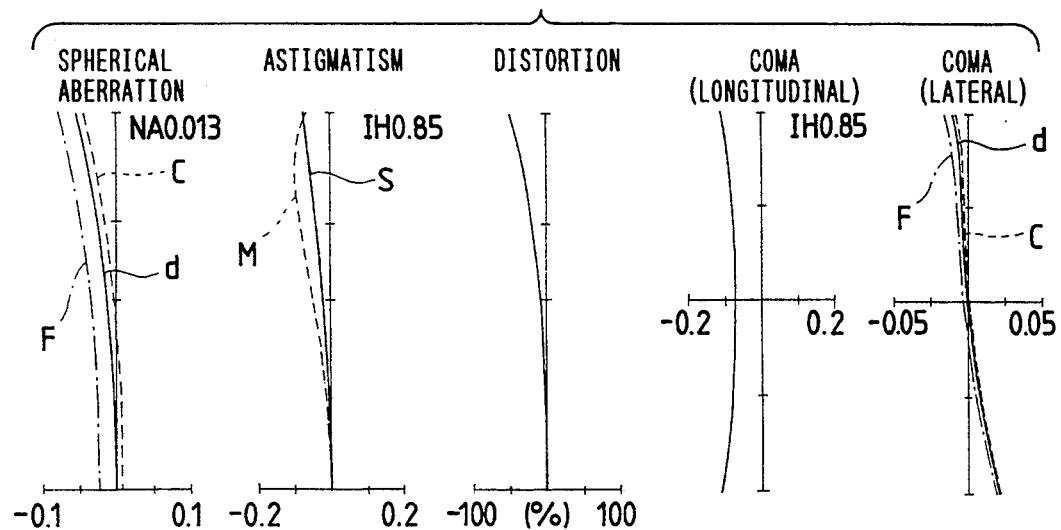
Figure 53:
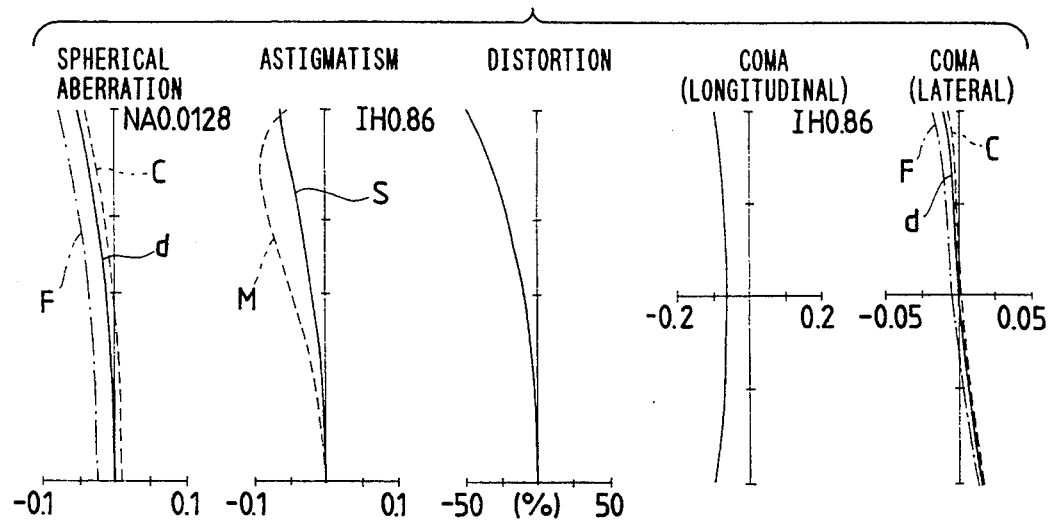
Figure 54:
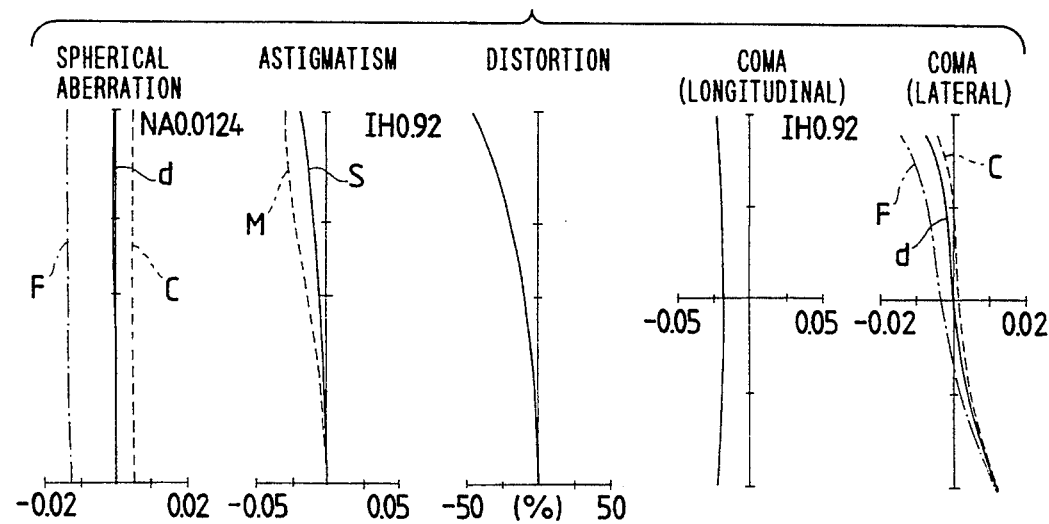
Figure 55:
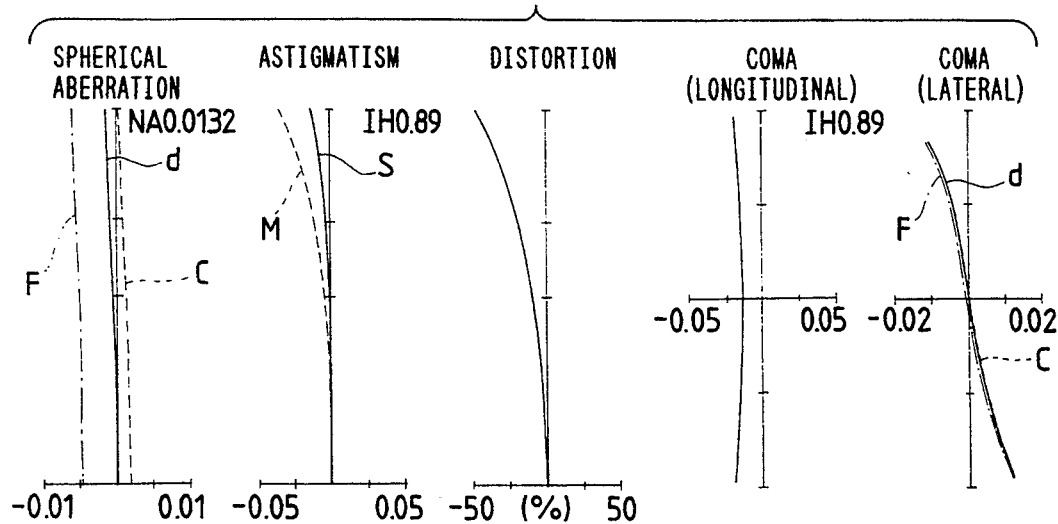
Figure 56:
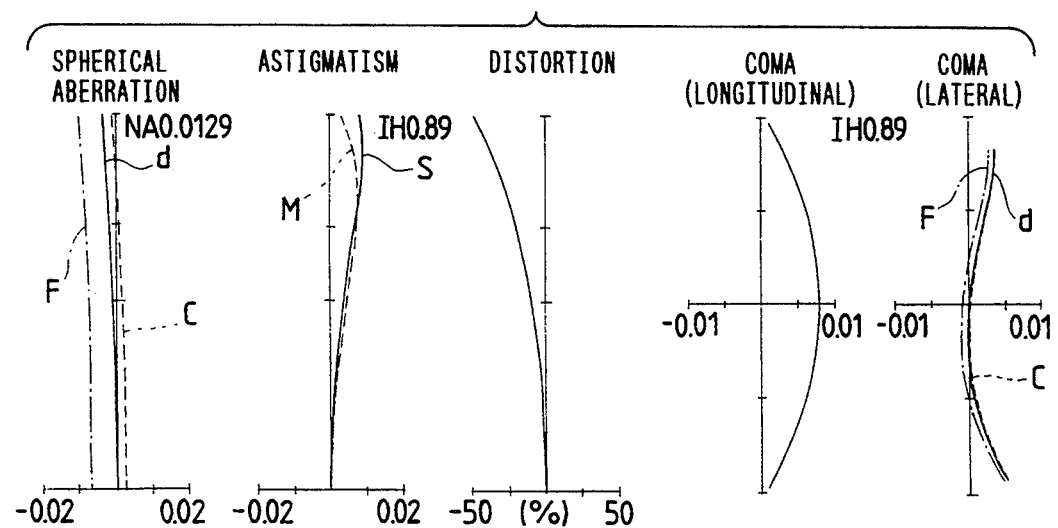
Figure 57:
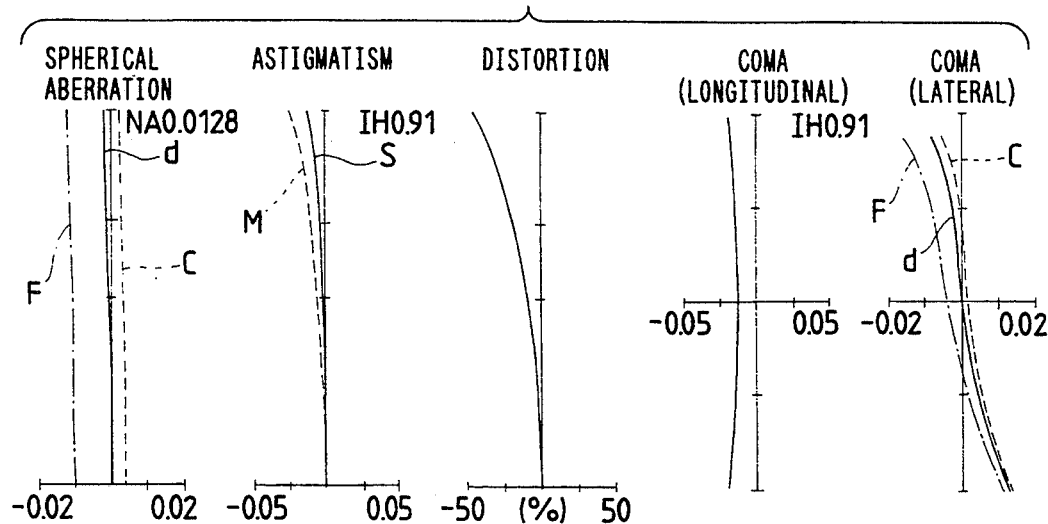
Figure 58:
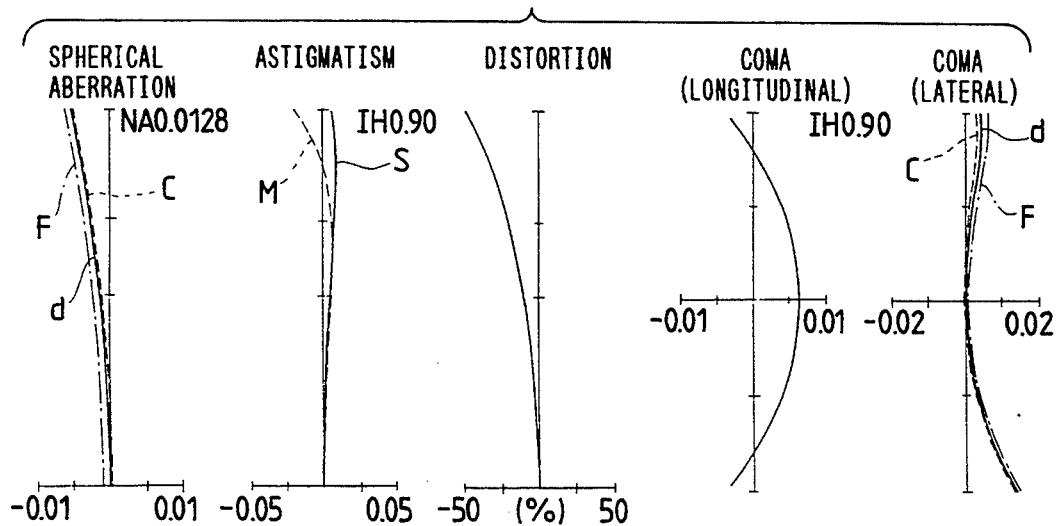
Figure 59:
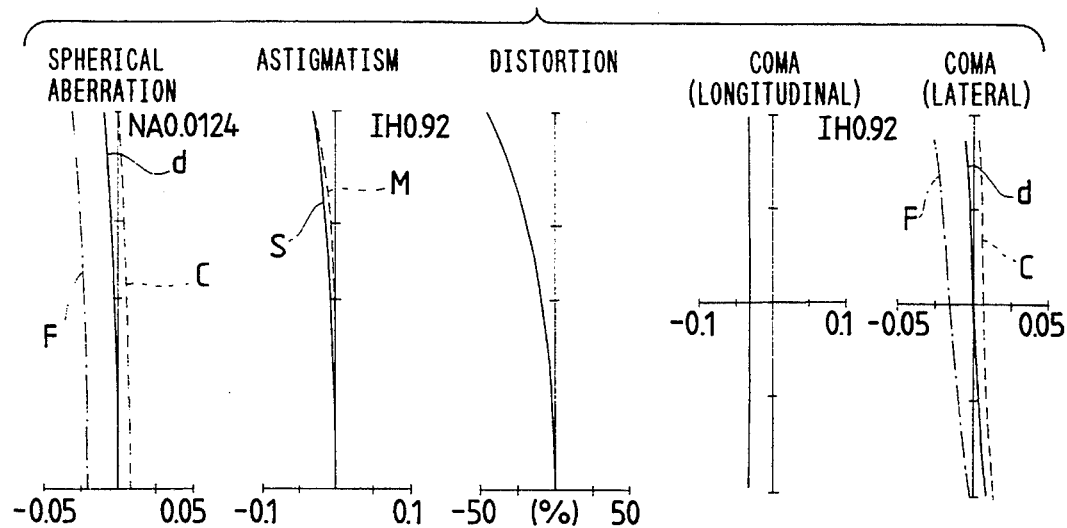
Figure 60:
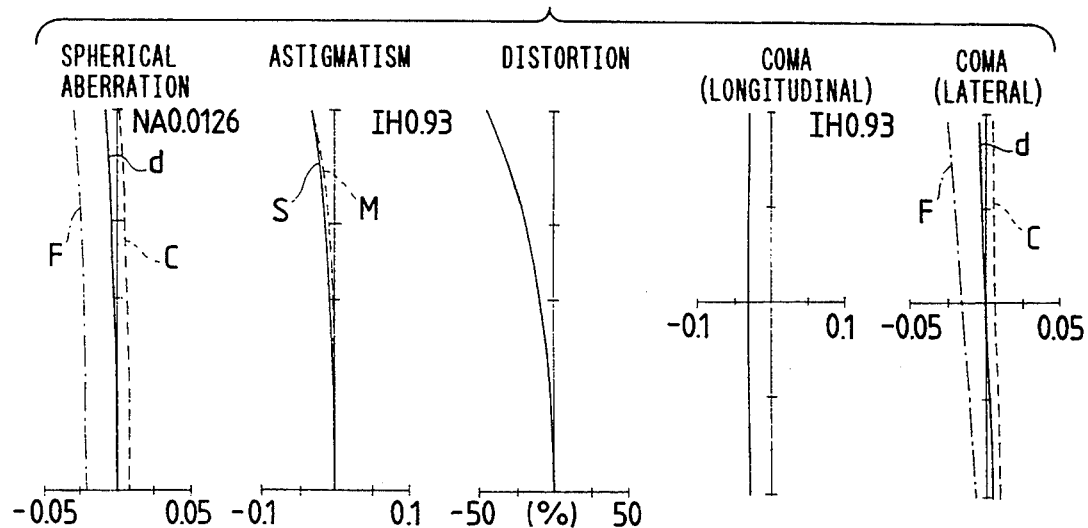
Figure 61:
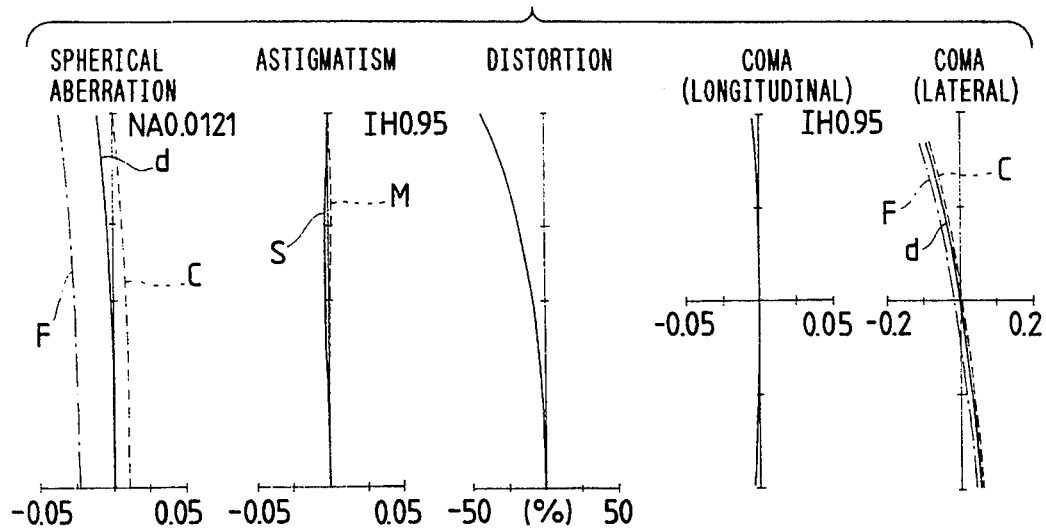
Figure 62:
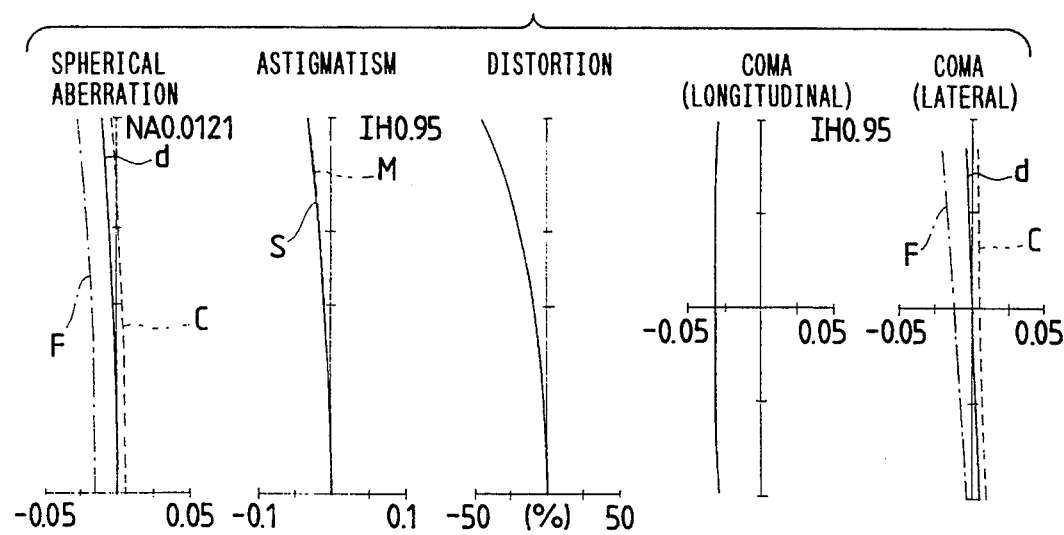
Figure 63:
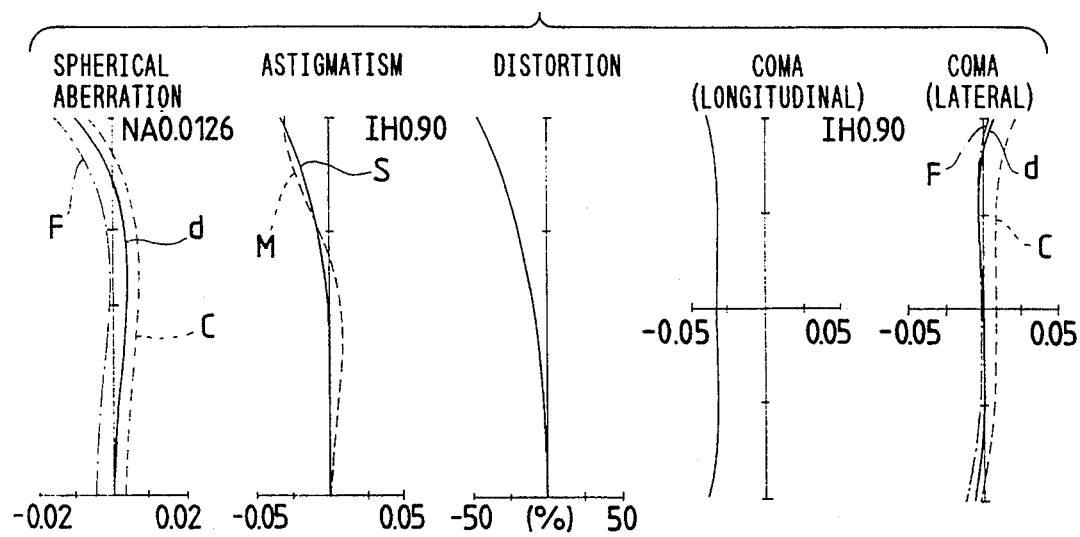
Figure 64:
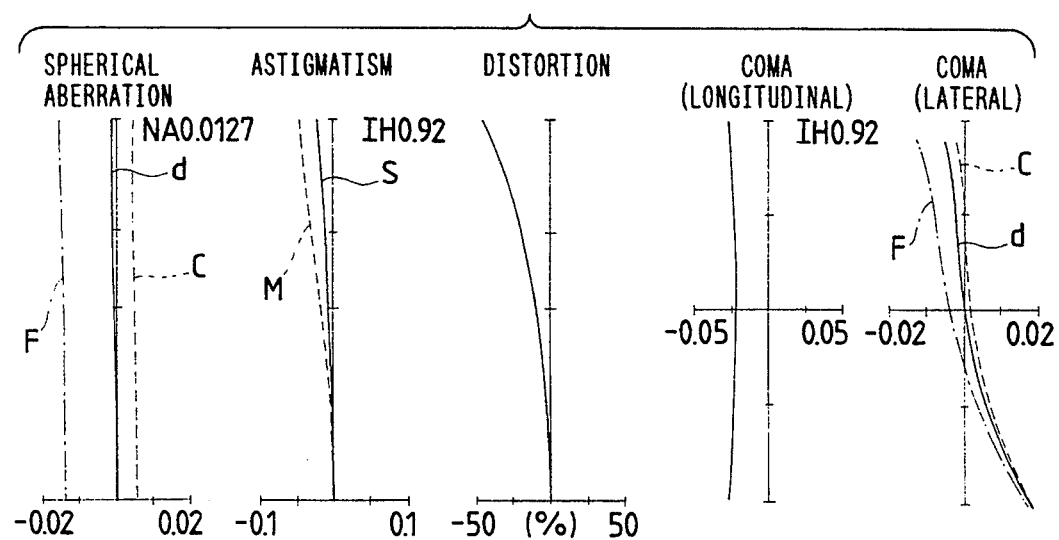
Figure 65:
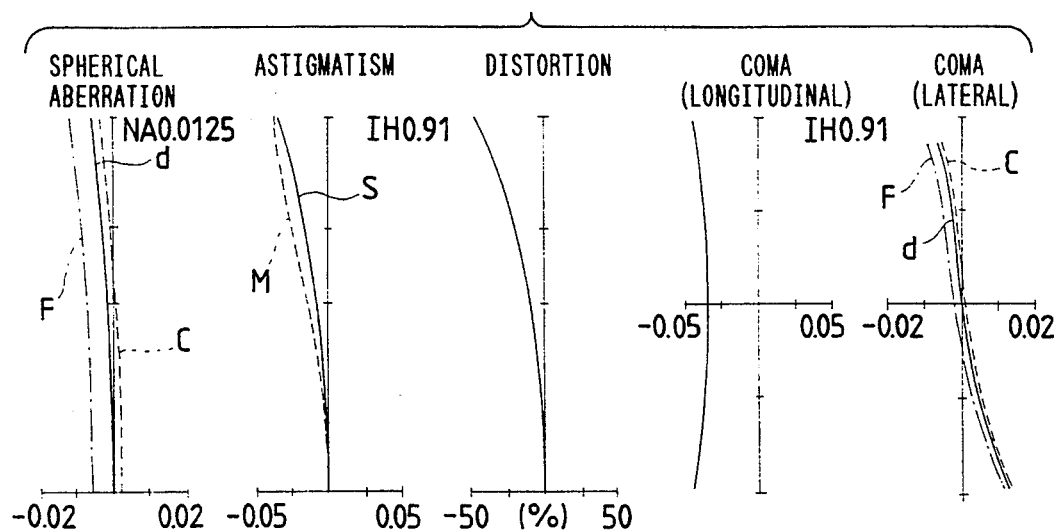
Figure 66:
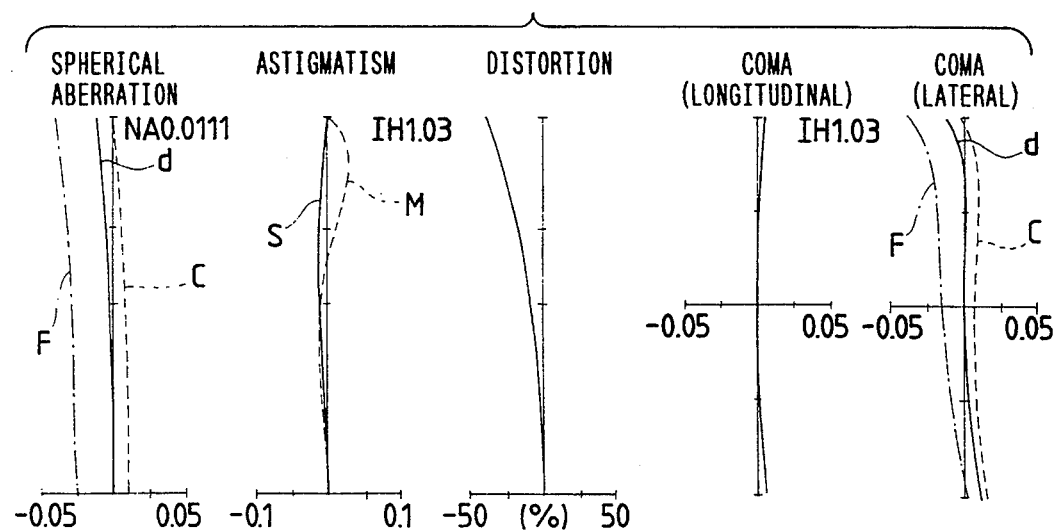
Figure 67:
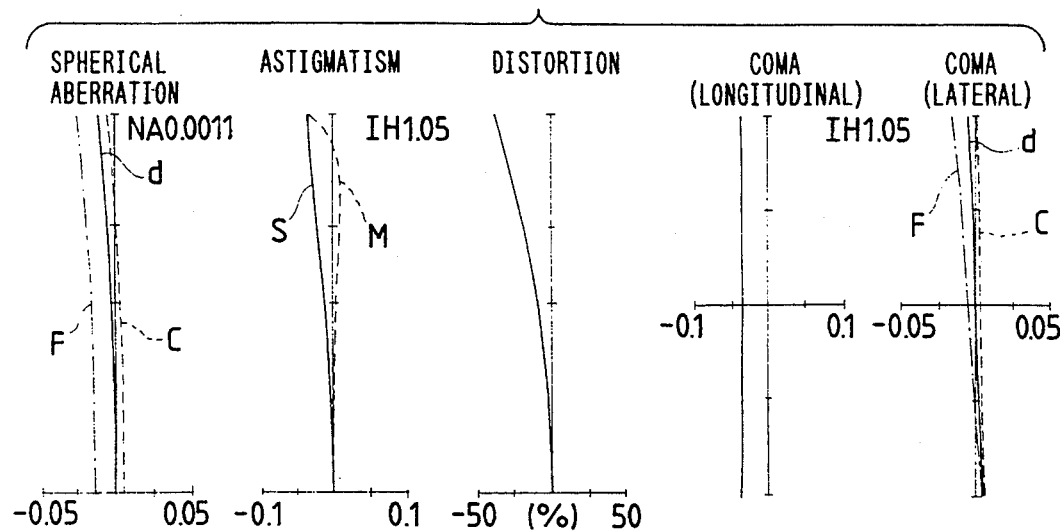
Figure 68:
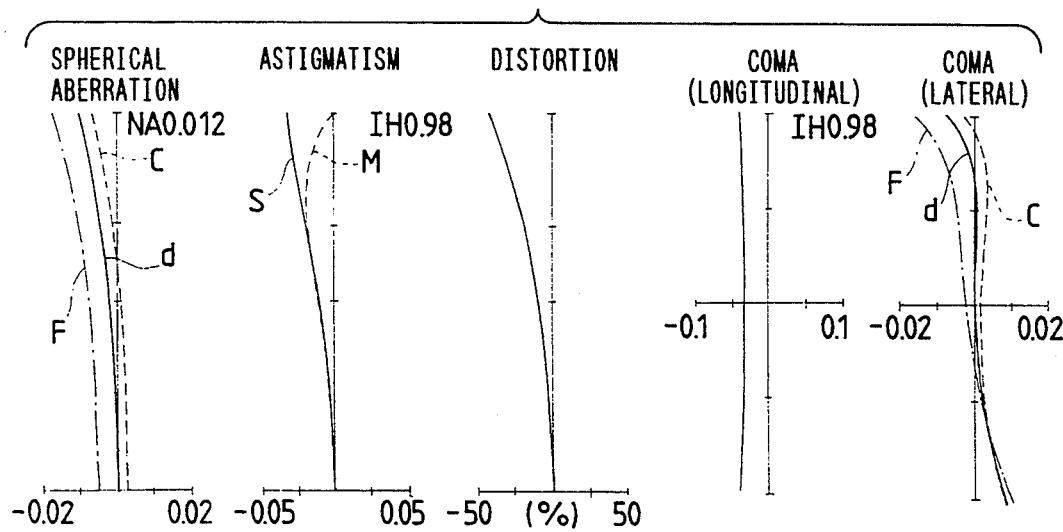
Figure 69:
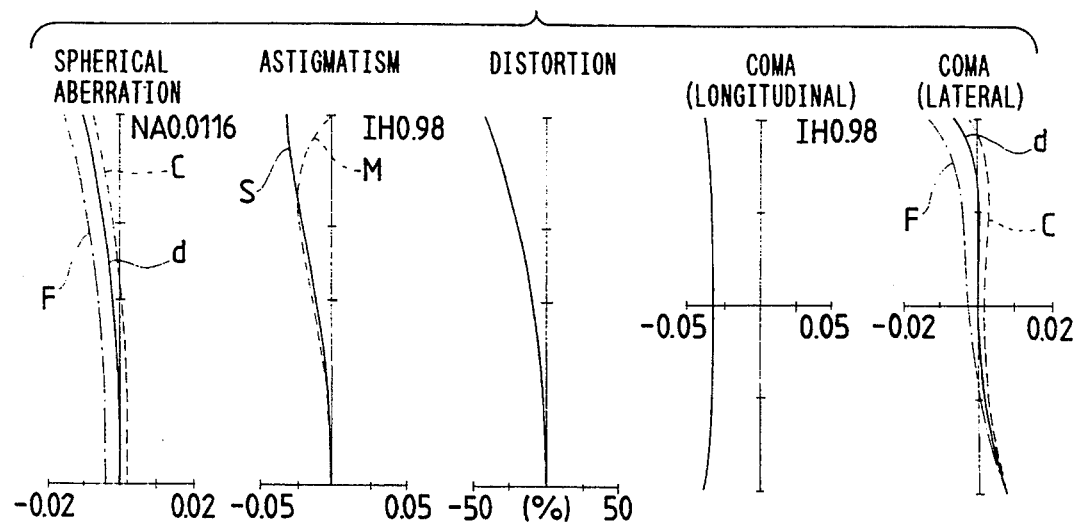
Figure 70:
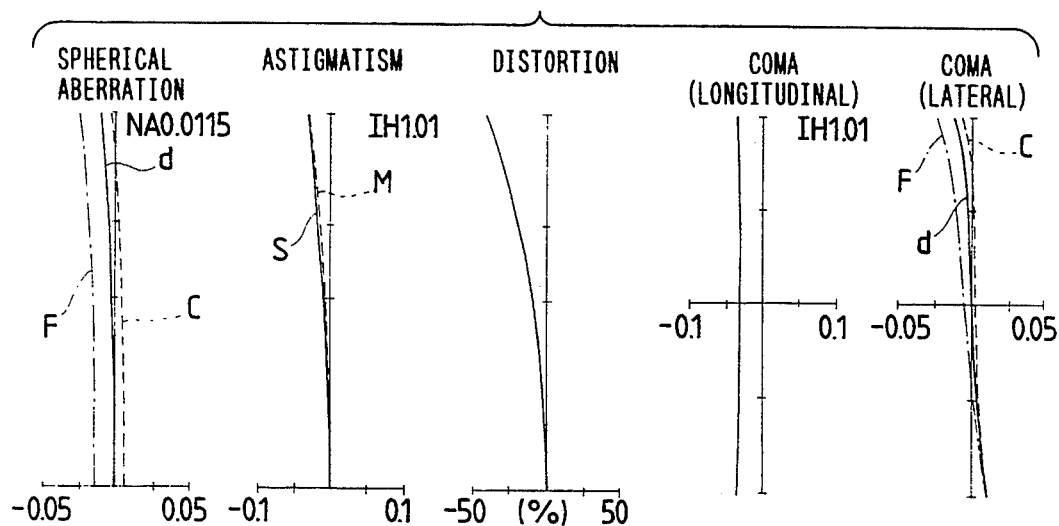
Figure 71:
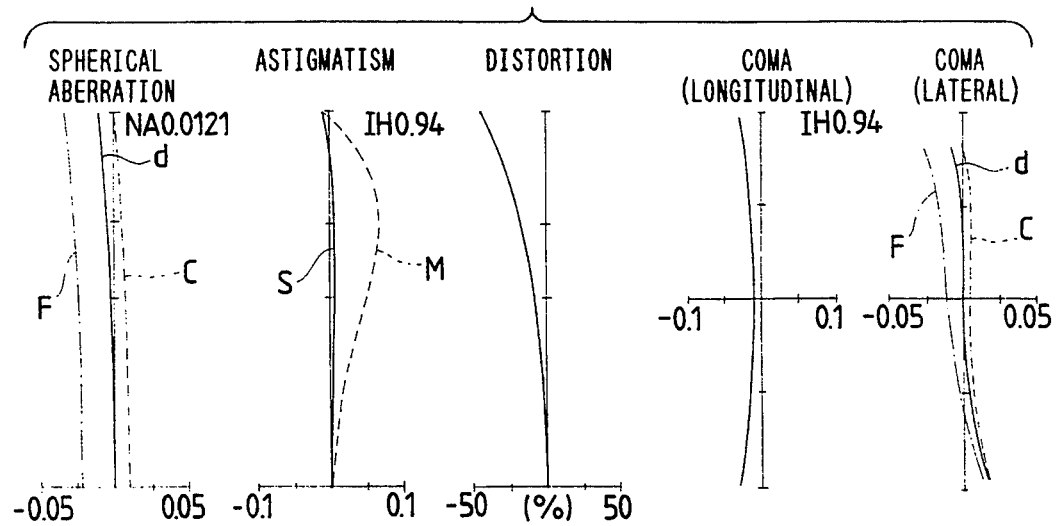
Figure 72:
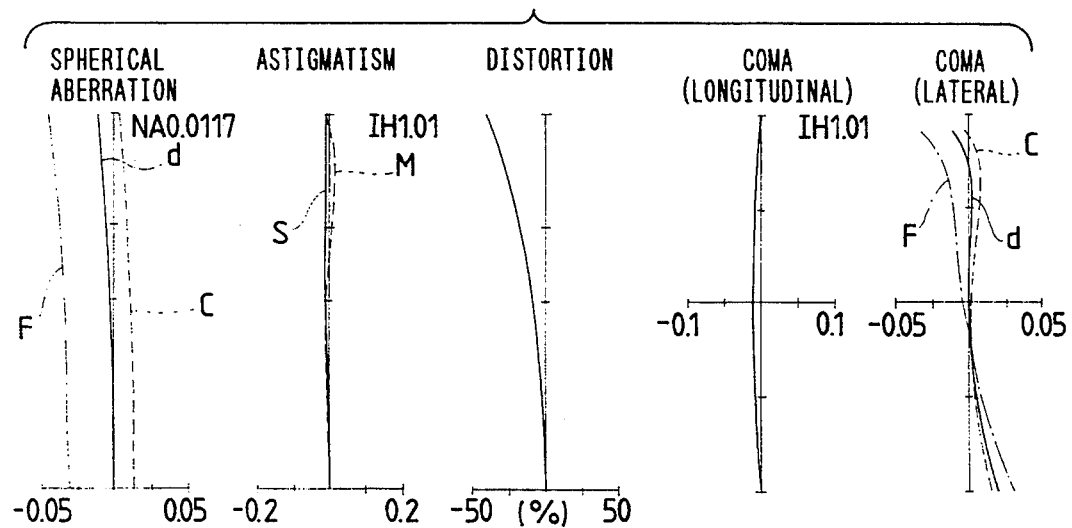
Figure 73:
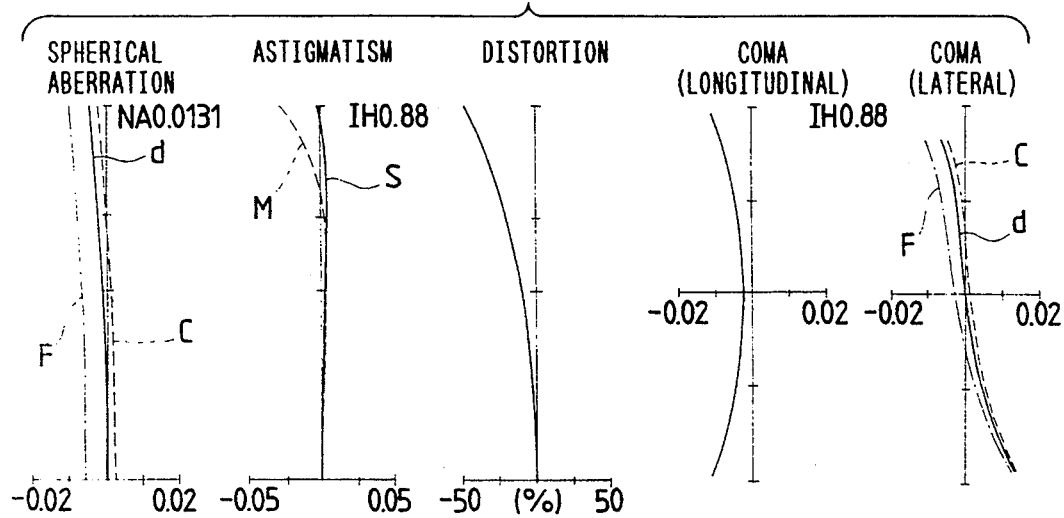

The twenty-ninth and the thirtieth embodiments have compositions illustrated in FIG. 30 and FIG. 31 respectively, wherein lateral chromatic aberration is corrected in the objective lens system as a whole by using the front lens unit.

For this purpose, the front lens unit is composed of a negative lens element which has a relatively low refractive index and a weak dispersing power, and a positive lens element which has a relatively high refractive index and a strong dispersing power. This front lens unit produces negative lateral chromatic aberration. However, this lateral chromatic aberration becomes positive lateral chromatic aberration on an image surface since the front lens unit is disposed on the object side of a stop and lateral chromatic aberration is corrected favorably in the objective lens system as a whole.

The thirty-first through the thirty-fifth embodiments have compositions illustrated in FIG. 32 through FIG. 36 respectively. In each of these embodiments, the front lens unit uses a graded refractive index lens component which has a refractive index distribution approximated by the formulae (1) through (5), and satisfies the conditions (6) and (7).

Negative lateral chromatic aberration is produced by the graded refractive index lens component which has the refractive index distribution approximated by the formulae (1) through (5), and satisfies the condition (6) and (7) as described above. The negative lateral chromatic aberration is produced by the front lens unit which comprises the graded refractive index lens component described above, but signs of aberrations are reversed on the image surface and positive lateral chromatic aberration is obtained on the image surface, whereby lateral chromatic aberration is corrected favorably in the objective lens system as a whole.

When the graded refractive index lens component used in the front lens unit of each of these embodiments has an equivalent Abbe's number $\nu_e$, it is desirable that the graded refractive index lens component satisfies the following conditions (13) and (14):

$$\nu_e/\nu_{0d} \geq 1.2 \tag{13}$$

$$\nu_e \leq 0 \tag{14}$$

The condition (13) is necessary for suppressing the negative lateral chromatic aberration which is to be produced by the front lens unit, whereas the condition (14) is required for allowing the front lens unit to produce positive lateral chromatic aberration.

If the condition (13) or (14) is not satisfied, it will be impossible to correct the negative lateral chromatic aberration which is produced by the rear lens unit by using the front lens unit.

In certain ones of the embodiments described above, the objective lens systems have planar surfaces on the image side for connecting end surfaces of image guides. It is therefore desirable that the areas outside effective diameters of these end surfaces are coated with light-absorptive substances such as a black paint for preventing detrimental rays which may be causes of flare, ghost and so on.

I claim:

1. An objective lens system for endoscopes comprising, in order from the object side: a front lens unit having a negative refractive power, an aperture stop, and a rear lens unit having a positive refractive power; wherein said front lens unit includes a graded refractive index lens component, and wherein said graded refractive index lens component satisfies the following conditions (6) and (7) when a refractive index and an Abbe's number of said graded refractive index lens component are approximated by formulae (1) through (5) mentioned below:

$$N_d(r) = N_{0d} + N_{1d}r^2 + N_{2d}r^4 + N_{3d}r^6 \tag{1}$$

$$N_F(r) = N_{0F} + N_{1F}r^2 + N_{2F}r^4 + N_{3F}r^6 \tag{2}$$

$$N_C(r) = N_{0C} + N_{1C}r^2 + N_{2C}r^4 + N_{3C}r^6 \tag{3}$$

$$\nu_{0d} = (1 - N_{0d})/(N_{0F} - N_{0C}) \tag{4}$$

$$\nu_{1d} = N_{1d}/(N_{1F} - N_{1C}) \tag{6}$$

$$N_{1d} < 0 \tag{6}$$

$$0 \leq \nu_{0d} \leq \nu_{1d} \tag{7}$$

wherein the reference symbols $N_d(r)$, $N_F(r)$ and $N_C(r)$ represent refractive index of said graded refractive index lens component for the d-line, F-line and C-line respectively when a radial distance as measured from an optical axis is designated by r, the reference symbols $N_{0d}$, $N_{1d}$, $N_{2d}$ and $N_{3d}$ denote refractive index distribution coefficient for the d-line, the reference symbols $N_{0F}$, $N_{1F}$, $N_{2F}$ and $N_{3F}$ represent refractive index distribution coefficients for the F-line, the reference symbols $N_{0C}$, $N_{1C}$, $N_{2C}$ and $N_{3C}$ designate refractive index distribution coefficients for the C-line, and the reference symbols $\nu_{0d}$ and $\nu_{1d}$ denote Abbe's numbers.

2. An objective lens system for endoscopes according to claim 1 wherein said graded refractive index lens component satisfies the following conditions (13) or (14):

$$\nu_e/\nu_{0d} \geq 1.2 \tag{13}$$

$$\nu_e \leq 0 \tag{14}$$

wherein the reference symbol $\nu_e$ represents an equivalent Abbe's number of said graded refractive index lens component.

3. An objective lens system for endoscopes according to claim 2, wherein said front lens unit comprises, in order from the object side, a positive lens component and a negative lens component, and wherein said negative lens component is a graded refractive index lens component satisfying the conditions (1), (2), (3), (4), (5), (6) and (7).

4. An objective lens system for endoscopes according to claim 2 wherein said rear lens unit includes a graded refractive index lens component which satisfies the following conditions (6) and (7) when refractive index of said graded refractive index lens component is approximated by formulae (1) through (5) mentioned below:

$$N_d(r) = N_{0d} + N_{1d}r^2 + N_{2d}r^4 + N_{3d}r^6 \quad (1)$$

$$N_F(r) = N_{0F} + N_{1F}r^2 + N_{2F}r^4 + N_{3F}r^6 \quad (2)$$

$$N_C(r) = N_{0C} + N_{1C}r^2 + N_{2C}r^4 + N_{3C}r^6 \quad (3)$$

$$\nu_{0d} = (1 - N_{0d})/(N_{0F} - N_{0C}) \quad (4)$$

$$\nu_{1d} = N_{1d}/(N_{1F} - N_{1C}) \quad (6)$$

$$N_{1d} < 0 \quad (6)$$

$$0 \leq \nu_{0d} \leq \nu_{1d} \quad (7)$$

5. An objective lens system for endoscopes according to claim 4 wherein the graded refractive index lens component included in said rear lens unit satisfies the following condition (22):

$$N_e/N_{0d} \geq 1.1 \quad (22)$$

wherein the reference symbol $N_e$ represents an equivalent refractive index of the graded refractive index lens component included in said rear lens unit.

6. An objective lens system for endoscopes according to claim 4 wherein said graded refractive index lens component included in said rear lens unit satisfies the following condition (17):

$$0.2 \leq |\Phi_e \Phi_e| \leq 3.6 \quad (17)$$

wherein the reference symbol $\Phi_e$ represents a refractive power of said graded refractive index lens component included in said rear lens unit and the reference symbol $\Phi_R$ designates a refractive power of said rear lens unit.

7. An objective lens system for endoscopes according to claim 5 wherein the graded refractive index lens component included in said rear lens unit satisfies the following condition (16):

$$0.01 \leq |\Phi_M/\Phi_e| \leq 3.0 \quad (16)$$

wherein the reference symbol $\Phi_M$ represents a refractive power of a medium of said graded refractive index lens component included in said rear lens unit.

8. An objective lens system for endoscopes according to claim 7 wherein said rear lens unit consists, in order from the object side, of a graded refractive index lens component and a positive subunit.

9. An objective lens system for endoscopes according to claim 8 wherein said positive subunit consists of a positive lens component having a relatively low refractive index and weak dispersing power, and a negative lens component having a relatively high refractive index and strong dispersing power.

10. An objective lens system for endoscopes according to claim 6 wherein said rear lens unit comprises a graded refractive index lens component satisfying the conditions (6) and (7), and another graded refractive index lens component satisfying the following conditions (15) and (16) in addition to the condition (7):

$$N_{1d} > 0 \quad (15)$$

$$\nu_e/\nu_{0d} \leq 0.8 \quad (16)$$

wherein the reference symbol $\nu_e'$ represents an equivalent Abbe's number of said graded refractive index lens component.

11. An objective lens system for endoscopes comprising, in order from the object side: a front lens unit having a negative refractive power, an aperture stop, and a rear lens unit having a positive refractive power; wherein said rear lens unit includes a graded refractive index lens component, and wherein said graded refractive index lens component satisfies the following conditions (15) and (7) when a refractive index and an Abbe's number are approximated by formulae (1) through (5) shown below:

$$N_d(r) = N_{0d} + N_{1d}r^2 + N_{2d}r^4 + N_{3d}r^6 \quad (1)$$

$$N_F(r) = N_{0F} + N_{1F}r^2 + N_{2F}r^4 + N_{3F}r^6 \quad (2)$$

$$N_C(r) = N_{0C} + N_{1C}r^2 + N_{2C}r^4 + N_{3C}r^6 \quad (3)$$

$$\nu_{0d} = (1 - N_{0d})/(N_{0F} - N_{0C}) \quad (4)$$

$$\nu_{1d} = N_{1d}/(N_{1F} - N_{1C}) \quad (5)$$

$$N_{1d} > 0 \quad (15)$$

$$0 \leq \nu_{0d} \leq \nu_{1d} \quad (7)$$

wherein the reference symbols $N_d(r)$, $N_F(r)$ and $N_C(r)$ represent refractive index of said graded refractive index lens component for the d-line, F-line and C-line respectively when a distance as measured in the radial direction from an optical axis is designated by r, the reference symbols $N_{0d}$, $N_{1d}$, $N_{2d}$ and $N_{3d}$ denote refractive index distribution coefficients for the d-line, the reference symbols $N_{0F}$, $N_{1F}$, $N_{2F}$ and $N_{3F}$ represents refractive index distribution coefficients for the F-line, the reference symbols $N_{0C}$, $N_{1C}$, $N_{2C}$ and $N_{3C}$ designate refractive index distribution coefficients for the C-line, and the reference symbols $\nu_{0d}$ and $\nu_{1d}$ denote Abbe's numbers.

12. An objective lens system for endoscopes according to claim 11 wherein said rear lens unit includes, in order from the object side, a positive lens component and a cemented lens component consisting of a positive lens element and a negative lens element, and wherein said negative lens element is a graded refractive index lens element satisfying the conditions (15) and (7).

13. An objective lens system for endoscopes according to claim 11 wherein said graded refractive index lens component used in said rear lens unit satisfies the following condition (16):

$$\nu_e/\nu_{0d} \leq 0.8 \quad (16)$$

wherein the reference symbol $N_e$ represents an equivalent refractive index of the graded refractive index lens component used in said rear lens unit.

14. An objective lens system for endoscopes comprising, in order from the object side: a front lens unit having a negative refractive power, an aperture stop, and a rear lens unit having a positive refractive power; wherein said rear lens unit includes a graded refractive index lens component, and wherein said graded refractive index lens component satisfies the following conditions (6) and (7) when a refractive index and an Abbe's number of said graded refractive index lens component are approximated by formulae (1) through (5) mentioned-below:

$$N_d(r) = N_{0d} + N_{1d}r^2 + N_{2d}r^4 + N_{3d}r^6 \quad (1)$$

$$N_F(r) = N_{0F} + N_{1F}r^2 + N_{2F}r^4 + N_{3F}r^6 \quad (2)$$

$$N_C(r) = N_{0C} + N_{1C}r^2 + N_{2C}r^4 + N_{3C}r^6 \quad (3)$$

$$\nu_{0d} = (1 - N_{0d})/(N_{0F} - N_{0C}) \quad (4)$$

$$\nu_{1d} = N_{1d}/(N_{1F} - N_{1C}) \quad (5)$$

$$N_{1d} > 0 \quad (6)$$

$$0 \leq \nu_{0d} \leq \nu_{1d} \quad (7)$$

wherein the reference symbol $N_d(r)$, $N_F(r)$ and $N_C(r)$ represent refractive index of said graded refractive index lens component for the d-line, F-line and C-line respectively when a distance as measured from an optical axis in the radial direction is designated by r, the reference symbols $N_{0d}$, $N_{1d}$, $N_{2d}$ and $N_{3d}$ denote refractive index distribution coefficients for the d-line, the reference symbols $N_{0F}$, $N_{1F}$, $N_{2F}$ and $N_{3F}$ represent refractive index distribution coefficients for the F-line, the reference symbols $N_{0C}$, $N_{1C}$, $N_{2C}$ and $N_{3C}$ designate refractive index distribution coefficients for the C-line, and the reference symbols $\nu_{0d}$ and $\nu_{1d}$ denote Abbe's numbers.

15. An objective lens system for endoscopes according to claim 11 or 14 wherein said front lens unit includes a graded refractive index lens component which satisfies the following conditions (6) and (7) when refractive index of said graded refractive index lens component is approximated by the formulae shown below:

$$N_d(r) = N_{0d} + N_{1d}r^2 + N_{2d}r^4 + N_{3d}r^6 \quad (1)$$

$$N_F(r) = N_{0F} + N_{1F}r^2 + N_{2F}r^4 + N_{3F}r^6 \quad (2)$$

$$N_C(r) = N_{0C} + N_{1C}r^2 + N_{2C}r^4 + N_{3C}r^6 \quad (3)$$

$$\nu_{0d} = (1 - N_{0d})/(N_{0F} - N_{0C}) \quad (4)$$

$$\nu_{1d} = N_{1d}/(N_{1F} - N_{1C}) \quad (5)$$

$$N_{1d} < 0 \quad (6)$$

$$0 \leq \nu_{0d} = \nu_{1d} \quad (7)$$

wherein the reference symbols $N_d(r)$, $N_F(r)$ and $N_C(r)$ represent refractive indices for the d-line, F-line and C-line respectively when a distance as measured from an optical axis in the radial direction is designated by r, the reference symbols $N_{0d}$, $N_{1d}$, $N_{2d}$ and $N_{3d}$ denote refractive index distribution coefficients for the d-line, the reference symbols $N_{0F}$, $N_{1F}$, $N_{2F}$ and $N_{3F}$ designate refractive index distribution coefficients for the F-line, the reference symbols $N_{0C}$, $N_{1C}$, $N_{2C}$ and $N_{3C}$ denote refractive index distribution coefficients for the C-line, and the reference symbols $\nu_{3d}$ and $\nu_{1d}$ represent Abbe's numbers.

16. An objective lens system for endoscopes according to claim 13 wherein said graded refractive index lens component disposed in said rear lens unit satisfies the following condition (22):

$$N_e/N_{0d} \geq 1.1 \quad (22)$$

wherein the reference symbol $N_e$ represents an equivalent refractive index of said graded refractive index lens component disposed in said rear lens unit.

17. An objective lens system for endoscopes comprising, in order from the object side: a front lens unit having a negative refractive power, an aperture stop, and a rear lens unit having a positive refractive power; wherein said rear lens unit includes a graded refractive index lens component, and wherein said graded refractive index lens component satisfies the following conditions (15) and (7) when a refractive index and Abbe's number of said graded refractive index lens component are approximated by the formulae (1) through (5) shown below:

$$N_d(r) = N_{0d} + N_{1d}r^2 + N_{2d}r^4 + N_{3d}r^6 \quad (1)$$

$$N_F(r) = N_{0F} + N_{1F}r^2 + N_{2F}r^4 + N_{3F}r^6 \quad (2)$$

$$N_C(r) = N_{0C} + N_{1C}r^2 + N_{2C}r^4 + N_{3C}r^6 \quad (3)$$

$$\nu_{0d} = (1 - N_{0d})/(N_{0F} - N_{0C}) \quad (4)$$

$$\nu_{1d} = N_{1d}/(N_{1F} - N_{1C}) \quad (5)$$

$$N_{1d} > 0 \quad (15)$$

$$0 \leq \nu_{0d} \leq \nu_{1d} \quad (7)$$

wherein the reference symbols $N_d(r)$, $N_F(r)$ and $N_C(r)$ represent refractive indices for the d-line, F-line and C-line respectively when a distance as measured from an optical axis in the radial direction is designated by r, the reference symbols $N_{0d}$, $N_{1d}$, $N_{2d}$ and $N_{3d}$ denote refractive index distribution coefficients for the d-line, the reference symbols $N_{0F}$, $N_{1F}$, $N_{2F}$ and $N_{3F}$ represent refractive index distribution coefficients for the F-line, the reference symbols $N_{0C}$, $N_{1C}$, $N_{2C}$ and $N_{3C}$ designate refractive index distribution coefficients for the C-line, and the reference symbols $\nu_{0d}$ and $\nu_{1d}$ denote Abbe's numbers.

18. An objective lens system for endoscopes according to claim 17 wherein said graded refractive index lens component disposed in said rear lens unit satisfies the following condition (17):

$$0.2 \leq |\Phi_e/\Phi_e| \leq 3.6 \quad (17)$$

wherein the reference symbol $\Phi_e$ represents a refractive power of said graded refractive index lens component disposed in said rear lens unit and the reference symbol $\Phi_R$ designates a refractive power of said rear lens unit.

19. An objective lens system for endoscopes according to claim 17 wherein said graded refractive index lens component satisfies the following condition (22):

$$N_3/N_{0d} \geq 1.1 \qquad (22)$$

wherein the reference symbol $N_e$ represents an equivalent refractive index of said graded refractive index lens component disposed in said rear lens unit.

20. An objective lens system for endoscopes according to claim 18 wherein said rear lens unit consists, in order from the object side, of a graded refractive index lens component and a positive subunit.

21. An objective lens system for endoscopes according to claim 20 wherein said graded refractive index lens component disposed in said rear lens unit satisfies the following condition (16):

$$0.01 \leq |\Phi_M/\Phi_e| \leq 3.0 \qquad (16)$$

wherein the reference symbol $\Phi_M$ represents a refractive power of a medium of said graded refractive index lens component disposed in said rear lens unit.

22. An objective lens system for endoscopes according to claim 18 wherein said rear lens unit includes a graded refractive index lens component satisfying the conditions (6) and (7), and another graded refractive index lens component satisfying the conditions (7) and (15).

23. An objective lens system for endoscopes according to claim 22 wherein said graded refractive index lens component which satisfies the condition (15) further satisfies the following condition (16);

$$\nu_e/\nu_{0d} \leq 0.8 \qquad (16)$$

wherein the reference symbol $\nu_e$ represents an equivalent Abbe's number of said graded refractive index lens component.

24. An objective lens system for endoscopes according to claim 17 wherein said front lens unit comprises, in order from the object side, a positive lens component and a negative lens component.

* * * * *